United States Patent [19]
Takamatsu et al.

[11] Patent Number: 6,044,204
[45] Date of Patent: Mar. 28, 2000

[54] IMAGE FORMING APPARATUS AND IMAGE PROCESSOR

[75] Inventors: Masahiro Takamatsu; Masahiko Kubo; Kouichiro Shinohara; Nobuyuki Kato, all of Nakai-machi, Japan

[73] Assignee: Fuji Xerox Co., Ltd., Tokyo, Japan

[21] Appl. No.: 08/911,400

[22] Filed: Aug. 14, 1997

[30] Foreign Application Priority Data

Aug. 19, 1996 [JP] Japan .................................. 8-237255
Aug. 19, 1996 [JP] Japan .................................. 8-237256
Aug. 19, 1996 [JP] Japan .................................. 8-237257

[51] Int. Cl.⁷ ................................................. G06K 9/48
[52] U.S. Cl. .......................... 395/109; 382/199; 382/266
[58] Field of Search .................. 395/109; 382/199–200, 382/266–269

[56] References Cited

U.S. PATENT DOCUMENTS

| 4,656,507 | 4/1987 | Greaves et al. ............... 358/96 |
| 4,731,864 | 3/1988 | Modla ........................... 382/54 |
| 5,052,045 | 9/1991 | Peregrim et al. .............. 382/30 |
| 5,204,918 | 4/1993 | Hirosawa ...................... 382/41 |
| 5,563,713 | 10/1996 | Sugiura ....................... 358/298 |

FOREIGN PATENT DOCUMENTS

| 5-281790 | 10/1993 | Japan . |
| 6-87234 | 3/1994 | Japan . |
| 8-23455 | 1/1996 | Japan . |
| 8-228298 | 9/1996 | Japan . |
| 8-337007 | 12/1996 | Japan . |
| 8-339441 | 12/1996 | Japan . |

*Primary Examiner*—Thomas D Lee
*Assistant Examiner*—Stephen Brinich
*Attorney, Agent, or Firm*—Oliff & Berridge, PLC

[57] ABSTRACT

To prevent the density of a low density part when an output image varies from the low density part to a high density part in a vertical scanning direction from being lowered without expanding an image forming apparatus or an image output device and increasing the cost, an image processing section first extracts an edge picture element of the low density part which is in contact with the high density part when an image output based upon input image data Si varies from the low density part to the high density part in the vertical scanning direction or from the high density part to the low density part in the vertical scanning direction. Next, the image processing section reads the number a of picture elements to be corrected and pixel value corrected quantity b from a look-up table based upon the low density part pixel value L and the high density part pixel value L before and after the edge picture element, corrects the pixel value of the input image data Si and sends the corrected output image data So to an image output section.

32 Claims, 30 Drawing Sheets

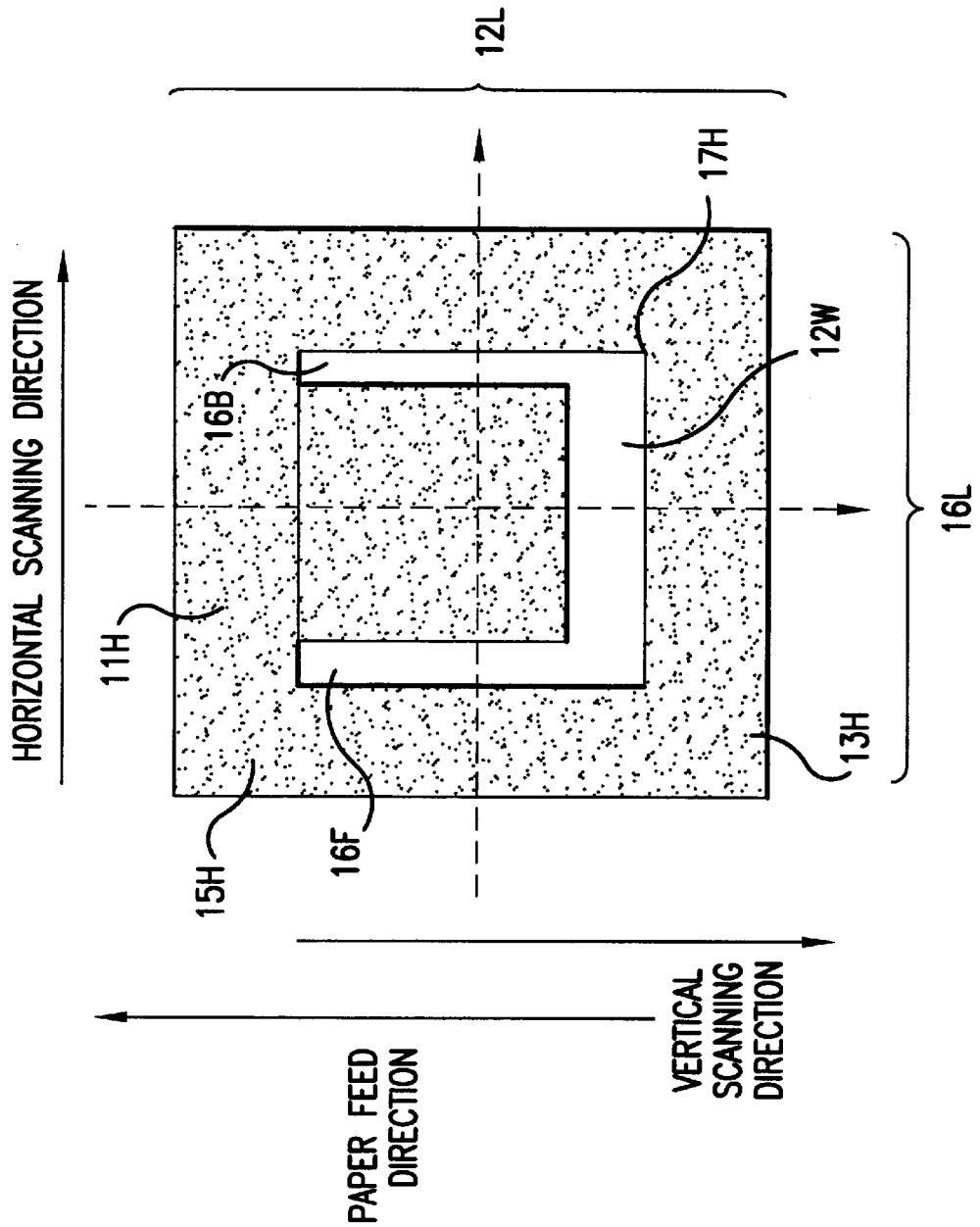

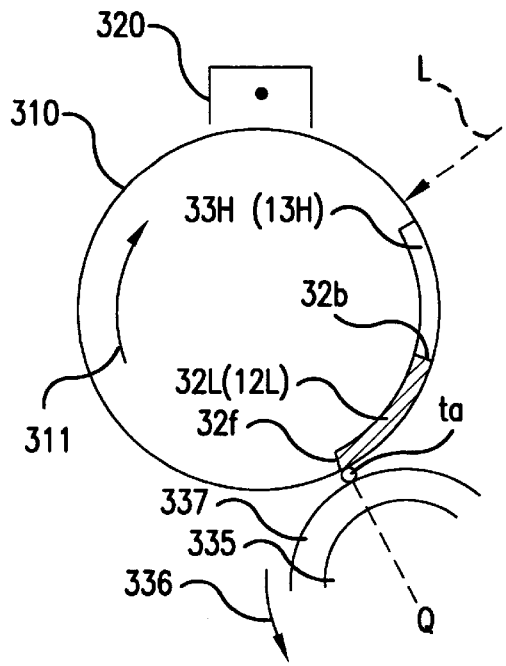
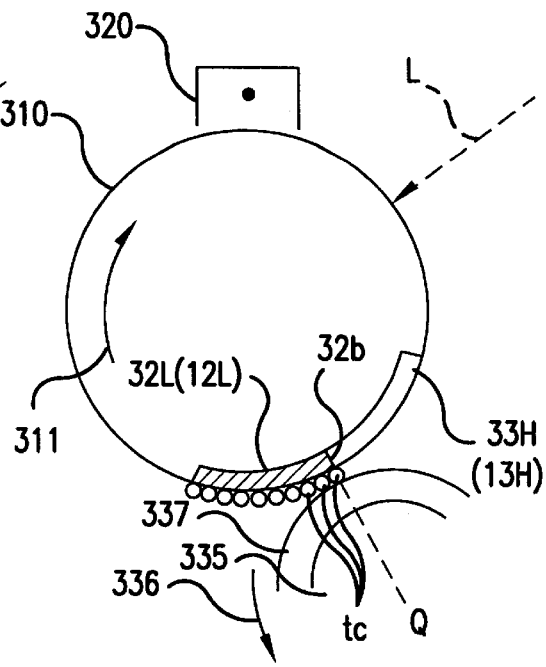
FIG. 16A
FIG. 16B
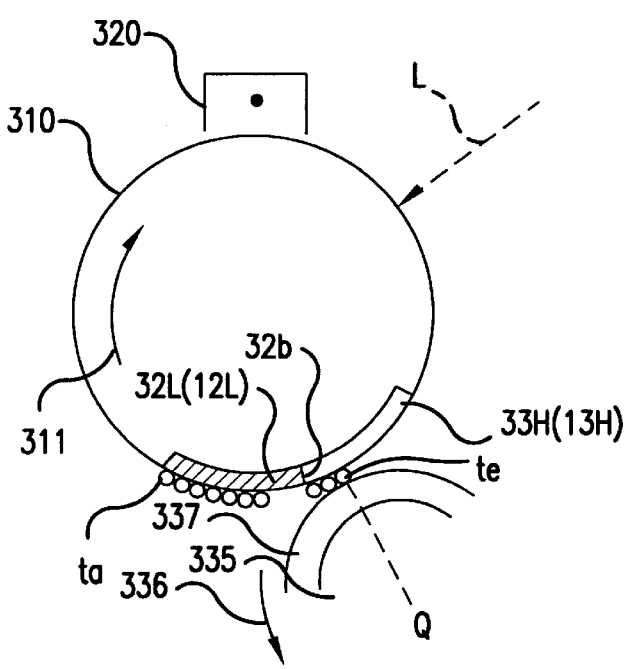
FIG. 16C

6,044,204

IMAGE FORMING APPARATUS AND IMAGE PROCESSOR

BACKGROUND OF THE INVENTION

1. Field of the Invention

The present invention relates to an image forming apparatus such as a digital copying machine, a computer printer and a network printer, and an image processor which is the image processing section of the above image forming apparatus.

2. Description of the Related Art

In many image forming apparatuses such as a digital copying machine, a computer printer and a network printer which are on the market, an electrophotographic method which enables obtaining a high quality of image at a high speed is widely adopted as an image output device.

In the electrophotographic method, an electrostatic latent image on a photoconductive drum is developed by electrifying insulated toner by mixing insulated toner and a magnetic particle in a developing machine, forming a developer on a developing roller by magnetic force in the shape of a brush and supplying the developer onto the photoconductive drum by rotating the developing roller as developing means. A two-component system magnetic brush developing method is widely used and particularly, in a color image forming apparatus, it is more widely adopted. An electrostatic latent image on a photoconductive drum is formed as the strength of electrification potential according to the signal strength of a picture signal by scanning, modulating a laser beam for example according to a picture signal after evenly electrifying an electrostatic latent image on a photoconductive drum.

However, depending upon the strength of electrification potential on a photoconductive drum, toner may behave differently from an aim because of various reasons, an image to be developed is not developed and a so-called void may occur.

SUMMARY OF THE INVENTION

The object of the present invention is to provide an image forming apparatus and an image processor wherein the above problem is avoided.

The present invention disclosed in a first aspect or a ninth aspect relates to preventing the density of a part with low density from being lowered when the density of an output image varies from low density to high density in the vertical scanning direction.

According to the present invention disclosed in the first aspect, an image forming apparatus for forming an image on a recording medium is provided with image obtaining means for obtaining input image data of many picture elements provided with positional information and pixel value information on a recording medium every picture element, edge extracting means for extracting an edge picture element in which the pixel value of the input image data varies from a low density pixel value to a high density pixel value in the vertical scanning direction on the recording medium and correction means for correcting the pixel value of a picture element provided with the low density pixel value of the above input image data based upon positional information and pixel value information with which the extracted edge picture element is provided.

According to the present invention disclosed in the ninth aspect, an image processor for processing image information for forming an image in units of page is provided with image obtaining means for obtaining input image data of many picture elements provided with positional information and pixel value information on a page every picture element, edge extracting means for extracting an edge picture element in which the pixel value of the input image data varies from a low density pixel value to a high density pixel value in the vertical scanning direction on the page and correction means for correcting the pixel value of a picture element provided with the low density pixel value of the above input image data based upon positional information and pixel value information with which the extracted edge picture element is provided.

The present invention disclosed in a fourteenth aspect or a fifteenth aspect relates to preventing the density of a part with low density from being lowered when an output image varies between a part with low density and a part with high density in the horizontal scanning direction.

According to the present invention disclosed in the fourteenth aspect, an image forming apparatus for forming an image on a recording medium is provided image obtaining means for obtaining input image data of many picture elements provided with positional information and pixel value information on a recording medium every picture element, edge extracting means for extracting an edge picture element in which the pixel value of the input image data varies between a low density pixel value and a high density pixel value in the horizontal scanning direction on the recording medium and correction means for correcting the pixel value of a picture element provided with the low density pixel value of the above input image data based upon positional information and pixel value information with which the extracted edge picture element is provided.

According to the present invention disclosed in the fifteenth aspect, an image processor for processing image information for forming an image in units of page is provided with image obtaining means for obtaining input image data of many picture elements provided with positional information and pixel value information on a page every picture element, edge extracting means for extracting an edge picture element in which the pixel value of the input image data varies between a low density pixel value and a high density pixel value in the horizontal scanning direction on the page and correction means for correcting the pixel value of a picture element provided with the low density pixel value of the above input image data based upon positional information and pixel value information with which the extracted edge picture element is provided.

According to the present invention disclosed in a sixteenth aspect, an image forming apparatus for forming an image on a recording medium is provided image obtaining means for obtaining input image data of many picture elements provided with positional information and pixel value information on a recording medium every picture element, edge extracting means for extracting an edge picture element in which the pixel value of the input image data varies from a medium pixel value to a background pixel value in the vertical scanning direction on the recording medium and correction means for correcting the pixel value of a picture element provided with the medium pixel value of the above input image data based upon positional information and pixel value information with which the extracted edge picture element is provided.

According to the present invention disclosed in a twenty-fourth aspect, an image processor for processing image information for forming an image in units of page is provided with image obtaining means for obtaining input image data of many picture elements provided with positional information and pixel value information on a page every picture element, edge extracting means for extracting an edge picture element in which the pixel value of the input image data varies from a medium pixel value to a background pixel value in the vertical scanning direction on the page and correction means for correcting the pixel value of a picture element provided with the medium pixel value of the above input image data based upon positional information and pixel value information with which the extracted edge picture element is provided.

According to the present invention disclosed in a twenty-ninth aspect, an image forming apparatus for forming an image on a recording medium is provided image obtaining means for obtaining input image data of many picture elements provided with positional information and pixel value information on a recording medium every picture element, edge extracting means for extracting an edge picture element on a boundary between a high density pixel value part and a low density pixel value part when the input image data includes the high density pixel value part as an image part consisting of a character or line drawing which is in contact with the low density pixel value part and the pixel value of which varies larger than a predetermined value between the high density pixel value part and the low density pixel value part and correction means for correcting the pixel value of the above low density pixel value part of the above input image data based upon positional information and pixel value information with which the extracted edge picture element is provided.

According to the present invention disclosed in a thirty-second aspect, an image processor for processing image information for forming an image in units of page is provided with image obtaining means for obtaining input image data of many picture elements provided with positional information and pixel value information on a page every picture element, edge extracting means for extracting an edge picture element on a boundary between a high density pixel value part and a low density pixel value part when the input image data includes the high density pixel value part as an image part consisting of a character or line drawing which is in contact with the low density pixel value part and the pixel value of which varies larger than a predetermined value between the above high density pixel value part and the low density pixel value part and correction means for correcting the pixel value of the above low density pixel value part of the above input image data based upon positional information and pixel value information with which the extracted edge picture element is provided.

In the image forming apparatus according to the first aspect or the image processor according to the ninth aspect respectively constituted as described above, input image data provided with positional information and pixel value information on a recording medium or on a page every picture element to the image obtaining means of the above apparatus or processor, or image information is input to the image obtaining means of the above apparatus or processor and the image information is expanded to input image data provided with positional information and pixel value information on a recording medium or on a page every picture element in the image obtaining means.

In the edge extracting means of the above apparatus or processor, an edge picture element in which the pixel value of the input image data obtained by the image obtaining means varies from a low density pixel value to a high density pixel value in the vertical scanning direction on the recording medium or on the page is detected and in the correction means of the above apparatus or processor, the pixel value of a picture element provided with the low density pixel value of the input image data is corrected based upon positional information and pixel value information with which the detected edge picture element is provided.

Therefore, when an output image varies from a low density part to a high density part in the vertical scanning direction, the pixel value of a picture element in the low density part is corrected so that the lowering of density caused when the pixel value of the picture element is not corrected and output on a recording medium is prevented and the corrected pixel value is output on a recording medium in an image output section inside the apparatus or processor or an image output device outside the apparatus or processor. Therefore, the lowering of the density in the low density part is prevented.

In the image forming apparatus according to the fourteenth aspect or the image processor according to the fifteenth aspect respectively constituted as described above, input image data provided with positional information and pixel value information on a recording medium or on a page every picture element is input to the image obtaining means of the apparatus or processor, or image information is input to the image obtaining means of the apparatus or processor and the image information is expanded to input image data provided with positional information and pixel value information on a recording medium or on a page every picture element in the image obtaining means.

In the edge extracting means of the apparatus or processor, an edge picture element in which the pixel value of input image data obtained by the image obtaining means varies between a low density pixel value and a high density pixel value in the horizontal scanning direction on the recording medium or on the page is detected and in the correction means of the apparatus or processor, the pixel value of a picture element provided with the low density pixel value of the input image data is corrected based upon positional information and pixel value information with which the detected edge picture element is provided.

Therefore, when an output image varies between a low density part and a high density part in the horizontal scanning direction, the pixel value of a picture element in the low density part is corrected so that the lowering of the density caused when the pixel value of the picture element is not corrected and output on a recording medium is prevented and the corrected pixel value is output on a recording medium in an image output section inside the apparatus or processor or an image output device outside the apparatus or processor. Therefore, the lowering of the density in a low density part is prevented.

In the image forming apparatus according to the sixteenth aspect or the image processor according to the twenty-fourth aspect respectively constituted as described above, input image data provided with positional information and pixel value information on a recording medium or on a page every picture element is input to the image obtaining means of the apparatus or the processor, or image information is input to the image obtaining means of the apparatus or the processor and is expanded to input image data provided with positional information and pixel value information on a recording medium or on a page every picture element in the image obtaining means.

In the edge extracting means of the apparatus or the processor, an edge picture element in which the pixel value of the input image data obtained by the image obtaining means varies from a medium pixel value to a background pixel value in the vertical scanning direction on a recording medium or on a page is detected and in the correction means of the apparatus or the processor, the pixel value of a picture element provided with the medium pixel value of the input image data is corrected based upon positional information and pixel value information with which the detected edge picture element is provided.

Therefore, when an output image varies from a half tone part to a background part in the vertical scanning direction, the pixel value of a picture element at a rear edge at which the half tone part is in contact with the background part is corrected so that the lowering of density caused when the pixel value of the picture element is not corrected and output on a recording medium can be prevented and the corrected pixel value is output on a recording medium by an image output section in the apparatus or the processor or an image output device outside the apparatus or the processor. Therefore, the lowering of density at a rear edge at which the half tone part is in contact with the background part is prevented.

In the image forming apparatus according to the twenty-ninth aspect or the image processor according to the thirty-second aspect respectively constituted as described above, input image data provided with positional information and pixel value information on a recording medium or on a page every picture element is input to the image obtaining means of the apparatus or the processor, or image information is input to the image obtaining means of the apparatus or the processor and is expanded to input image data provided with positional information and pixel value information on a recording medium or on a page every picture element in the image obtaining means.

In the edge extracting means of the apparatus or the processor, an edge picture element on a boundary between a high density pixel value part and a low density pixel value part when the input image data obtained by the image obtaining means includes the high density pixel value part as an image part consisting of a character or line drawing which is in contact with the low density pixel value part and the pixel value of which varies larger than a predetermined value between the high density pixel value part and the low density pixel value part is detected and in the correction means of the apparatus or the processor, the pixel value of a picture element provided with the pixel value of the low density pixel value part in the input image data is corrected based upon positional information and pixel value information with which the detected edge picture element is provided.

Therefore, when an output image is in contact with a low density part and includes a high density character/line drawing part, the pixel value of a picture element in the low density part is corrected so that the lowering of density caused when the pixel value of the picture element is not corrected and output on a recording medium can be prevented and the corrected pixel value is output on a recording medium by an image output section in the apparatus or the processor or an image output device outside the apparatus or the processor. Therefore, the lowering of density on a boundary which is in contact with a character/line drawing part in the low density part is prevented.

BRIEF DESCRIPTION OF THE DRAWINGS

FIG. 16 shows a cause of the lowering of density which is to be solved by the present invention;

DESCRIPTION OF THE PREFERRED EMBODIMENTS

First Embodiment . . . FIG. 1 to FIG. 10

Figure 15A:
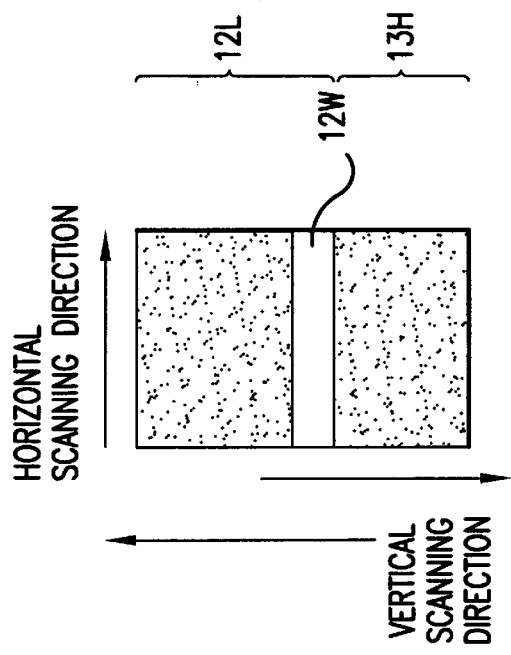
FIG. 15 shows a state in which density is lowered, which is to be solved by the present invention.
Figure 15B:
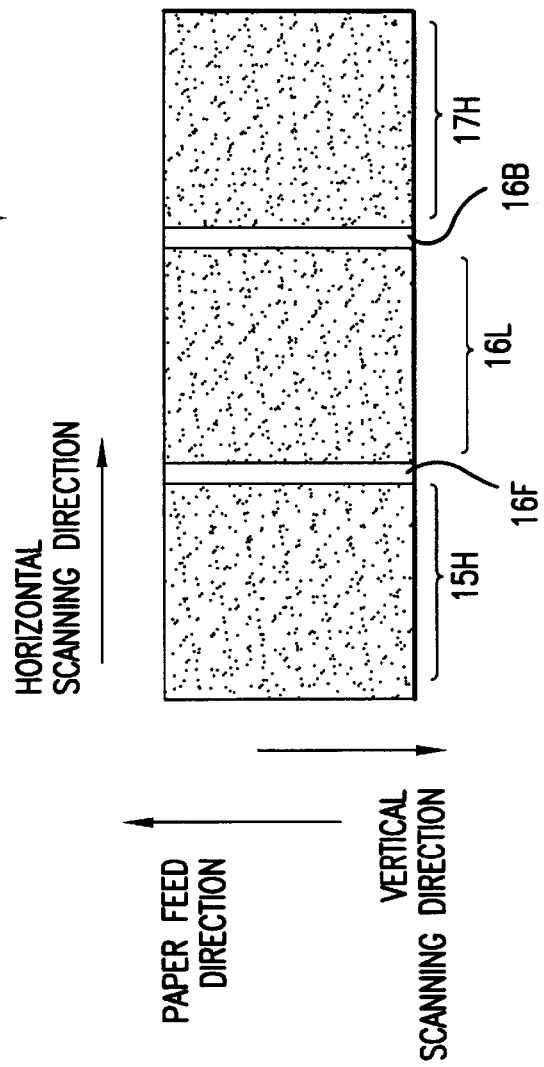

A cause in which a void is caused is as follows: As shown in FIG. 15A, when an output image varies from a low density part 12L to a high density part 13H in a vertical scanning direction that is perpendicular to a horizontal scanning direction which is a scanning direction by a beam for forming an electrostatic latent image on a photoconductive drum and that is the direction reverse to a paper feed direction, the density of an edge 12W at the rear of the low density part 12L which is in contact with the high density part 13H is lowered for the following cause:

Also, as shown in FIG. 15B, when an output image varies among a low density part 16L and high density parts 15H and 17H in the horizontal scanning direction, the density of the edges 16F and 16B of the low density part 16L which are in contact with the high density parts 15H and 17H is lowered for the following cause:

In an electrophotographic method by a two-component magnetic brush developing system, as shown in FIG. 16, a photoconductive drum 310 is electrified by an electrifier 320 for forming an electrostatic latent image by rotating the photoconductive drum 310 in the direction shown by an arrow 311, an electrostatic latent image is formed on the photoconductive drum 310 by radiating a laser beam L modulated by a picture signal on the electrified photoconductive drum 310, when the photoconductive drum 310 on which the electrostatic latent image is formed comes into contact with a developer layer 337 on the surface of a developing sleeve 335 rotated in the direction shown by an arrow 336 at linear velocity approximately twice as fast as the linear velocity of the photoconductive drum 310, toner in the developer layer 337 adheres to the part of the latent image on the photoconductive drum 310 and the electrostatic latent image on the photoconductive drum 310 is developed to be a toner image.

FIG. 16A shows a moment in which the latent image part 32L of the low density part 12L is formed on the photoconductive drum 310 by radiating a laser beam L and the front edge 32f comes into contact with the developer layer 337, FIG. 16B shows a moment in which the rear edge 32b of the latent image part 32L comes into contact with the developer layer 337 and FIG. 16C shows a moment in which the latent image part 33H on a little rear side of the rear edge 32b of the latent image part 32L of the high density part 13H comes into contact with the developer layer 337.

For example, 500 V developing bias is applied to the developing sleeve 335. The photoconductive drum 310 is electrified by the electrifier 320 at the potential of 650 V for example the absolute value of which is larger than the potential of the developing bias and the latent image part 32L of the low density part 12L is set to 300 V for example the absolute value of which is smaller than the potential of the developing bias. The latent image part 33H of the high density part 13H at the rear of the low density part 12L is set to 200 V for example the absolute value of which is smaller than the potential of the latent image part 32L of the low density part 12L.

When the front edge 32f of the latent image part 32L comes into contact with the developer layer 337 as shown in FIG. 16A, a developing electric field in a forward direction is applied to toner ta which exists in a position Q in which the photoconductive drum 310 and the developer layer 337 come in contact and the toner ta adheres on the latent image part 32L. Afterward, the toner adheres on the latent image part 32L of the low density part 12L as shown in FIG. 16B until the rear edge 32b of the latent image part 32L comes into contact with the developer layer 337. Toner tc means toner which adheres to a rear edge of the latent image part 32L which is in contact with the latent image part 33H equivalent to the rear edge 12W of the low density part 12L which is in contact with the high density part 13H.

However, after time shown by FIG. 16B, the latent image part 33H of the high density part 13H comes into contact with the developer layer 337. As the potential of the latent image part 33H is smaller than that of the latent image part 32L in an absolute value and a larger developing electric field in the forward direction is applied between the latent image part 33H and the developer layer 337, a large quantity of toner adheres to the latent image part 33H.

Therefore, in a part in the vicinity of the position Q in which the photoconductive drum 310 and the developer layer 337 come in contact in the developer layer 337, a magnetic particle covered with toner is exposed and toner tc which once adheres to the rear edge of the latent image part 32L which is in contact with the latent image part 33H as shown in FIG. 16B is pulled back in the developer layer 337 by the potential of the magnetic particle.

Therefore, as shown as a part in which no toner exists in FIG. 16C (it does not necessarily means that no toner exists and FIG. 16C shows a simplified state), the quantity of toner at the rear edge of the latent image part 32L which is in contact with the latent image part 33H is decreased and the density of the rear edge 12W which is in contact with the high density part 13H as shown in FIG. 15A is lowered. Toner te which adheres to the latent image part 33H of the high density part 13H is more than toner ta which adheres to the latent image part 32L of the low density part 12L, however, in FIG. 16C, toner te and toner ta are shown as the same quantity for convenience.

As described above, the lowering of density at the rear edge 12W of the low density part 12L which is in contact with the high density part 13H is caused by potential difference between the latent image part 32L of the low density part 12L and the latent image part 33H of the high density part 13H. In fact, when the difference of density between the low density part 12L and the high density part 13H is 10% or more in the rate of the area of a dot, density at the rear edge 12W of the low density part 12L which is in contact with the high density part 13H is lowered because toner is pulled back as described above.

The more the difference of density is, the more density at the rear edge 12W is lowered and the wider the range of the rear edge 12W at which density is lowered is also.

As the lowering of density at the rear edge 12W of the low density part 12L, that is, the decrease of tone quantity at the rear edge of the latent image part 32L is caused by toner which adheres to the rear edge of the latent image part 32L being pulled back in the developer layer 337 by the small potential in an absolute value of the latent image part 33H of the high density part 13H continuing immediately after the low density part 12, density at the front edge of the low density part which is in contact with the high density part is not lowered even if an output image varies reversely from the high density part to the low density part in the vertical scanning direction.

Also, a case in which an output image varies among the low density part 16L and high density parts 15H and 17H in the horizontal scanning direction as shown in FIG. 15B is a case in which the latent image part the absolute value of which is relatively large of the low density part 16L and the latent image parts the absolute values of which are relatively small of the high density parts 15H and 17H are adjacent on the photoconductive drum 310 in the direction of the shaft of the photoconductive drum 310, that is, in the direction perpendicular to the surface of paper in FIG. 16 though not shown in FIG. 16.

In this case, both when an output image varies from the high density part 15H to the low density part 16L and conversely when it varies from the low density part 16L to the high density part 17H, the quantity of toner at the edges of the latent image part of the low density part 16L which are in contact with the respective latent image parts of the high density parts 15H and 17H is decreased by toner which once adheres to the edges of the latent image part of the low density part 16L which are in contact with the respective latent image parts of the high density parts 15H and 17H being pulled back in the developer layer 337 and as shown in FIG. 15B, density at the edges 16F and 16B of the low density part 16L which are in contact with the high density parts 15H and 17H is lowered.

As described above, in the electrophotographic method by the two-component magnetic brush developing system, there is a tendency that when an output image varies from the low density part 12L to the high density part 13H in the vertical scanning direction, density at the rear edge 12W of the low density part 12L which is in contact with the high density part 13H is lowered by toner which adheres on the photoconductive drum 310 being pulled back in the developer layer 337 or when an output image varies among the low density part 16L and the high density parts 15H and 17H in the horizontal scanning direction, density at the edges 16F and 16B of the low density part 16L which are in contact with the high density parts 15H and 17H is lowered. In this specification, the above lowering of density is called starvation.

A concept that the contrast of a developing electric field is enhanced and the lowering of density (starvation) is prevented by enhancing the precision of a laser beam scanner for writing an electrostatic latent image on a photoconductive drum by a laser beam and adjusting the parameter of developing means for developing the electrostatic latent image is disclosed in Japanese Published Unexamined Patent Applications No. Hei 5-281790 and No. Hei 6-87234.

However, a method of enhancing the contrast of a developing electric field by enhancing the precision of a laser beam scanner which is means for writing an electrostatic latent image causes the expansion of an image output section and the increase of the cost. In addition, as the contrast of a developing electric field is lowered and the lowering of density (starvation) is more readily caused if screen ruling is increased in the image output section to enhance the resolution of an output image, the compatibility of enhancing the contrast of a developing electric field and enhancing the resolution of an output image is difficult in the present circumstances.

Recently, as a computer printer and a network printer are popularized, an occasion in which a graphic image made by a host computer for a personal computer and others is printed tends to increase. In such a graphic image, the lowering of density (starvation) is remarkable, compared with a natural image such as a photograph. Therefore, for an image forming apparatus such as a computer printer and a network printer, the lowering of density (starvation) is a larger problem than for an image forming apparatus such as a copying machine.

For a method of correcting the linear symmetrical output characteristic such as MTF characteristic of an image output section, a method of correcting input image data by digital filter processing is widely used. However, the lowering of density (starvation) based upon the non-linear and asymmetrical output characteristic of the image output section cannot be reduced or prevented by digital filter processing as described above.

According to embodiments of the present invention, the lowering of the density of a low density part when an output image varies from the lower density part to a high density part in the vertical scanning direction or the lowering of density of a low density part when an output image varies among the low density part and high density parts in the horizontal scanning direction can be prevented without expanding an image forming apparatus or an image output device or increasing the cost.

Figure 1:
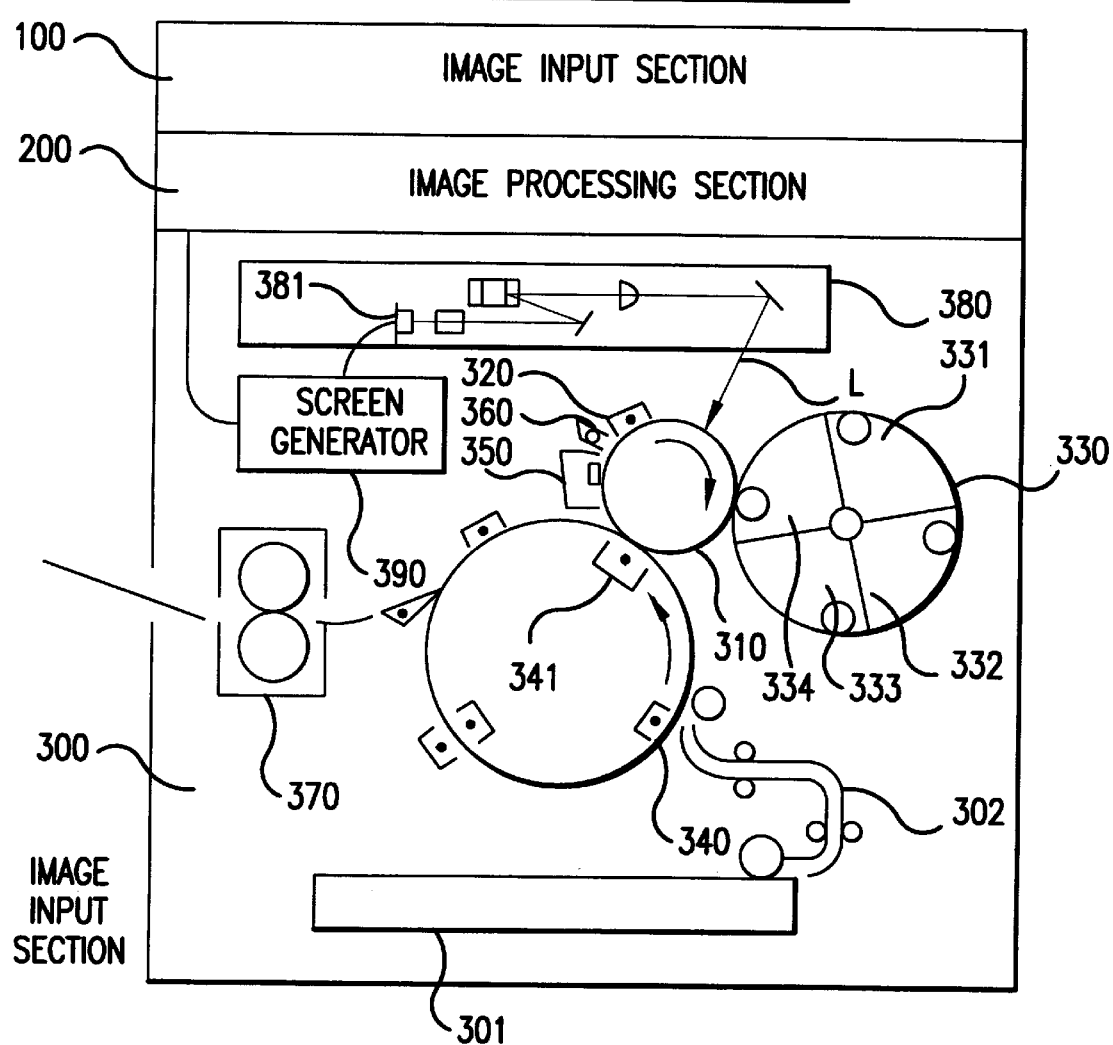
FIG. 1 shows the overall constitution of a digital color copying machine as an example of an image forming apparatus according to the present invention.

FIG. 1 shows the overall constitution of a digital color copying machine wherein an example of an image processor according to the present invention is mounted as an example of an image forming apparatus according to the present invention. The image forming apparatus in this embodiment, that is, the copying machine is provided with an image input section 100, an image processing section 200 and an image output section 300. In the image input section 100, an image on a manuscript is read at the resolution of 16 pixels/mm (400 pixels/inch) for example by a scanner consisting of CCD sensor and others and an input picture signal consisting of 8-bit 256-scale digital data per each color of red (R), green (G) and blue (B) can be obtained.

The image processing section 200 is an example of the image processor according to the present invention, in the image processing section 200, an image recording signal consisting of 8-bit 256-scale digital data per each color of yellow (Y), magenta (M), cyan (C) and black (K) which are colors recorded in the image output section 300 is generated based upon the input picture signal from the image input section 100 and as described later, the pixel value of the image recording signal is corrected.

Figure 2:
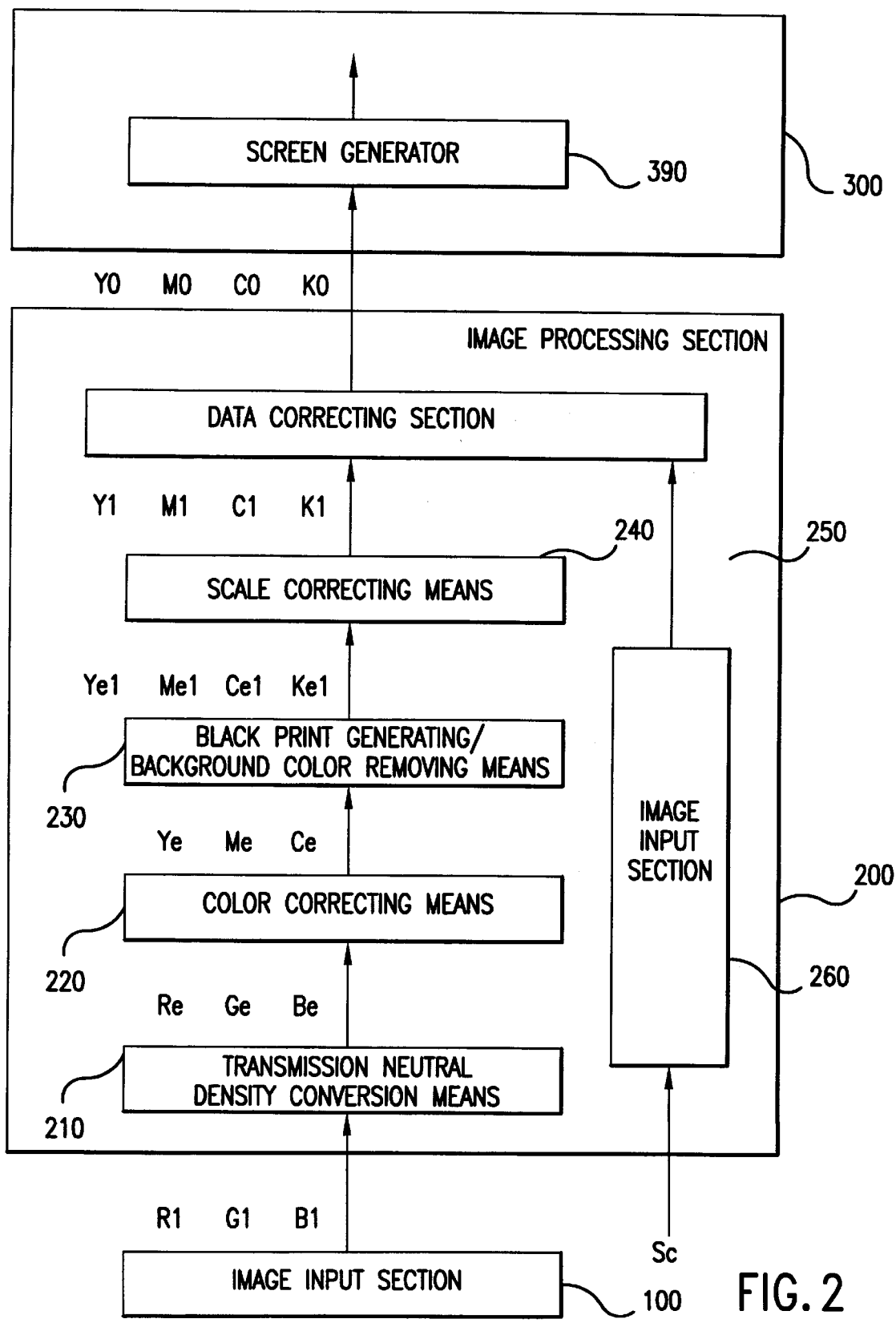
FIG. 2 shows an example of an image processing section in the copying machine shown in FIG. 1.

FIG. 2 shows an example of the image processing section 200, signals Ri, Gi and Bi of three colors R, G and B from the image input section 100 are converted to signals Re, Ge and Be of transmission neutral density by transmission neutral density conversion means 210, the signals Re, Ge an Be of transmission neutral density are converted to signals Ye, Me and Ce of three colors Y, M and C of transmission neutral density by color correcting means 220, the signals Ye, Me and Ce of transmission neutral density are converted to signals Yei, Mei and Cei of the three colors Y, M and C the color of a background of which is removed and a signal Kei of black by black print generating/background color removing means 230, the respective scales of the signals Yei, Mei, Cei and Kei are corrected by scale correcting means 240 and their signals are converted to a picture signal consisting of signals Yi, Mi, Ci and Ki of four colors Y, M, C and K.

These signals Yi, Mi, Ci and Ki are supplied to a data correcting section 250 as input image data and the respective pixel values of their signals are corrected as described later. In this embodiment, a chrominance signal Sc from an external device such as a computer is input to the image processing section 200 via an external equipment interface 260, supplied to the data correcting section 250 and the pixel value is corrected as the signals Yi, Mi, Ci and Ki.

Signals Yo, Mo, Co and Ko of the four colors Y, M, C and K which are sent from the data correcting section 250 and the respective pixel values of which are corrected are supplied to the image output section 300 as output image data from the image processing section 200.

For the transmission neutral density conversion means 210 and the scale correcting means 240, for example, one-dimensional look-up table is used. For color correcting means 220, a linear masking method by matrix operation of "3×3" which is normally often used can be utilized, however, a non-linear masking method such as "3×6" and "3×9" may be also used. For the black print generating/background color removing means 230, a skeleton UCR method which is normally often used may be also used. However, in any case, other well-known methods may be also used.

The image output section 300 complies with the electrophotographic method and the two-component magnetic brush developing system. As shown in FIGS. 1 and 2, the image output section 300 is provided with a screen generator 390 and image data output from the image processing section 200 is converted to a binary signal the pulse length of which is modulated according to the pixel value, that is, a screen signal by the screen generator 390.

As shown in FIG. 1, in the image output section 300, a laser diode 381 of the laser beam scanner 380 is operated by a screen signal from the screen generator 390, a laser beam L is obtained from the laser diode 381, that is, from the laser beam scanner 380 and the laser beam L is radiated on the photoconductive drum 310.

The photoconductive drum 310 is electrified by the electrifier 320 for forming an electrostatic latent image and an electrostatic latent image is formed on the photoconductive drum 310 by radiating a laser beam L from the laser beam scanner 380.

The electrostatic latent image of each color formed on the photoconductive drum 310 is developed to a toner image by touching developing sections 331, 332, 333 and 334 for the four colors Y, M, C and K of a developing roller 330 to the photoconductive drum 310 on which the electrostatic latent image is formed. The above is already described, referring to FIG. 16.

Paper on a paper tray 301 is fed onto a transfer drum 340 by a feeder 302, is wound on the drum and the developed toner image on the photoconductive drum 310 is transferred on the paper by applying corona discharge from the back face of the paper by a transfer electrifier 341. If an output image is a multicolor image, the image of plural colors of the four colors Y, M, C and K is multiply transferred by touching paper to the photoconductive drum 310 twice to four times repeatedly.

The paper after transfer is fed to a fixing device 370 and the toner image is fixed on the paper by heating and melting. After the toner image is transferred on the paper, the photoconductive drum 310 is cleaned by a cleaner 350 and is made ready again by a pre-exposer 360.

In the concrete, in this embodiment, the laser beam scanner 380 using a laser beam L the beam diameter in the horizontal scanning direction of which and the beam diameter in the vertical scanning direction of which are both 64 $\mu$m is used. For a developer, a developer in which insulated toner the mean particle diameter of which is 7 $\mu$m and a magnetic particle (a ferrite carrier) the mean particle diameter of which is 50 $\mu$m are mixed is used and the density of toner is set to 7%.

For magenta toner, the one in which C. I. pigment red '57 to 1' 4 weight, an antistatic agent 4 weight and an additive are added to polyester main binder 100 weight is used. For cyan toner, the one in which C. I. pigment blue '15 to 3' 4 weight, an antistatic agent 4 weight and an additive are added to polyester main binder 100 weight is used. For yellow toner, the one in which C. I. pigment yellow '17' 4 weight, an antistatic agent 4 weight and an additive are added to polyester main binder 100 weight is used. For black toner, the one in which carbon black 4 weight, an antistatic agent 4 weight and an additive are added to polyester main binder 100 weight is used.

In the image forming apparatus in this embodiment, that is, the copying machine, as shown in FIG. 10A, it is tried that a patch of a low density area of 40% in input dot area ratio which is a rectangle shown by a low density part 12L in the vertical scanning direction and a low density part 16L in the horizontal scanning direction and which is surrounded by a high density area of 100% in input dot area ratio which is a frame consisting of high density parts 11H, 13H, 15H and 17H is output in only magenta with screen ruling in the screen generator 390 set to 400 lines/inch without correcting a pixel value in the data correcting section 250 of the image processing section 200.

Figure 10B:
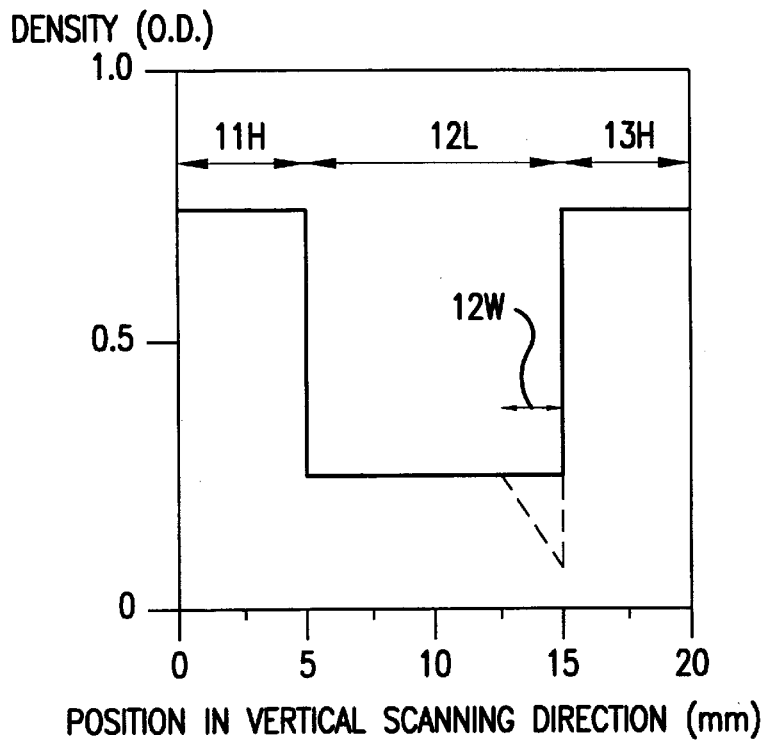
FIG. 10 shows a state in which density is lowered, which is to be solved by the present invention and that the lowering of density is prevented by the present invention.
Figure 10C:
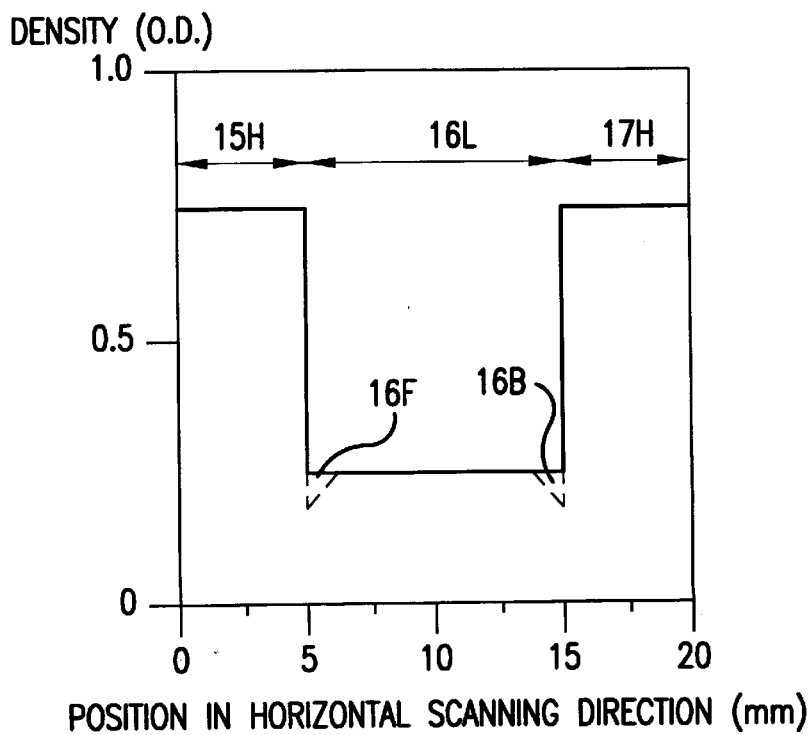

As a result, in the vertical scanning direction, as shown as an area 12W in FIG. 10A and by a broken line in FIG. 10B, the density of the rear edge 12W of the low density part 12L which is in contact with the high density part 13H is lowered, and in the horizontal scanning direction, as shown as areas 16F and 16B in FIG. 10A and by a broken line in FIG. 10C, the density of the edges 16F and 16B of a low density part 16L which are in contact with the high density parts 15H and 17H is lowered. However, in FIG. 10B, density is measured in a position of a longitudinal chain arrow in FIG. 10A and in FIG. 10C, density is measured in a position of a horizontal chain arrow in FIG. 10A.

In this case, the range in which density is lowered is wider and the degree in which density is lowered is also larger in the rear edge 12W in the vertical scanning direction than in the edges 16F and 16B in the horizontal scanning direction. It proves that when screen ruling in the screen generator 390 is increased, the lowering of density is more remarkable.

If the beam diameter in the horizontal scanning direction of a laser beam L used in the laser beam scanner 380 is set to 20 $\mu$m, the lowering of the density of the rear edge 12W in the vertical scanning direction and the edges 16F and 16B in the horizontal scanning direction is reduced. However, the laser beam scanner 380 is large-sized and the cost is increased. Also, if screen ruling is increased, the lowering of the density of the rear edge 12W and the edges 16F and 16B cannot be reduced to an extent that the lowering is not perceived even if the beam diameter in the horizontal scanning direction of a laser beam L is reduced.

Figure 3:
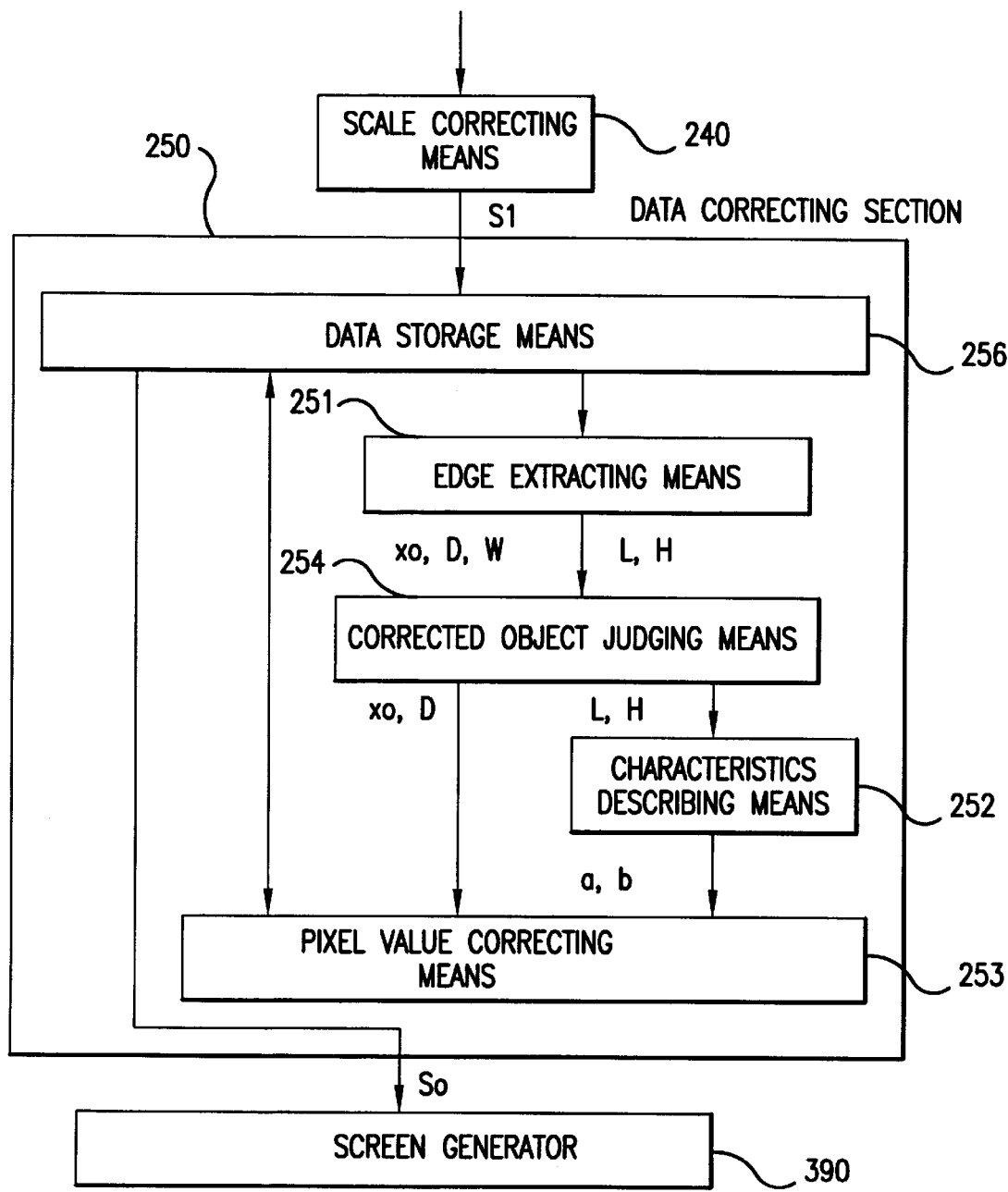
FIG. 3 shows an example of a data correcting section in the image processing section shown in FIG. 2.

However, in this embodiment, in the data correcting section 250 in the image processing section 200, the pixel value of input image data from the scale correcting means 240 is corrected. FIG. 3 shows a concrete example of the data correcting section 250 and the data correcting section 250 is constituted by data storage means 256, edge extracting means 251, corrected object judging means 254, characteristics describing means 252 and pixel value correcting means 253.

In the data storage means 256, input image data Si from the scale correcting means 240 is stored for one page, after storage, first, image data for the one page is read one picture element at a time in the horizontal scanning direction and the read image data is supplied to the edge extracting means 251 and the pixel value correcting means 253. Next, image data for one page is read one picture element at a time in the vertical scanning direction and the read image data is supplied to the edge extracting means 251 and the pixel value correcting means 253. However, the data storage means may be also set so that image data for some lines is read one picture element at a time in the horizontal scanning direction and in the vertical scanning direction.

The edge extracting means 251 extracts a point at which the pixel value of image data read in the horizontal scanning direction from the data storage means 256 varies larger than a predetermined pixel value within a predetermined number of picture elements as an edge picture element in the horizontal scanning direction and extracts a point at which the pixel value of image data read in the vertical scanning direction from the data storage means 256 varies larger than a predetermined pixel value within a predetermined number of picture elements as an edge picture element in the vertical scanning direction.

Figure 4:
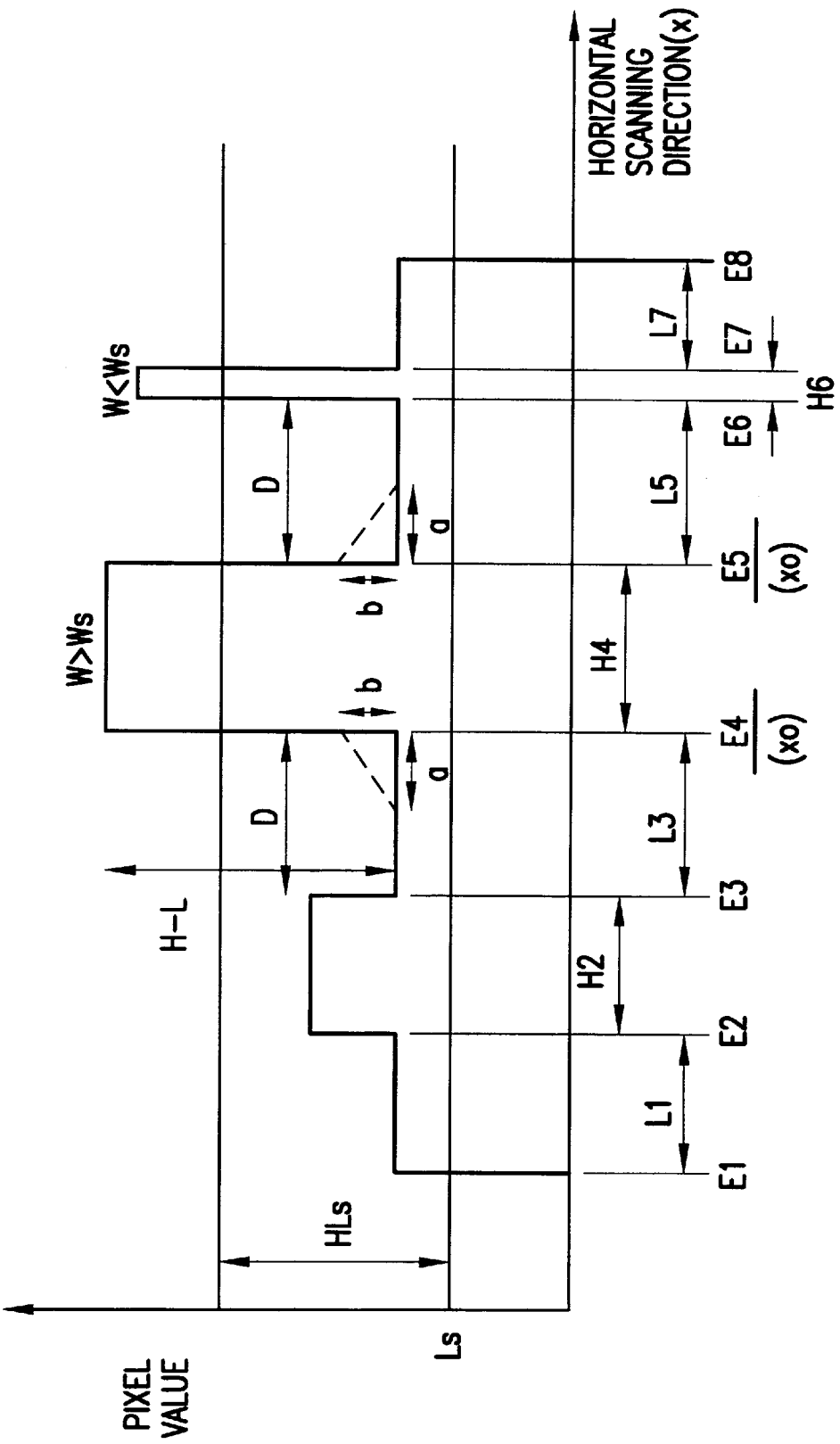
FIG. 4 explains an edge picture element extracted by edge extracting means in the data correcting section shown in FIG. 3.
Figure 5:
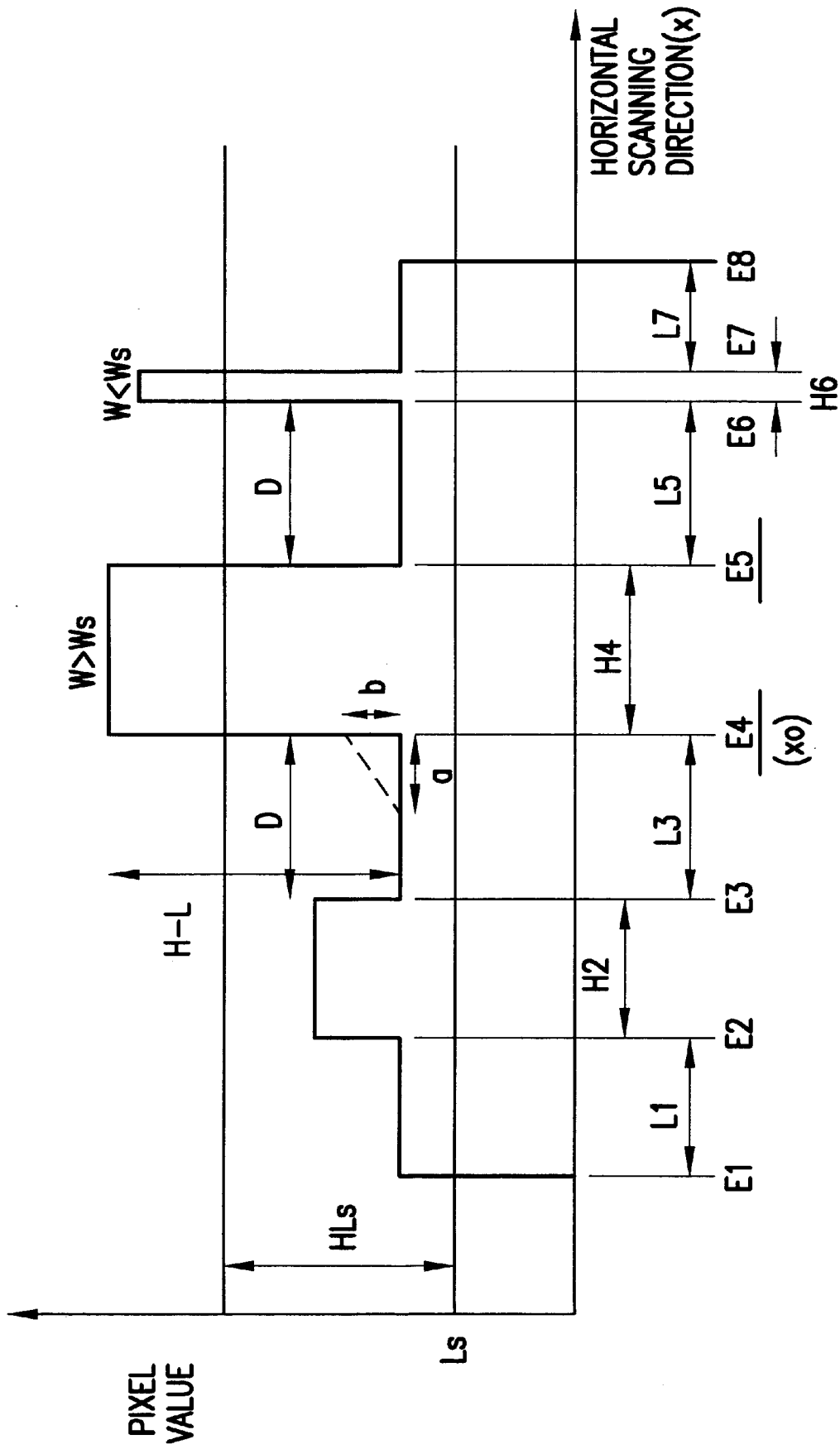
FIG. 5 explains an edge picture element extracted by the edge extracting means in the data correcting section shown in FIG. 3.

For example, when the pixel value of image data read in the horizontal scanning direction varies as shown in FIG. 4, points E1 to E8 are extracted as edge picture elements in the horizontal scanning direction and when the pixel value of image data read in the vertical scanning direction varies as shown in FIG. 5, the points E1 to E8 are extracted as edge picture elements in the vertical scanning direction.

In this case, the edge extracting means 251 detects the position xo of a picture element on the side of relatively low density of the above point as an edge picture element and detects the pixel value L (the pixel value of the edge picture element) on the side of low density and the pixel value H on the side of high density. Further, the edge extracting means 251 detects the number D of picture elements in a low density part including the edge picture element and detects the number W of picture elements in a part in which a pixel value is stable in a high density part.

The edge extracting means 251 sends the position xo of the edge picture element, the low density part pixel value L, the high density part pixel value H, the number D of picture elements in the low density part and the number W of picture elements in the part in which a pixel value is stable in the high density part to the corrected object judging means 254.

The corrected object judging means 254 judges and detects edge picture elements which lower density in a low density part as described above and therefore, the pixel value of the low density part of which is to be corrected of edge picture elements extracted by the edge extracting means 251 based upon the low density part pixel value L, the high density part pixel value H and the number W of picture elements in the part in which a pixel value is stable in the high density part respectively sent from the edge extracting means 251.

In the concrete, as to an edge picture element in the horizontal scanning direction, if the following three conditions, (1) a condition that the low density part pixel value L is larger than a predetermined value Ls, (2) a condition that the difference (H–L) between the high density part pixel value H and the low density part pixel value L is larger than a predetermined value HLs and (3) a condition that the number W of picture elements in the part in which a pixel value is stable in the high density part is larger than a predetermined number Ws of picture elements are met, the edge picture element is judged to be an edge picture element the pixel value of the low density part of which is to be corrected.

Also, as to an edge picture element in the vertical scanning direction, if the following four conditions, (1) a condition that the low density part pixel value L is larger than a predetermined value Ls, (2) a condition that the difference (H–L) between the high density part pixel value H and the low density part pixel value L is larger than a predetermined value HLs, (3) a condition that the number W of picture elements in the part in which a pixel value is stable in the high density part is larger than a predetermined number Ws of picture elements and (4) a condition that the edge picture element is an edge picture element at a point at which an output image varies from a low density part to a high density part are met, the edge picture element is judged to be an edge picture element the pixel value of the low density part of which is to be corrected.

In an image forming apparatus according to an electrophotographic method, it is generally difficult that a picture element the dot area ratio of which is smaller than 5% is reproduced by the image output section. Therefore, when the pixel value of a low density part is smaller than 5% in dot area ratio, the lowering of the density of the low density part does not need to be considered. Therefore, the above condition in (1) is set. Therefore, the predetermined value Ls is set to 5% in the scale of the pixel value.

As described above, when the difference of density between a high density part and a low density part is 10% or more in dot area ratio, toner is pulled back from the photoconductive drum 310 into the developer layer 337 and the density of the edge of the low density part which is in contact with the high density part is lowered. Therefore, the above condition in (2) is set. Therefore, the predetermined value HLs is set to 10% in the scale of the respective pixel values.

Therefore, a low density part the pixel value of which is to be corrected means a low density part the pixel value is 5 to 90% in the scale and a high density part the pixel value of which is to be corrected means a high density part the pixel value of which is 15 to 100% in the scale.

The above condition in (3) is set because the effect of latent image potential in a high density part is small, toner is hardly pulled back and the density of a low density part is hardly lowered when the number W of picture elements in a part in which a pixel value is stable in the high density part is smaller than a number of picture elements.

The above condition in (4) is set because as described above, density is not lowered at the front edge of a low density part which is in contact with a high density part when an output image varies from the high density part to the low density part in the vertical scanning direction.

As to a case shown in FIG. 4, as the points E1 and E8 do not meet the condition in (1), the points E2 and E3 do not meet the condition in (2) and the points E6 and E7 do not meet the condition in (3), they are not judged and detected as an edge picture element the pixel value of the low density part of which is to be corrected. As only the points E4 and E5 meet all the conditions in (1) to (3), they are judged and detected as an edge picture element the pixel value of the low density part of which is to be corrected.

As to a case shown in FIG. 5, as the points E1 and E8 do not meet the condition in (1), the points E2 and E3 do not meet the condition in (2), the points E6 and E7 do not meet the condition in (3) and the point E5 does not meet the condition in (4), they are not judged and detected as an edge picture element the pixel value of the low density part of which is to be corrected. As only the point E4 meets all the conditions in (1) to (4), it is judged and detected as an edge picture element the pixel value of the low density part of which is to be corrected.

The corrected object judging means 254 sends the position xo of an edge picture element which is judged and detected as a corrected object as described above and the number D of picture elements in the low density part to the pixel value correcting means 253 and sends the low density part pixel value L and the high density part pixel value H to the characteristics describing means 252.

The characteristics describing means 252 is constituted by the look-up tables (hereinafter called LUT) for correcting the horizontal scanning direction and correcting the vertical scanning direction, beforehand, the characteristics of the lowering of density caused in a low density part when an output image varies between the low density part and a high density part in the horizontal scanning direction are described in LUT for correcting the horizontal scanning direction and the characteristics of the lowering of density caused in a low density part when an output image varies from the low density part to a high density part in the vertical scanning direction are described in LUT for correcting the vertical scanning direction.

As described above, the lowering of the density of a low density part in the horizontal scanning direction and the lowering of the density of a low density part in the vertical scanning direction are different in the range and quantity in which density is lowered. The lowering of the density of a low density-part is caused by the latent image potential of the low density part and that of a high density part on the photoconductive drum 310, the lowering of the density of the low density part is not uniquely determined by only either of the pixel value of the low density part or that of the high density part and is determined depending upon both the pixel value of the low density part and that of the high density part.

In the characteristics describing means 252, LUT for correcting the horizontal scanning direction and LUT for correcting the vertical scanning direction are provided as described above and in the respective LUTs, the relationship between the number a of picture elements to be corrected and pixel value corrected quantity b in relation to a low density part pixel value L (the pixel value of an edge picture element) and a high density part pixel value H before and after the edge picture element is stored.

The number a of picture elements to be corrected is equivalent to the range in which the density of a low density part is lowered and the pixel value corrected quantity b is equivalent to the quantity in which density is lowered at an edge picture element included in a low density part. The pixel value corrected quantity b is determined based upon the quantity of toner which is pulled back from on the photoconductive drum 310 into the developer layer 337 on the surface of the developing sleeve 335 as shown in FIG. 16. In the concrete, the pixel value corrected quantity is determined based upon the quantity of toner pulled back from on the photoconductive drum 310 into the developer layer 337 every developer layer part determined every a predetermined turning angle in the rotational direction of the developing sleeve 335.

When the horizontal scanning direction is corrected, LUT for correcting the horizontal scanning direction is referred, when the vertical scanning direction is corrected, LUT for correcting the vertical scanning direction is referred, the number a of picture elements to be corrected and the pixel value corrected quantity b corresponding to a low density part pixel value L and a high density part pixel value H are read from the corresponding LUT based upon the low density part pixel value L and the high density part pixel value H respectively sent from the corrected object judging means 254 and the read number a of picture elements to be corrected and pixel value corrected quantity b are supplied to the pixel value correcting means 253.

Figure 6A:
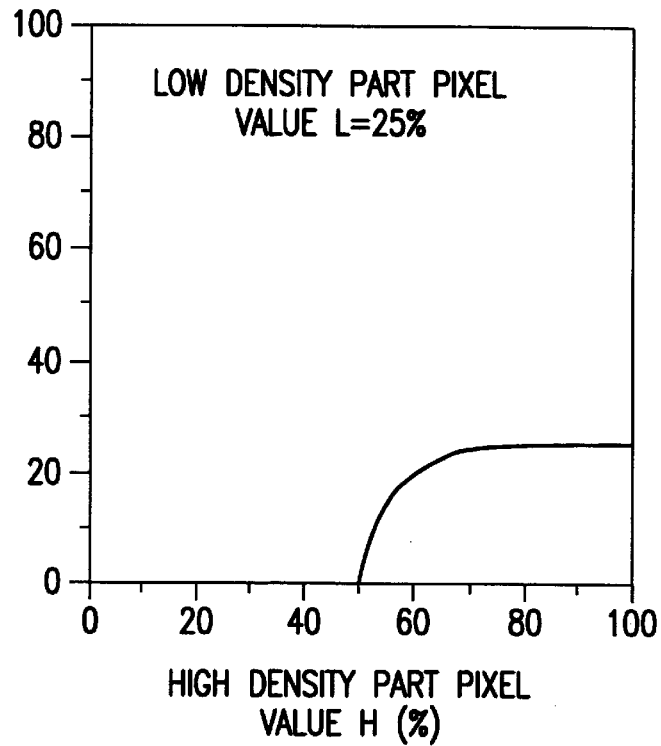
FIG. 6 shows an example of the contents described by characteristics describing means in the data correcting section shown in FIG. 3.
Figure 6B:
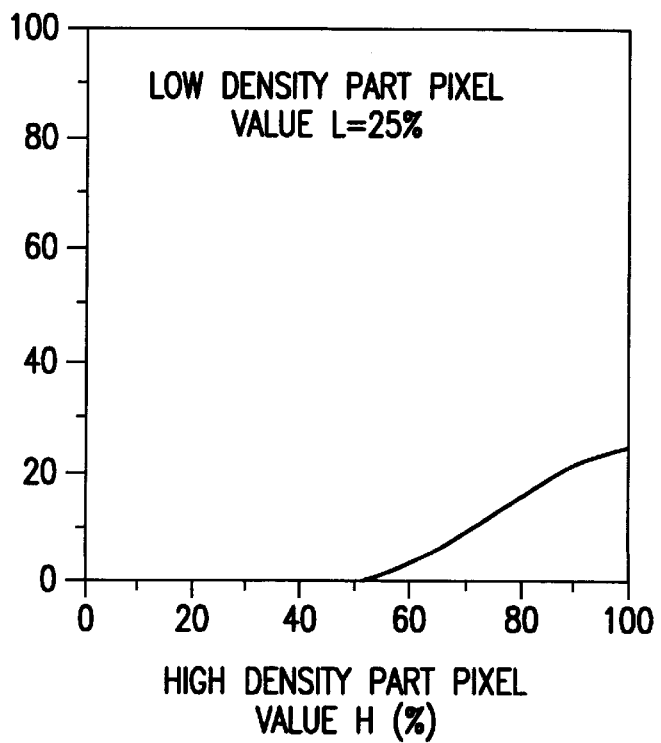

For the concrete example, as to LUT for correcting the vertical scanning direction, LUT in which the number a of picture elements to be corrected related to a high density part pixel value H (dot area ratio) is shown every low density part pixel value L (dot area ratio) as shown in FIG. 6A and LUT in which pixel value corrected quantity b (dot area ratio) related to a high density part pixel value H (dot area ratio) is shown every low density part pixel value L (dot area ratio) as shown in FIG. 6B are provided and as to LUT for correcting the horizontal scanning direction, the similar LUTs are also provided.

Figure 7:
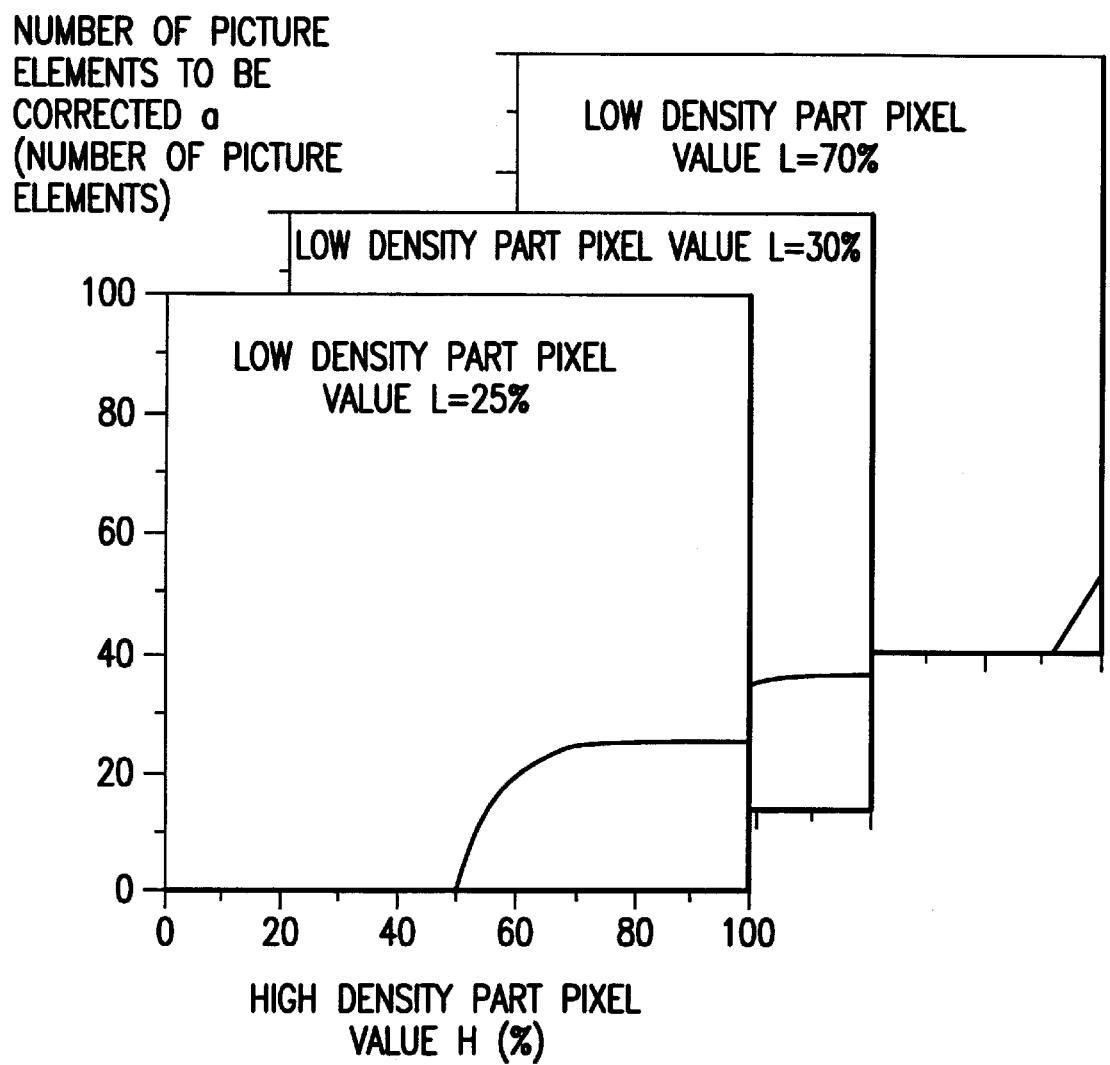
FIG. 7 shows an example of the contents described by the characteristics describing means in the data correcting section shown in FIG. 3.

However, if LUT is provided every low density part pixel value L, the quantity of data is enormous. Then, as shown in FIG. 7, LUT showing the number a of picture elements to be corrected or pixel value corrected quantity b respectively related to a high density part pixel value H every value of a low density part pixel value L every 5% for example may be provided and as to a low density part pixel value L not shown in LUT, the number a of picture elements to be corrected and the pixel value corrected quantity b corresponding to a low density part pixel value L and a high density part pixel value H respectively sent from the corrected object judging means 254 may be also obtained by interpolating the number a of picture elements to be corrected and the pixel value corrected quantity b respectively read based upon the high density part pixel value H from LUTs including values before and after the low density part pixel value.

The lowering of the density of a low density part is caused by the difference in latent image potential between the adjacent low density part and high density part, that is, the difference in exposure energy to the low density part and the high density part. Then, LUT describing the relationship between a pixel value and exposure energy (potential) as shown in FIG. 8A and LUT describing the relationship among the difference in exposure energy, the number a of picture elements to be corrected and pixel value corrected quantity b as shown in FIGS. 8B and C may be also provided.

Figure 8A:
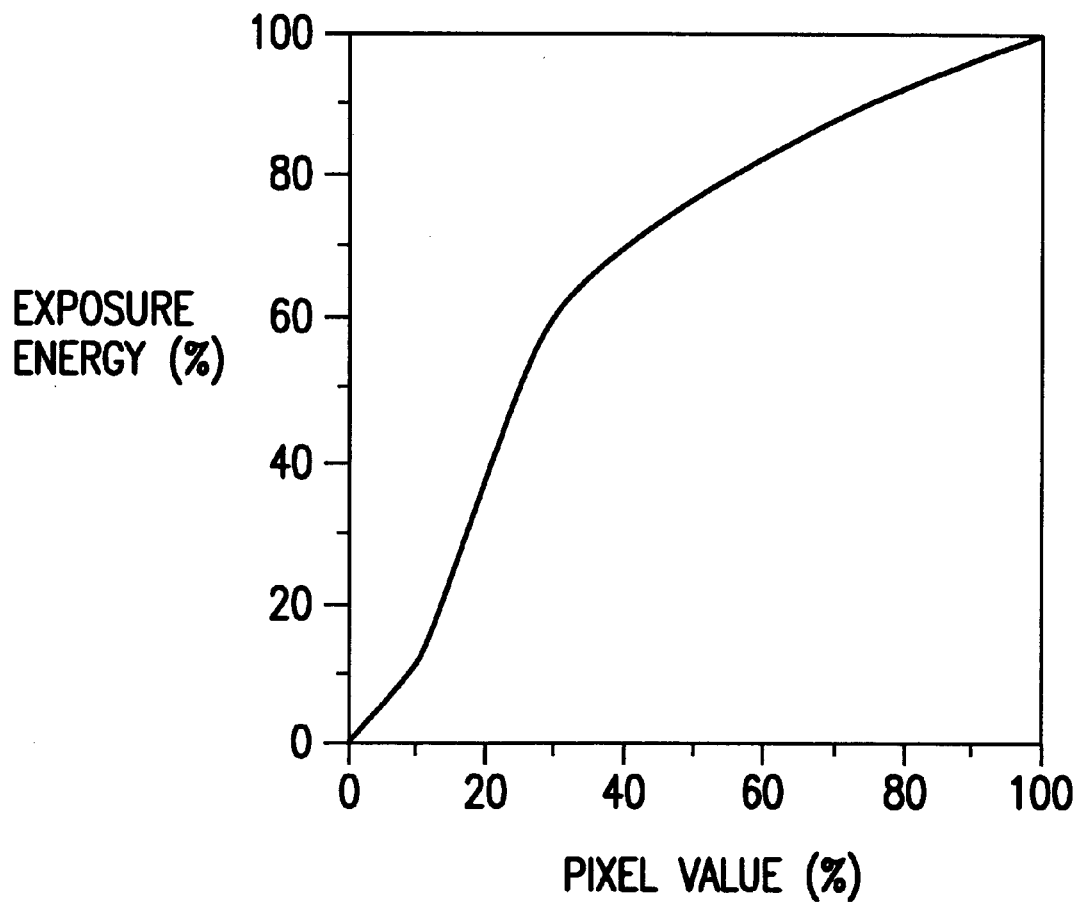
FIG. 8 shows an example of the contents described by the characteristics describing means in the data correcting section shown in FIG. 3.
Figure 8B:
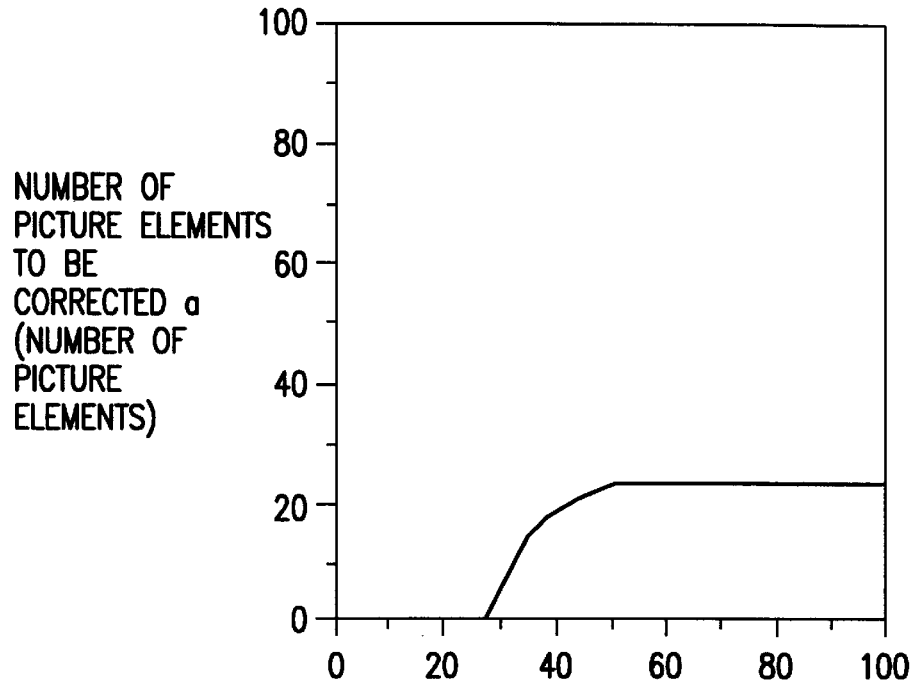
Figure 8C:
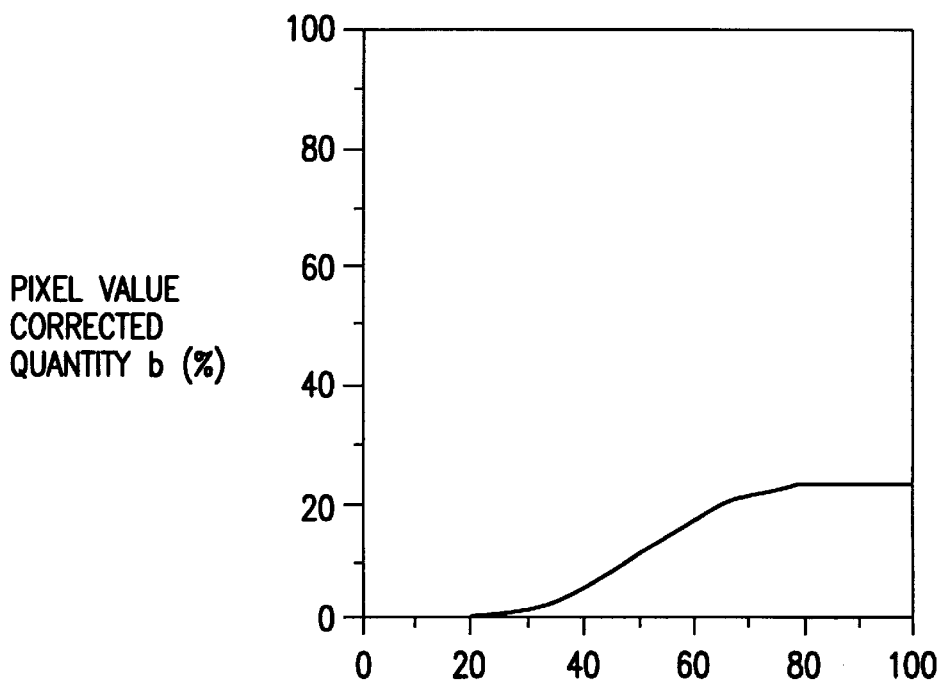

In this case, the respective exposure energy of a low density part pixel value L and a high density part pixel value H respectively sent from the corrected object judging means 254 is obtained from LUT shown in FIG. 8A and the number a of picture elements to be corrected and the pixel value corrected quantity b are obtained based upon the difference between both from LUT shown in FIGS. 8B and C. Hereby, the number a of picture elements to be corrected and the pixel value corrected quantity b corresponding to a low density part pixel value L and a high density part pixel value H can be obtained from only two pairs of LUTs each of which consists of six pages.

The number a of picture elements to be corrected and pixel value corrected quantity b obtained in the characteristics describing means 252 are sent to the pixel value correcting means 253.

The pixel value correcting means 253 corrects the pixel value of image data read from the data storage section 256 and supplied to the pixel value correcting means 253 as follows based upon the picture element position xo and the number D of picture elements in the low density part respectively supplied from the corrected object judging means 254 and the number a of picture elements to be corrected and the pixel value corrected quantity b respectively supplied from the characteristics describing means 252 according to whether correction in the horizontal scanning direction or correction in the vertical scanning direction and according to whether the number D of picture elements in the low density part is larger than the number a of picture elements to be corrected or not.

As shown in FIG. 10B, the quantity in which density in a low density part is lowered tends to vary substantially linearly in the range in which the lowering of density is caused. In the pixel value correcting means 253, a pixel value is corrected using a linear expression as follows:

First, if the correction is the correction of an edge picture element at which an output image varies from a low density part to a high density part in the horizontal scanning direction or the correction of an edge picture element in the vertical scanning direction (for the vertical scanning direction, only an edge picture element at which an output image varies from a low density part to a high density part is corrected) and the number D of picture elements in the low density part is larger than the number a of picture elements to be corrected, corrected quantity y is calculated based upon the following linear expression and the calculated corrected quantity y is added to the original pixel value of each picture element to be corrected in the range of "xo−a≦x≦xo" when the position of a picture element in the horizontal scanning direction or in the vertical scanning direction is 'x' and the position of the above edge picture element is 'xo' as respectively shown by a broken line in the position of the edge picture element E4 shown in FIG. 4 or in the position of the edge picture element E4 shown in FIG. 5:

$$y = (b/a) \times \{x - (xo - a)\} = (b/a) \times \{x - xo + a\} \quad (1)$$

Figure 9:
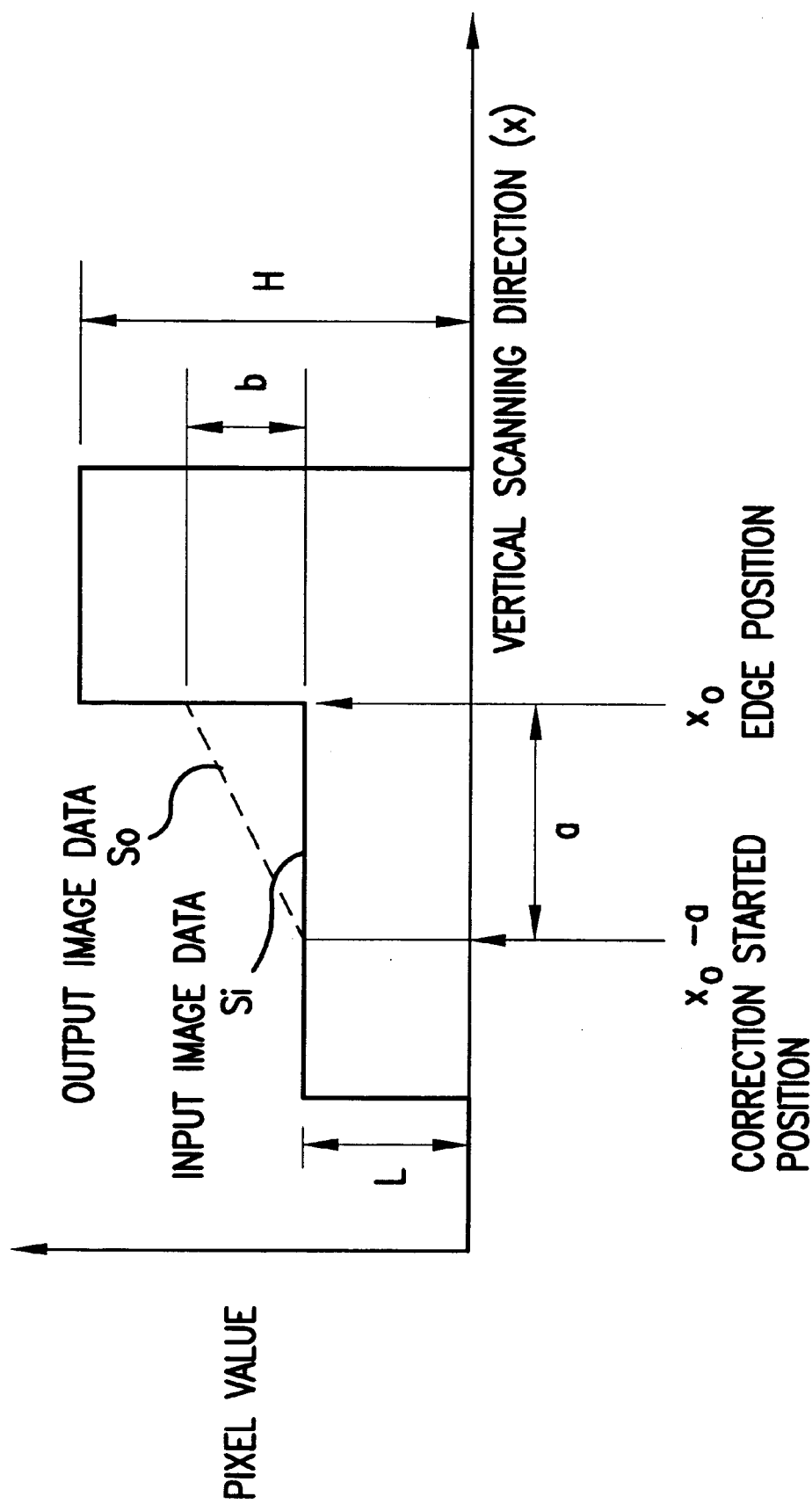
FIG. 9 shows an example of a case that a pixel value is corrected by pixel value correcting means in the data correcting section shown in FIG. 3.

Therefore, when image data supplied from the data storage means 256 to the pixel value correcting means 253 is a value such as input image data Si shown by a full line in FIG. 9 in the vertical scanning direction, the image data the pixel value of which is corrected by the pixel value correcting means 253 is a value shown by a broken line in the range of "xo−a≦x≦xo" in the vertical scanning direction as shown as output image data So in FIG. 9.

Second, if the correction is the correction of an edge picture element at which an output image varies from a low density part to a high density part in the horizontal scanning direction or the correction of an edge picture element in the vertical scanning direction and the number D of picture elements in the low density part is smaller than the number a of picture elements to be corrected, corrected quantity y is calculated based upon the following linear expression and the calculated corrected quantity y is added to the original pixel value of each picture element to be corrected in the range of "xo−D≦x≦xo":

$$y=(b/a)x(x-xo+D) \quad (2)$$

That is, in this case, the pixel value of only picture elements in the range of the number D of picture elements in a low density part is corrected and accordingly, the corrected quantity y is reduced, compared with that in the above first case.

Third, if the correction is the correction of an edge picture element at which an output image varies from a high density part to a low density part in the horizontal scanning direction and the number D of picture elements in the low density part is larger than the number a of picture elements to be corrected, corrected quantity y is calculated based upon the following linear expression and the calculated corrected quantity y is added to the original pixel value of each picture element to be corrected in the range of "xo≦x≦xo+a" when the position of a picture element in the horizontal scanning direction is 'x' and the position of the above edge picture element is 'xo' as shown by a broken line in a position of the edge picture element E5 in FIG. 4:

$$y=b-(b/a)x(x-xo) \quad (3)$$

Fourth, if the correction is the correction of an edge picture element at which an output image varies from a high density part to a low density part in the horizontal scanning direction and the number D of picture elements in the low density part is smaller than the number a of picture elements to be corrected, corrected quantity y is calculated based upon the following linear expression and the calculated corrected quantity y is added to the original pixel value of each picture element to be corrected in the range of "xo≦x≦xo+D":

$$y=(b/a)D-(b/a)x(x-xo) \quad (4)$$

That is, in this case, the pixel value of only picture elements in the range of the number D of picture elements in a low density part is corrected and accordingly, the corrected quantity y is reduced, compared with that in the above third case.

In the pixel value correcting means 253, first, the pixel value of image data for one page read in the horizontal scanning direction from the data storage means 256 is corrected and the image data the pixel value of which is corrected is again stored in the data storage means 256. Afterward, the pixel value of the image data for one page the pixel value in the horizontal scanning direction of which is corrected which is read in the vertical scanning direction from the data storage means 256 is corrected, the image data after the correction of the pixel value is transferred to the data storage means 256 and further, is supplied from the data storage means 256 to the screen generator 390 as output image data So.

Excessive correction in a part in which an image edge in the horizontal scanning direction and an image edge in the vertical scanning direction are crossed as shown in FIG. 10A can be avoided by correcting the vertical scanning direction after the correction of the horizontal scanning direction as described above.

In the image forming apparatus, that is, the copying machine in this embodiment, if the above pixel value is corrected by the data correcting section 250 in the image processing section 200 and the patch shown in FIG. 10A is output in only magenta with the screen ruling of the screen generator 390 set to 400 lines/inch, no lowering of density is caused in the low density parts 12L and 16L as shown by a full line in FIGS. 10B and C.

This embodiment is a case that corrected quantity y is respectively calculated based upon the above linear expressions (1) to (4), however, corrected quantity y may be also calculated based upon another functional expression according to the characteristics of the lowering of the density of a low density part.

Also, this embodiment is a case that the number a of picture elements to be corrected and the pixel value corrected quantity b respectively common to each color Y, M, C and K are described in the characteristics describing means 252, however, LUT in which the number a of picture elements to be corrected and the pixel value corrected quantity b every color are stored may be also provided. The number a of picture elements to be corrected and the pixel value corrected quantity b which are different every screen ruling of the image output section 300 may be also described.

Further, a coefficient in a functional expression when the relationship between the number a of picture elements to be corrected and pixel value corrected quantity b respectively shown in FIG. 6 in relation to a low density part pixel value L and a high density part pixel value H is expressed in the functional expression is stored in the characteristics describing means 252 and the number a of picture elements to be corrected and pixel value corrected quantity b may be also calculated using the coefficient without using LUT provided to the characteristics describing means 252.

The edge extracting means 251 may also depend upon another method such as obtaining a primary differential value such as a gradient of an image by digital filter processing and pattern matching if only an edge picture element can be extracted as described above.

According to this embodiment, in an image processor for processing input image data or in an image forming apparatus provided with such an image processor as an image processing section, the lowering of density in a low density part when an output image varies from the low density part to a high density part in the vertical scanning direction and the lowering of density in a low density part when an output image varies from the low density part to a high density part in the horizontal scanning direction can be respectively prevented without expanding an image output device or an image output section and increasing the cost. As the above lowering of density can be also prevented if screen ruling is increased to enhance the resolution of an output image, the resolution of an output image can be readily enhanced.

Generally, the lowering of density in a low density part when an output image varies between the low density part and a high density part in the horizontal scanning direction is small in a range and quantity. Therefore, depending upon a case, a pixel value may be also corrected so that only the lowering of density in a low density part when an output image varies from the low density part to a high density part in the vertical scanning direction is prevented.

This embodiment is not limited to a case in which an image formation method according to an electrophotographic method is adopted and if the lowering of density is caused in a low density part when an output image varies from the low density part to a high density part in the vertical scanning direction or the lowering of density is caused in a low density part when an output image varies between the low density part and a high density part in the horizontal scanning direction, the embodiment can be similarly applied to another image formation method such as an ink jet method, a thermal imprint recording method and a silver salt photographic method.

Second Embodiment . . . FIG. 11 to FIG. 14

Figure 11:
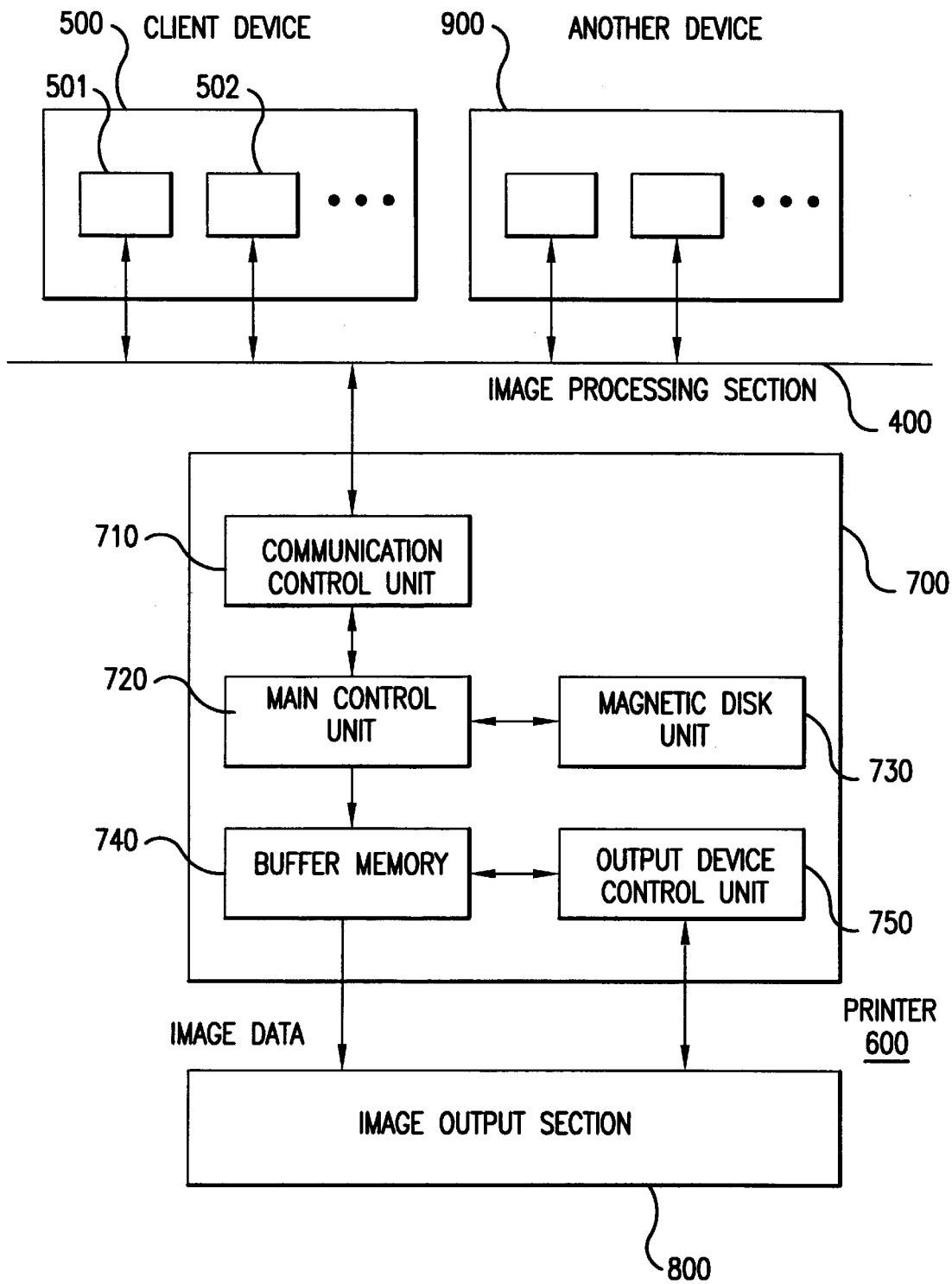
FIG. 11 shows the overall constitution of a network printer system using an example of an image processor according to the present invention.

FIG. 11 shows the overall constitution of a network printer system using an example of an image processor according to the present invention and an example of an image forming apparatus according to the present invention. In the above network printer system, a client device 500, a printer 600 and another device 900 are connected on a network 400.

The network 400 is Ethernet (the trademark of Xerox) for example and the network is set so that plural communication protocols function according to an application run in the client device 500, the printer 600 and another device 900.

The client device 500 consists of plural client devices 501, 502, - - - , the respective client devices 501, 502, - - - consist of a computer, a workstation and others and respectively send printing information described in page description language (hereinafter called PDL) to the printer 600 and another device 900.

This network printer system corresponds to an open prepress interface system (OPI) (the trademark of Aldus in United States) and in printing information described in PDL from the client device 500, that is, a PDL command/data, OPI command corresponding to OPI system may be included.

In OPI system, client devices and plural printers are connected via a network, at least one of the plural printers holds high-resolution image data in its storage, a client device executes editing processing based upon low-resolution information corresponding to the above high-resolution image data, the printer holding high-resolution image data is a system for outputting high-resolution image data based upon the printing information of a page layout program sent from a client device and can execute the page layout processing of image data without increasing traffic on a network and increasing the load of a client device.

The printer 600 is an example of an image forming apparatus according to the present invention and in this embodiment, corresponds to the above OPI system. The printer 600 consists of an image processing section 700 and an application package Hanako and the image processing section 700 is an example of an image processor according to the present invention. An image output section 800 complies with an electrophotographic method and a two-component magnetic brush developing system as the image output section 300 in the first embodiment. The image processing section 700 and the image output section 800 may be respectively physically separate devices, the image processing section 700 is build in the image output section 800 and may be also physically one device.

Another device 900 is a printer except the printer 600, a server such as a print server, a disk server and a mail server and others. In a network, plural printers and plural servers are included.

The image processing section 700 of the printer 600 is provided with a communication control unit 710, a main control unit 720, a magnetic disk unit 730, buffer memory 740 and an output device control unit 750.

The communication control unit 710 connects the image processing section 700 to the client device 500 and another device 900 via the network 400 and controls communication according to carrier sense multiple access with collision detection (CSMA/CD) used as the control system of Ethernet for example.

Information input from the client device 500 or another device 900 to the image processing section 700 by the communication control unit 710 is transferred from the communication control unit 710 to the main control unit 720, in the main control unit 720, the communication protocol is analyzed and PDL is interpreted and executed, in the image output section 800, output image data is expanded, as described later, the pixel value of the image data is corrected and the corrected image data is written to the buffer memory 740.

An operating system, a device driver and application software for controlling the whole image processing section 700 including the communication control unit 710, the main control unit 720, the buffer memory 740 and the output device control unit 750, and the image output section 800 are installed in the magnetic disk unit 730 and these operating system and others are loaded from the magnetic disk unit 730 into a main storage not shown whenever necessary and executed.

The above high-resolution image data corresponding to OPI system is also stored in the magnetic disk unit 730 and is read from the magnetic disk unit 730 into the main storage 720 by the above OPI command whenever necessary. If the capacity of the above main storage and the buffer memory 740 is short, the magnetic disk unit 730 is utilized as a temporary save area of data.

As described above, output image data obtained by the main control unit 720 is temporarily stored in the buffer memory 740. While the output device control unit 750 controls the buffer memory 740, communicating with the image output section 800, the output image data is read from the buffer memory 740 and sent to the image output section 800, and in the image output section 800, an output image is obtained.

Figure 12:
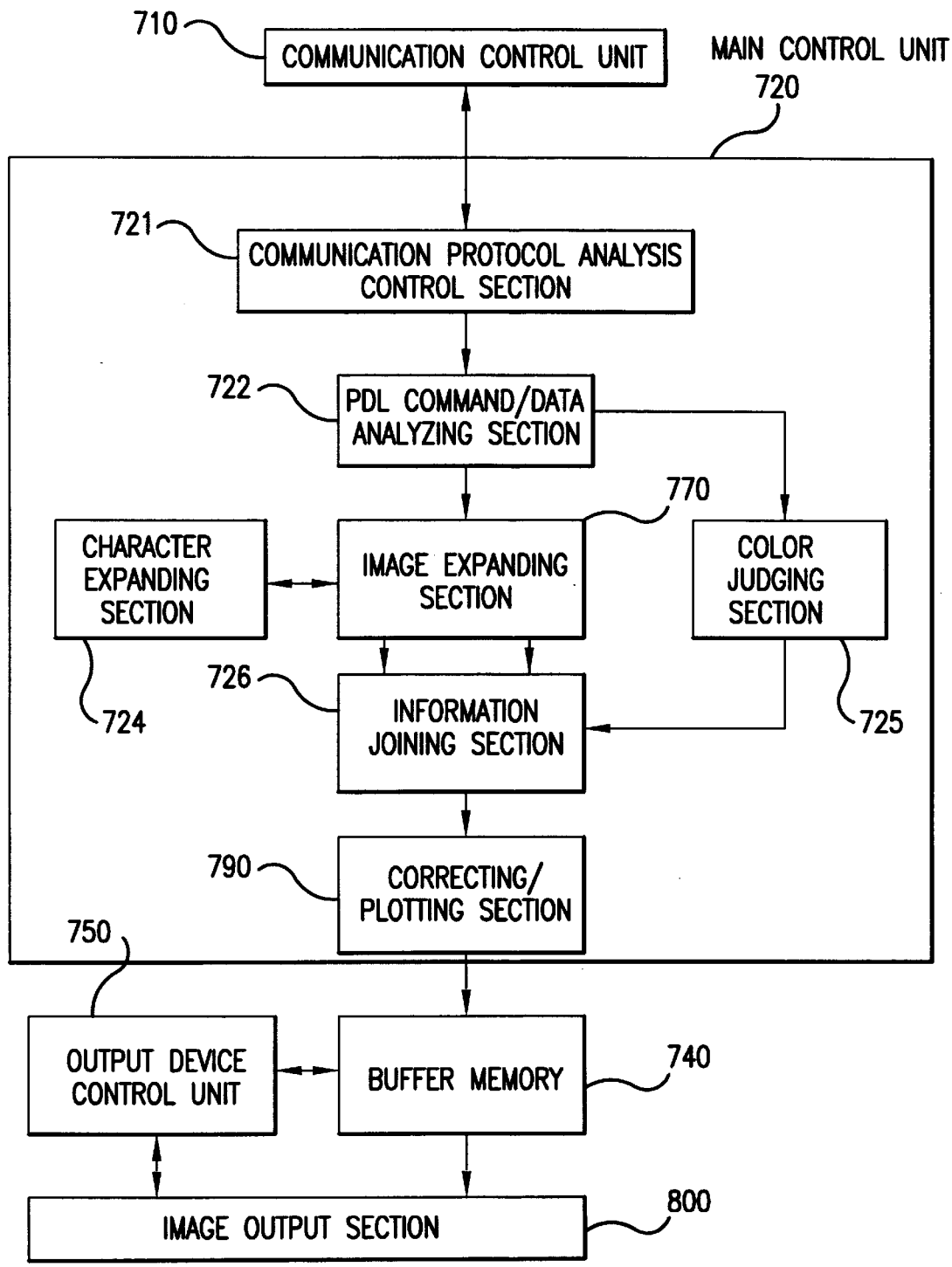
FIG. 12 shows an example of an image processing section in the system shown in FIG. 11.

As shown in FIG. 12, the main control unit 720 is provided with a communication protocol analysis control section 721, a PDL command/data analyzing section 722, an image expanding section 770, a character expanding section 724, a color judging section 725, an information joining section 726 and a correcting/plotting section 790, the communication protocol analysis control section 721 is connected to the communication control unit 710, and the correcting/plotting section 790 is connected to the buffer memory 740. In FIG. 12, the magnetic disk unit 730 shown in FIG. 11 is omitted.

As described above, information input from the client device 500 or another device 900 to the communication control unit 710 is from the communication control unit 710 to the communication protocol analysis control section 721. The information input to the communication protocol analysis control section 721 includes printing information described in PDL in which read image information and code information are mixed, that is, a PDL command/data. The PDL command/data may include OPI command.

The communication protocol analysis control section 721 analyzes the protocol of the input information and transfers a PDL command/data of the input information to the PDL command/data analyzing section 722. The communication protocol analysis control section 721 is set so that it corresponds to the above plural protocols and supports, for example TCP/IP, AppleTalk (the trademark of Apple Computer, Inc.) and IPX/SPX.

If information is sent from the image processing section 700 to the client device 500 or another device 900, the communication protocol analysis control section 721 controls a communication protocol matched to the client device 500 or another device 900 and outputs the information to the communication control unit 710.

A PDL command/data input to the PDL command/data analyzing section 722 via the communication control unit 710 and the communication protocol analysis control section 721 is analyzed in the PDL command/data analyzing section 722. The PDL command/data analyzing section 722 analyzes plural PDLs including PostScript (the trademark of Adobe Systems) and InterPress (the trademark of Xerox) and converts it to intermediate code data.

The information of resolution required in the image output section 800 and image contour information such as a contour, a position and a turning angle respectively obtained in the PDL command/data analyzing section 722 are transferred from the PDL command/data analyzing section 722 to the image expanding section 770 and the image expanding section 770 expands image data to be output from the image output section 800 based upon the above information.

In this case, if code data sent from the PDL command/data analyzing section 722 includes character information, the image expanding section 770 fetches outline information from the character expanding section 724 and expands image data related to a character. The image expanding section 770 executes processing such as compressing or expanding data, scaling an image, rotating an image, making the mirror image of an image and the conversion of resolution based upon code data sent from the PDL command/data analyzing section 722.

The color judging section 725 generates a parameter for converting image data expanded in the image expanding section 770 into image data every color Y, M, C and K based upon color information in a PDL command/data analyzed in the PDL command/data analyzing section 722 and sends the parameter to the information joining section 726. The information joining section 726 converts image data expanded in the image expanding section 770 into image data every color Y, M, C and K using the parameter sent from the color judging section 725. The image data every color Y, M, C and K sent from the information joining section 726 is supplied to the correcting/plotting section 790 as input image data, in the correcting/plotting section 790 the pixel value of input image data is corrected as described later and the corrected image data every color Y, M, C and K is written to the buffer memory 740 as output image data. The image data is read every color Y, M, C and K from the buffer memory 740 and the read image data is supplied to the image output section 800.

Figure 13:
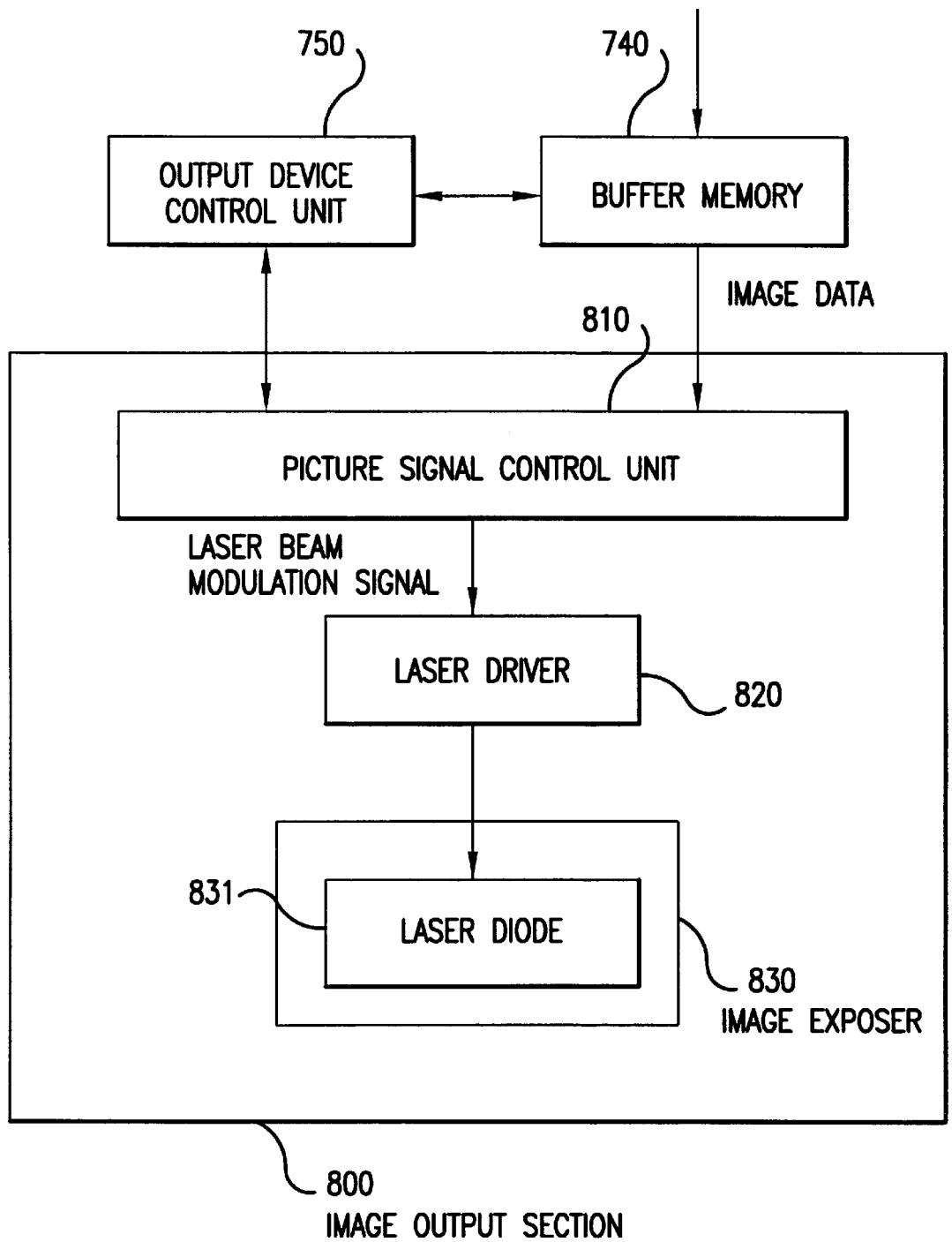
FIG. 13 shows an example of an image output section in the system shown in FIG. 11.

As shown in FIG. 13, the image output section 800 is provided with a picture signal control unit 810, a laser driver 820 and an image exposer 830, image data read from the buffer memory 740 in the image processing section 700 is converted to a laser beam modulating signal by the picture signal control unit 810, the laser beam modulating signal is supplied to the laser driver 820 and a laser diode 831 in the image exposer 830 is operated by the laser driver 820.

Although the following process is not shown in FIG. 13, in the image output section 800, when a laser beam from the laser diode 831 modulated by a laser beam modulating signal from the picture signal control unit 810 as described above scans on the photoconductive drum, an electrostatic latent image is formed on the photoconductive drum, the electrostatic latent image is developed to a toner image by a developing machine and an image is output on paper by the toner image being transferred on the paper by a transfer machine.

Figure 14:
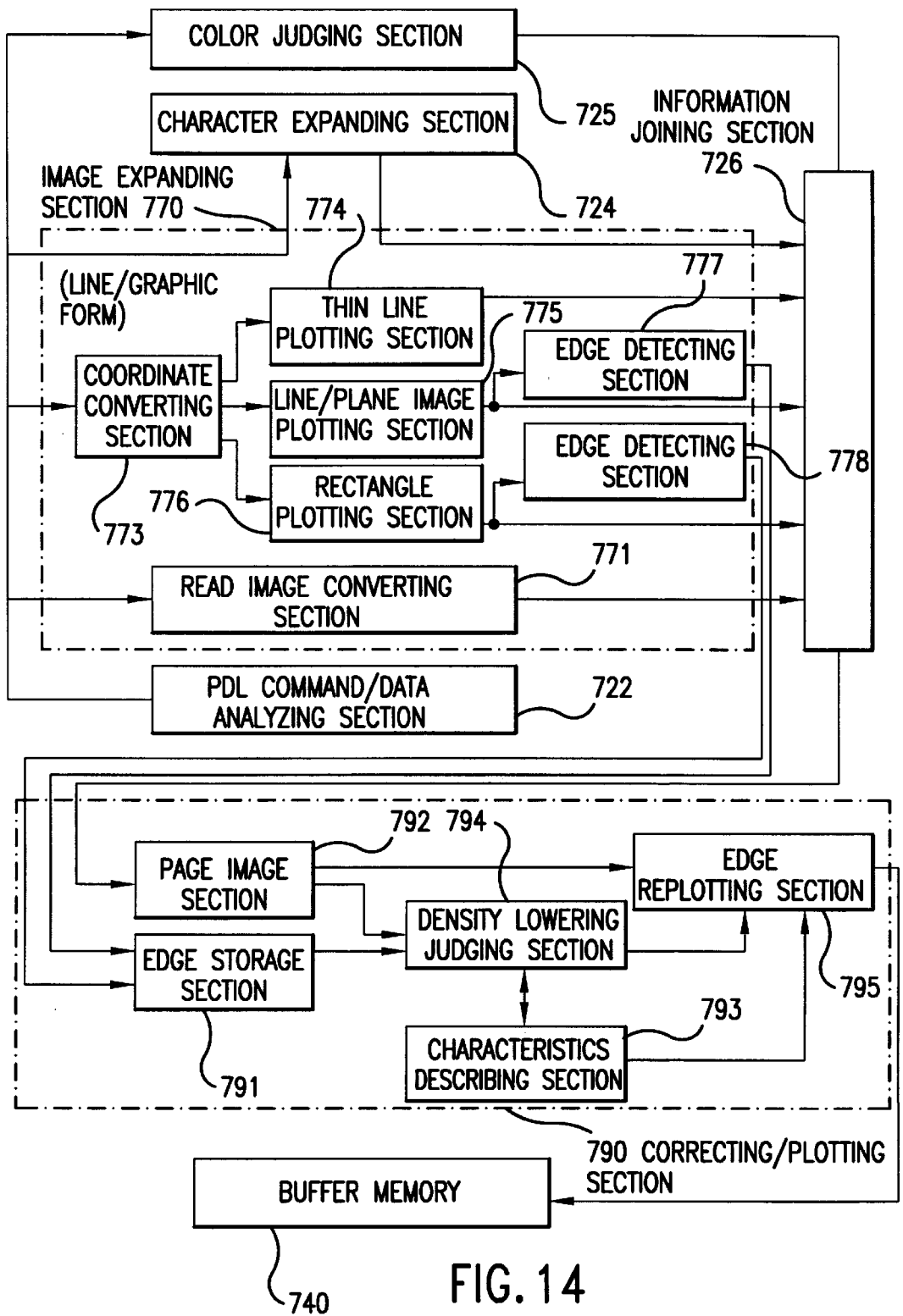
FIG. 14 shows an example of the main part of a main control unit in the image processing section shown in FIG. 12.

FIG. 14 shows the concrete constitution of the main part of the main control unit 720 such as the image expanding section 770 and the correcting/plotting section 790. The image expanding section 770 expands code data from the PDL command/data analyzing section 722 into image data every image object of a character, a line/a graphic form and a read image and plots.

That is, character information is transferred to the character expanding section 724, bit map data of a character is generated by expanding it into a font and transferred to the information joining section 726. After image conversion processing such as the conversion of resolution for read image information is executed in a read image converting section 771, the read image information is transferred to the information joining section 726.

The coordinate system of the information of a line/a graphic form is transformed by a coordinate transforming section 773 and the information of a line/a graphic form is plotted every thin line, line/plane image and rectangle as an image described in PDL. That is, a thin line is plotted by a thin line plotting section 774 and transferred to the information joining section 726, a line/a plane image is plotted by a line/plane image plotting section 775 and transferred to the information joining section 726, and a rectangle is plotted by a rectangle plotting section 776 and transferred to the information joining section 726.

The output of the line/plane image plotting section 775 is supplied to an edge detecting section 777, the edge picture element of the image of a line/a plane image is detected in the edge detecting section 777, the output of the rectangle plotting section 776 is supplied to the edge detecting section 778 and in the edge detecting section 778, the edge picture element of a rectangular image is detected.

In the information joining section 726, an image every image object is overlapped, an image for one page is constituted and processing such as the conversion of a color is executed based upon information obtained every object from the color judging section 725.

The correcting/plotting section 790 is constituted by an edge storage section 791, a page image section 792, a characteristics describing section 793, a density lowering judging section 794 and an edge replotting section 795.

The edge storage section 791 stores edge information from the edge detecting sections 777 and 778 in the image expanding section 777 as an edge list. The page image section 792 obtains a synthesized page image from the information joining section 726 and transfers it to the density lowering judging section 794 and the edge replotting section 795.

In the characteristics describing section 793, the number a of picture elements to be corrected and the pixel value corrected quantity b shown in FIGS. 6A and B corresponding to the low density part pixel value L and the high density part pixel value H of the image of a line/a plane image and a rectangle are described beforehand as in the characteristics describing means 252 in the first embodiment. A condition causing the lowering of the density of the image of a line/a plane image and a rectangle in a low density part is also described beforehand.

The characteristics describing section 793 sends the condition causing the lowering of the density to the density lowering judging section 794 at a request from the density lowering judging section 794 and sends the number a of picture elements to be corrected and the pixel value corrected quantity b corresponding to the low density part pixel value L and the high density part pixel value H to the edge replotting section 795 when the low density part pixel value L and the high density part pixel value H are supplied from the density lowering judging section 794.

The density lowering judging section 794 judges the edge picture element of an image which is estimated to cause the lowering of density in a low density part based upon the edge list stored in the edge storage section 791 when a page image is transferred from the page image section 792 and the above condition obtained from the characteristics describing section 793 at its own request and sends the result of the judgment to the edge replotting section 795.

The edge replotting section 795 replots a low density part in which it is estimated that the lowering of the density of the image of a line/a plane image and a rectangle in a page image transferred from the page image section 792 is caused based upon the result of the judgment sent from the density lowering judging section 794 and the number a of picture elements to be corrected and pixel value corrected quantity b sent from the characteristics describing section 793 and transfers the replotted page image to the buffer memory 740. The replotting is executed by calculating corrected quantity y using the linear expression expressed by the expressions (1) to (4) and adding the calculated corrected quantity y to an original pixel value as in the first embodiment.

Therefore, in this embodiment, the lowering of density in a low density part when the image of a line/a plane image and a rectangle varies from the low density part to a high density part in the vertical scanning direction and the lowering of density in a low density part when the above image varies between the low density part and a high density part in the horizontal scanning direction are also prevented.

Also in this embodiment, LUT showing the number a of picture elements to be corrected or the pixel value corrected quantity b in relation to the high density part pixel value H corresponding to a value every 5% for example of a low density part pixel value L is provided as the characteristics describing section 793 as shown in FIG. 7 and for a value in which LUT of a low density part pixel value L is not provided, the number a of picture elements to be corrected and the pixel value corrected quantity b corresponding to a low density part pixel value L and a high density part pixel value H from the density lowering judging section 794 may be also obtained by interpolating the number a of picture elements to be corrected and the pixel value corrected quantity b respectively read based upon a high density part pixel value H from LUTs of values before and after the above value.

The characteristics describing section 793 may be also constituted by LUT describing the relationship between a pixel value and exposure energy (potential) as shown in FIG. 8A and LUT describing the relationship among exposure energy, the number a of picture elements to be corrected and pixel value corrected quantity b as shown in FIGS. 8B and C.

In this embodiment, each function of the correcting/plotting section 790 is realized by software, however, the correcting/plotting section 790 may be also constituted by hardware provided with the similar functions for speed-up.

According to this embodiment, in an image processor for expanding image data based upon PDL or in an image forming apparatus provided with such an image processor as an image processing section, the lowering of the density of a low density part when an output image varies from the low density part to a high density part in the vertical scanning direction and the lowering of the density of a low density part when an output image varies between the low density part and a high density part in the horizontal scanning direction can be prevented without expanding an image output device or an image output section and increasing the cost. As the above lowering of density can be also prevented if screen ruling is increased to enhance the resolution of an output image, the resolution of an output image can be readily enhanced.

Particularly, according to this embodiment, an advantage that the lowering of the density of a graphic image made by a client device in which the lowering of density is readily caused can be securely prevented is produced.

Also in this embodiment, if only the density of a low density part is lowered when an output image varies from the low density part to a high density part in the vertical scanning direction or the density of a low density part is lowered when an output image varies between the low density part and a high density part in the horizontal scanning direction in addition to a case adopting an image formation method according to an electrophotographic method, the present invention can be similarly applied to another image formation method such as an ink jet method, a thermal imprint recording method and a silver salt photographic method.

According to this embodiment of the present invention, the lowering of the density of a low density part when an output image varies from the low density part to a high density part in the vertical scanning direction and the lowering of the density of a low density part when an output image varies between the low density part and a high density part in the horizontal direction can be prevented without expanding an image forming apparatus or an image output section and increasing the cost.

As the above lowering of density can be also prevented if screen ruling is increased to enhance the resolution of an output image, the resolution of an output image can be readily enhanced.

The second embodiment of the present invention will be described below.

Figure 17A:
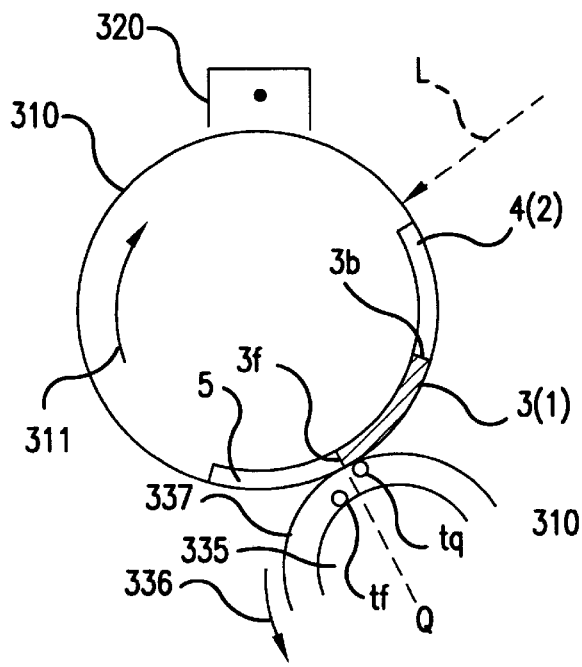
FIG. 17 shows a cause of the lowering of density which is to be solved by a second embodiment according to the present invention.

The description of FIGS. 1 and 2 is omitted because it is the same as their description in the first embodiment. In an image output section according to an electrophotographic method, particularly an image output section according to a two-component magnetic brush developing system, when an output image varies from a halftone part to a background part in the vertical scanning direction, the density of a rear end of the halftone part which is in contact with the background part is lowered because of its non-linear and asymmetrical output characteristics. Hereby, a void is caused for the following cause:

As shown in FIG. 17A, when an output image varies from the halftone part 1 to the background part 2 in the vertical scanning direction which is perpendicular to the horizontal scanning direction that is the scanning direction of a beam for forming an electrostatic latent image on a photoconductive drum and which is reverse to a paper feed direction, the density of a rear end 1B of the halftone part 1 which is in contact with the background part 2 is lowered for the following cause:

In an electrophotographic method by a two-component magnetic brush developing system, as shown in FIG. 17, a photoconductive drum 310 is electrified by an electrifier 320 for forming an electrostatic latent image by rotating the photoconductive drum 310 in the direction shown by an arrow 311, an electrostatic latent image is formed on the photoconductive drum 310 by radiating a laser beam L modulated by a picture signal on the electrified photoconductive drum 310, when the photoconductive drum 310 on which the electrostatic latent image is formed comes into contact with a developer layer 337 on the surface of a developing sleeve 335 rotated in the direction shown by an arrow 336 at linear velocity approximately twice as fast as the linear velocity of the photoconductive drum 310, toner in the developer layer 337 adheres to the part of the latent image on the photoconductive drum 310 and the electrostatic latent image on the photoconductive drum 310 is developed to be a toner image.

Figure 17B:
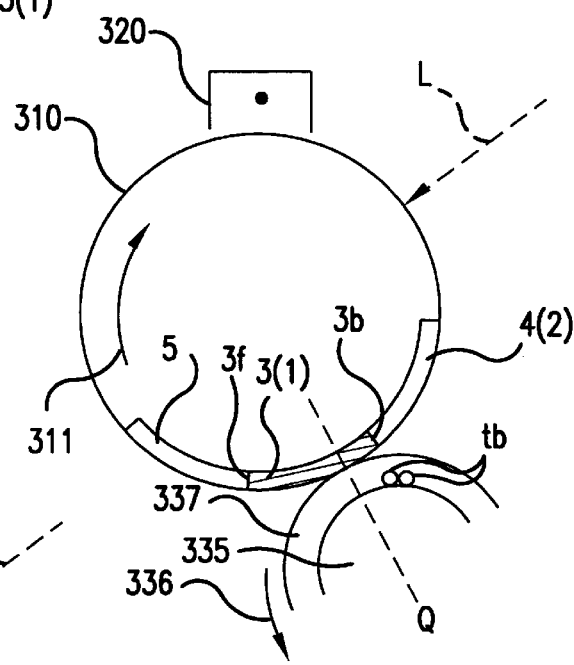
Figure 17C:
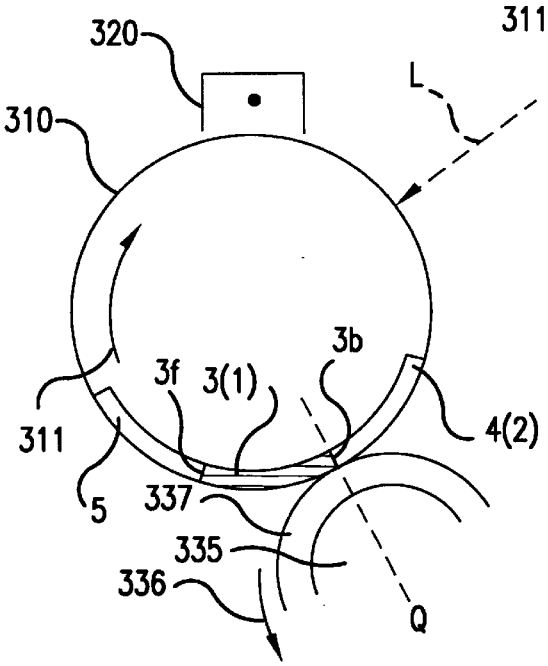

FIG. 17A shows a moment in which the latent image part 3 of the halftone part 1 is formed on the photoconductive drum 310 by radiating a laser beam L and the front edge 3f comes into contact with the developer layer 337, FIG. 17B shows a moment in which a part that is a little near the front edge from the rear edge 3b of the latent image part 3 comes into contact with the developer layer 337 and FIG. 17C shows a moment in which the rear edge 3b of the latent image part 3 comes into contact with the developer layer 337.

For example, 500 V developing bias is applied to the developing sleeve 335. The photoconductive drum 310 is electrified by the electrifier 320 at the potential of 650 V for example and the latent image part 3 of the halftone part 1 is electrified at the potential of 200 V for example which is lower than the developing bias. A part 4 equivalent to the background part 2 at the rear of the halftone part 1 is electrified at the potential of 650 V which is higher than the developing bias.

When the front edge 3f of the latent image part 3 comes into contact with the developer layer 337 as shown in FIG. 17A, a developing electric field in a forward direction is applied to toner tq which exists in a position Q in which the photoconductive drum 310 and the developer layer 337 come in contact, the toner tq is pulled near the surface of the developer layer 337 and adheres on the latent image part 3. However, when the part 4 equivalent to the background part 2 at the rear of the halftone part 1 approaches the developer layer 337 as shown in FIG. 17B, toner tb which exists in a part of the developer layer 337 opposite to the part 4 is detached from the surface of the developer layer 337 by a developing electric field in the reverse direction and gets deeply into the developer layer 337.

When the developing sleeve 335 is rotated in a direction shown by the arrow 336, the toner tb approaches the position Q in which the photoconductive drum 310 and the developer layer 337 come in contact and moves on the side of the surface of the developer layer 337 because the potential of the latent image part 3 is low, however, the toner late reaches the surface of the developer layer 337. Therefore, as the part which is a little near the front edge from the rear edge 3b of the latent image part 3 comes into contact with the developer layer 337 as shown in FIG. 17B, the quantity of toner which adheres onto the photoconductive drum 310 is decreased and the density of the rear end 1B of the halftone part 1 which is in contact with the background part 2 is lowered as described above.

If a part before the halftone part 1 is also the background part, some toner such as toner tf in the toner of the developer layer 337 is detached from the surface of the developer layer 337 by a part 5 on the photoconductive drum 310 equivalent to a front background part even when the front edge 3f of the latent image part 3 comes into contact with the developer layer 337.

However, the toner tf is rapidly parted from the position Q in which the photoconductive drum 310 and the developer layer 337 come into contact by the rotation of the developing sleeve 335 in the direction shown by the arrow 336 and toner tq pulled near the surface of the developer layer 337 by low potential of the latent image part 3 immediately approaches the position Q and adheres onto the latent image part 3. Therefore, even if an output image conversely varies from the background part to the halftone part 1 in the vertical scanning direction, the density of the front edge of the halftone part 1 which is in contact with the background part is not lowered.

As described above, in an electrophotographic method by a two-component magnetic brush developing system, when an output image varies from the halftone part 1 to the background part 2 in the vertical scanning direction, the density of the rear end 1B of the halftone part 1 which is in contact with the background part 2 is lowered because of the partial lowering from a mean value of toner density on the surface of the developer layer 337 on the developing sleeve 335. In this specification, such lowering of density is called trailing edge deletion (TED).

TED can be reduced to some extent by approximating the linear velocity of the developing sleeve 335 to that of the photoconductive drum 310. However, even if the linear velocity of the developing sleeve 335 is equalized to that of the photoconductive drum 310, it is difficult to completely remove TED and it is difficult to develop the sufficient quantity of toner.

Then, in Japanese Published Unexamined Patent Applications No. Hei 5-281790 and No. H6-87234, a concept that the contrast of a developing electric field is enhanced and the lowering of density such as TED described above is prevented by enhancing the precision of a laser beam scanner for writing an electrostatic latent image on a photoconductive drum by a laser beam and adjusting a parameter of the developing means for developing the electrostatic latent image is disclosed.

However, a method of enhancing the contrast of a developing electric field by enhancing the precision of a laser beam scanner which is means for writing an electrostatic latent image expands an image output section and increases the cost. In addition, as the contrast of a developing electric field is lowered and the lowering of density such as TED is more readily caused if screen ruling is increased in the image output section to enhance, there solution of an output image, it is difficult to enable both enhancing the contrast of a developing electric field and enhancing the resolution of an output image. Recently, as a computer printer and a network printer are popularized, an occasion in which a graphic image made in a personal computer and others is printed tends to be increased. In such a graphic image, the lowering of density such as TED is remarkable, compared with a natural image such as a photograph. Therefore, in an image forming apparatus such as a computer printer and a network printer, the lowering of density such as TED is serious, compared with an image forming apparatus such as a copying machine.

For a method of correcting the linear and symmetrical output characteristics of the image output section such as MTF characteristics, a method of correcting input image data by digital filter processing is widely used. However, the lowering of density such as TED caused by the non-linear and asymmetrical output characteristics of the image output section cannot be reduced or prevented by the digital filter processing as described above.

According to this embodiment of the present invention, the lowering of density at the rear end of the halftone part which is in contact with the background part when an output image varies from the halftone part to the background part in the vertical scanning direction can be prevented without expanding an image forming apparatus or an image output device and increasing the cost.

Figure 18:
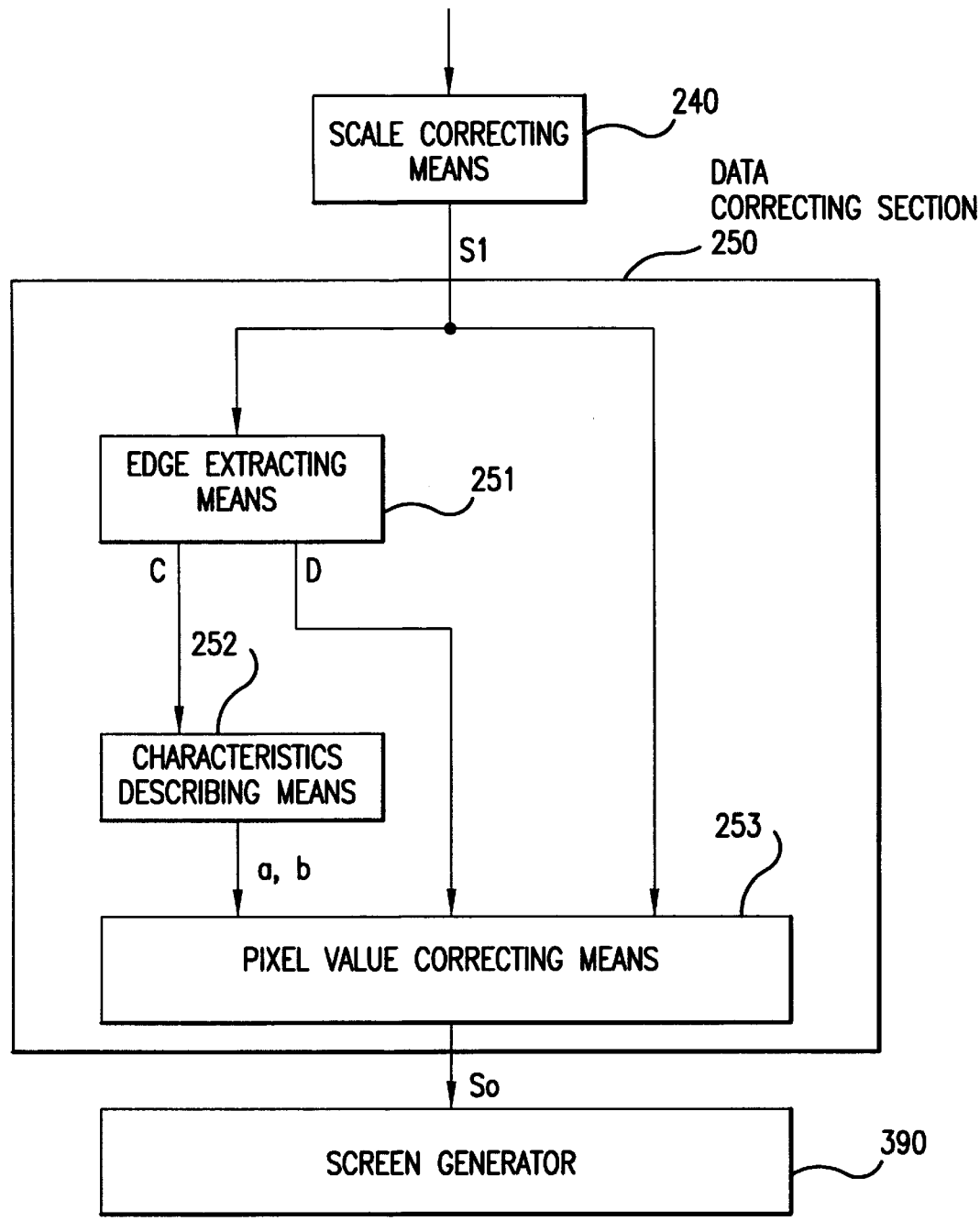
FIG. 18 shows an example of a data correcting section in an image processing section in the second embodiment according to the present invention.

In this embodiment, in the data correcting section 250 of the image processing section 200, the pixel value of image data input from the scale correcting means 240 is corrected. FIG. 18 shows a concrete example of the data correcting means 250 and the data correcting section 250 is constituted by the edge extracting means 251, the characteristics describing means 252 and the pixel value correcting means 253. The same reference number is allocated to the same part as in FIG. 3 and the description is omitted.

Figure 19A:
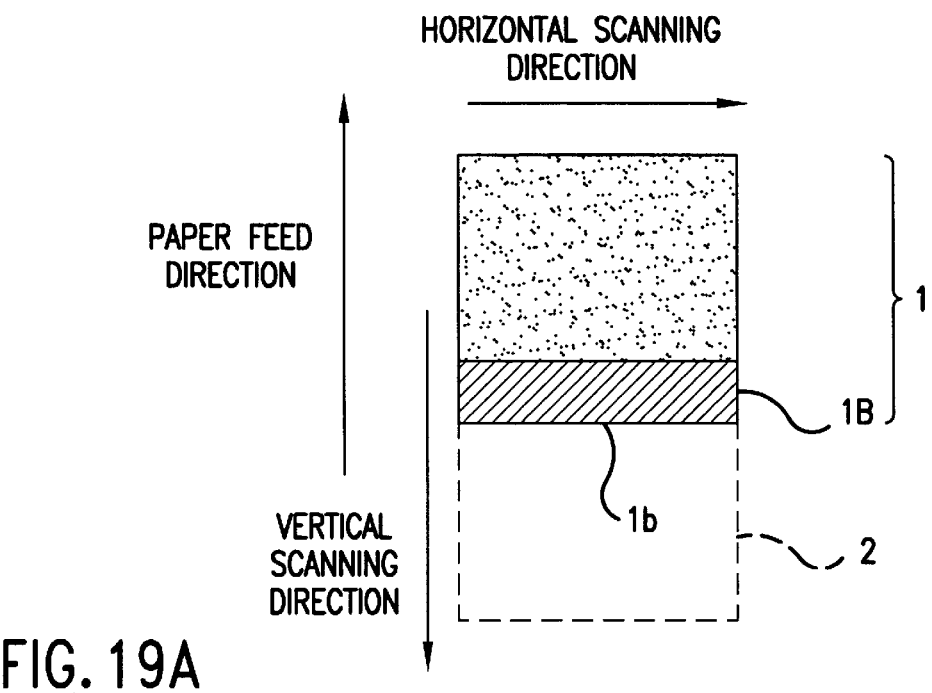
FIG. 19 shows a state in which density is lowered, which is to be solved by the present invention and that the lowering of density is prevented by the present invention.

The edge extracting means 251 extracts the rear edge 1b of the halftone part 1 which is in contact with the background part 2 when an output image varies from the halftone part 1 to the background part 2 in the vertical scanning direction from input image data Si from the scale correcting means 240 as shown in FIG. 19A.

In the concrete, the edge extracting means 251 stores the pixel value of picture elements which continue in the vertical scanning direction in memory, judges that the picture element of a point the pixel value of which exceeds a predetermined threshold is a picture element in the halftone part 1, counts picture elements which continue in the vertical scanning direction and the pixel value of which exceeds a predetermined threshold, detects the length D (the number of picture elements) of the halftone part 1 in the vertical scanning direction, afterward, judges a picture element immediately before a point the pixel value of which is smaller than a predetermined threshold to be the rear edge 1b of the halftone part 1 which is in contact with the background part 2 and defines the length D of the halftone part 1 in the vertical scanning direction (hereinafter called edge length).

The edge extracting means 251 supplies the pixel value C of the picture element judged to be the rear edge 1b to the characteristics describing means 252 and supplies the defined edge length D to the pixel value correcting means 253.

In an image forming apparatus according to an electrophotographic method, generally, it is difficult to reproduce a picture element the dot area ratio of which is 5% or less in the image output section. Therefore, the above threshold in the edge extracting means 251 is set to 5%. The rear edges 1b of the halftone part 1 which are respectively in contact with the background part 2 reproduced in the image output section 300 are all detected by setting the threshold to 5%.

Therefore, the pixel value of the halftone part 1 in this case is 5 to 100% in a scale and the pixel value of the background part 2 is 0 to 5% in a scale.

The edge extracting means 251 may also depend upon another method such as obtaining the primary differential value of a gradient image by digital filter processing and pattern matching if only a rear edge 1b can be detected.

The characteristics describing means 252 is constituted by look-up tables (hereinafter called LUT) and the characteristics of the lowering of density caused at the rear end 1B of the halftone part 1 which is in contact with the background part 2 when an output image varies from the halftone part 1 to the background part 2 in the vertical scanning direction are described there beforehand.

As clear from the description of the cause causing TED shown in FIG. 17, the range of the rear end 1B in which the lowering of the density of the halftone part 1 is caused and the quantity and the quantity in which density is lowered at the rear end 1B depend upon the potential of the latent image part 3 of the halftone part 1 on the photoconductive drum 310, therefore, the pixel value of the halftone part 1, that is, the pixel value C of the rear edge 1b of the halftone part 1 which is in contact with the background part 2.

In the characteristics describing means 252, a pair of LUTs are provided, the relationship between the pixel value C of the rear edge 1b and the number a of picture elements to be corrected (the corrected range) is stored in one LUT as shown in FIG. 4A and the relationship between the pixel value C of the rear edge 1b and the corrected quantity b of the pixel value of the rear edge 1b (dot area ratio) is stored in the other LUT as shown in FIG. 4B. The number a of picture elements to be corrected is equivalent to the range of the rear end 1B at which the density of the halftone part 1 is lowered and pixel value corrected quantity b is equivalent to the quantity in which density at the read edge 1b is lowered.

The pixel value corrected quantity b is determined based upon the partial lowering of toner density in the developer layer of the developing sleeve of a rotary developing machine 330 shown in FIG. 1 from the mean value. In the concrete, it is determined based upon the lowering of toner density from the mean value every partial developer layer determined every predetermined turning angle in the rotational direction of the developing sleeve.

The pixel value C of the rear edge 1b supplied from the above edge extracting means 251 to the characteristics describing means 252 is supplied to the pair of LUTs of the characteristics describing means 252 as an address, the number a of picture elements to be corrected and the pixel value corrected quantity b corresponding to the pixel value C of the read edge 1b are read from the pair of LUTs and the read number a of picture elements to be corrected and the pixel value corrected quantity b are supplied to the pixel value correcting means 253.

The pixel value correcting means 253 judges that the pixel value of image data Si input from the scale correcting means 240 is to be corrected when the above edge length D supplied from the edge extracting means 251 is larger than the number a of picture elements to be corrected supplied from the characteristics describing means 252. It is because the density of the halftone part 1 is not lowered when edge length D, that is, the length of the halftone part 1 in the vertical scanning direction is small. The quantity in which density at the rear end 1B of the halftone part 1 is lowered tends to vary substantially linearly from a picture element from which density starts to be lowered to a picture element at the rear edge 1b.

Figure 21:
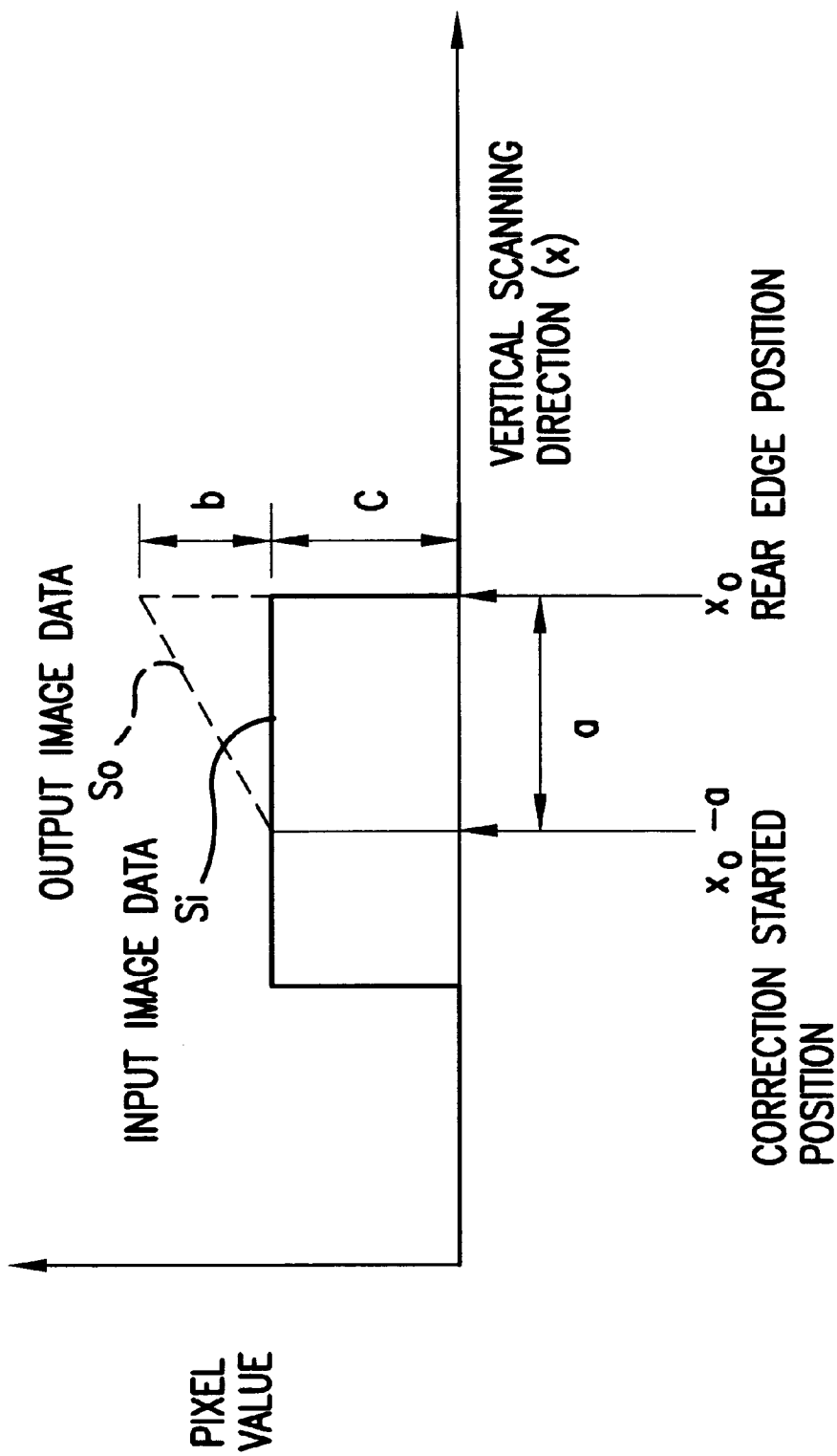
FIG. 21 shows an example of a case that a pixel value is corrected by pixel value correcting means in the data correcting section shown in FIG. 18.

In the pixel value correcting means 253, if the pixel value of input image data Si is judged to be corrected, corrected quantity y expressed by the following linear expression is calculated and the calculated corrected quantity y is added to the original pixel value of each corrected picture element in the range of "xo−a≦x≦xo" when pixel position in the vertical scanning direction is x and the pixel position in the vertical scanning direction of the rear edge 1b is xo as shown in FIG. 21:

$$y = (b/a) \times \{x - (xo - a)\} = (b/a) \times (x - xo + a) \quad (1)$$

Therefore, when the pixel value of input image data Si from the scale correcting means 240 is a value shown by a full line in FIG. 5, the pixel value of output image data So from the data correcting section 250 is a value shown by a broken line in FIG. 5 in the range of "xo−a≦x≦xo".

Figure 19B:
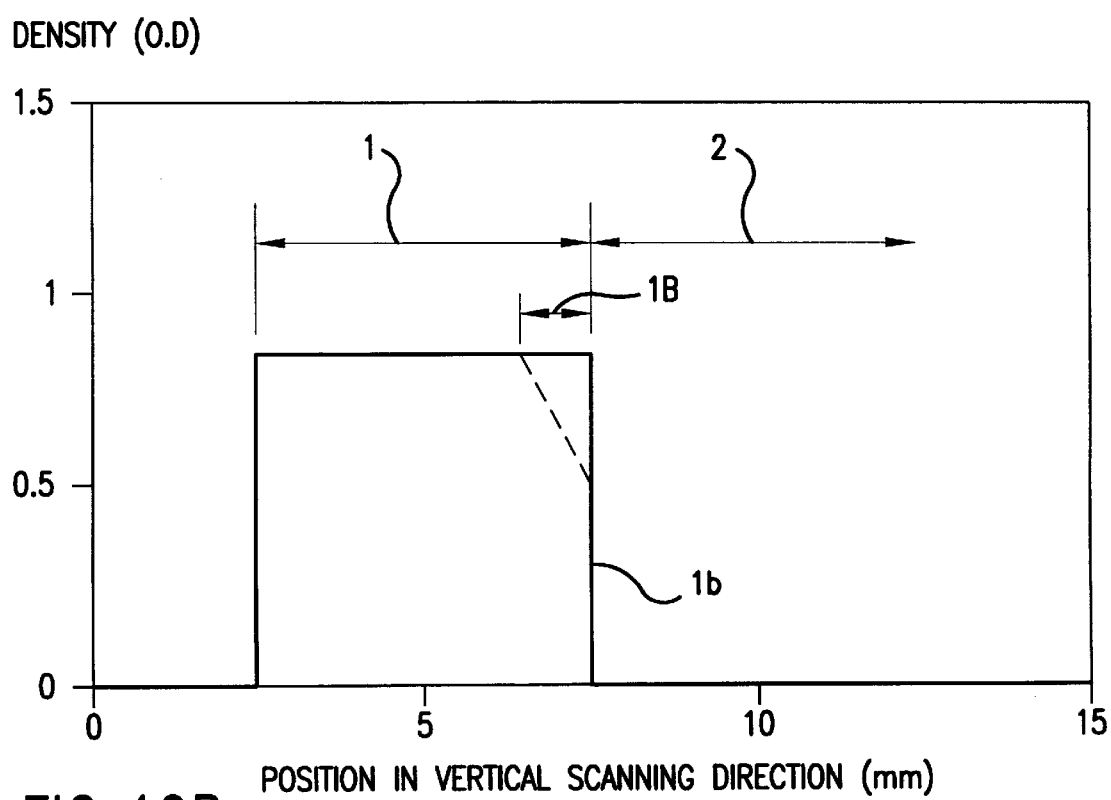

When the output image data So the pixel value of which is corrected as described above is supplied to the image output section 300 as an image recording signal from the image processing section 200 and output from the image output section 300, the lowering of density at the rear end 1B of the halftone part 1 which is in contact with the background part 2 when an output image varies from the halftone part 1 to the background part 2 in the vertical scanning direction is prevented as shown by a full line in FIG. 19B.

FIG. 19B shows the result of the judgement of density when a patch the input dot area ratio of which is 40% is output in only black with screen ruling set to 400 lines/inch, a broken line shows a case in which the present invention is not applied, that is, a case in which a pixel value is not corrected in the data correcting section 250 and a full line shows a case in which the present invention is applied, that is, a case in which a pixel value is corrected in the data correcting section 250 as described above.

The above example is a case in which corrected quantity y is calculated based upon a linear expression shown in the expression (1), however, corrected quantity may be also calculated based upon another functional expression according to the characteristics of the lowering of density at the rear end 1B of the halftone part 1.

The above example is a case in which the number a of picture elements to be corrected and pixel value corrected quantity b respectively common to each color Y, M, C and K are described in the characteristics describing means 252, however, LUT storing the number a of picture elements to be corrected and pixel value corrected quantity b every color may be also provided. The number a of picture elements to be corrected and pixel value corrected quantity b respectively different every screen ruling in the image output section 300 may be also described.

Figure 20A:
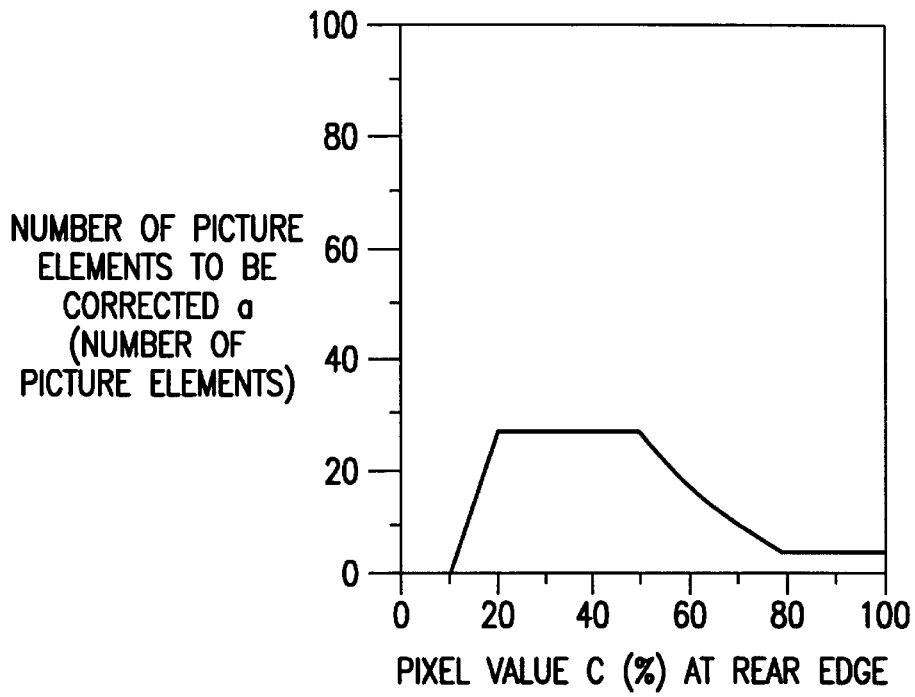
FIG. 20 shows an example of the contents described by characteristics describing means in the data correcting section shown in FIG. 18.
Figure 20B:
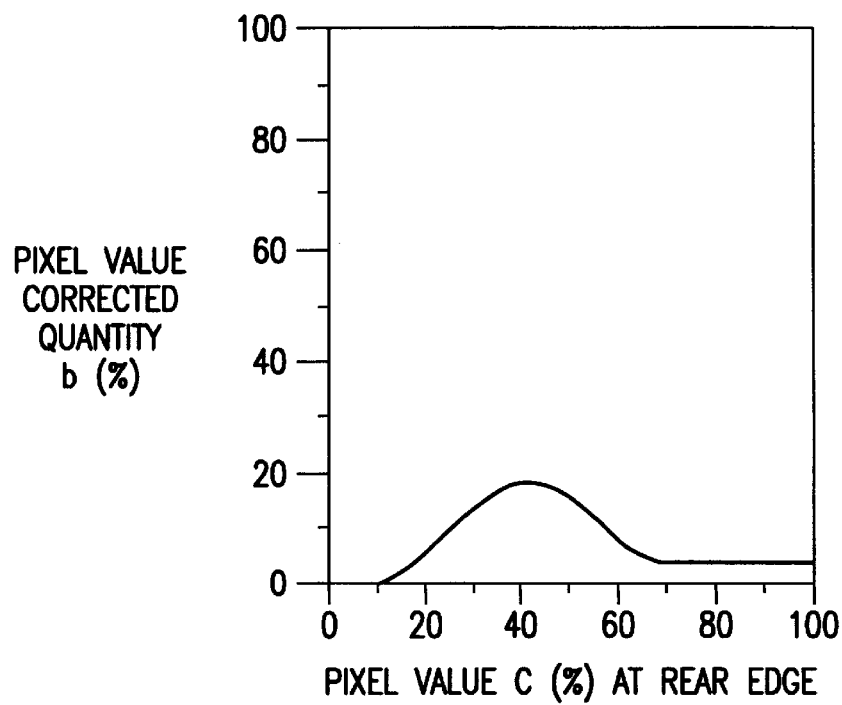

Further, the coefficient of a functional expression when the relationship shown in FIG. 20 between the number a of picture elements to be corrected and the pixel value corrected quantity b respectively corresponding to the pixel value C of the rear edge 1b is expressed in the functional expression is stored in the characteristics describing means 252, and the number a of picture elements to be corrected and pixel value corrected quantity b may be also calculated using the coefficient without using LUT in the characteristics describing means 252.

According to this embodiment, in an image processor for processing input image data or in an image forming apparatus provided with such an image processor as an image processing section, the lowering of density at the rear end of a halftone part which is in contact with a background part when an output image varies from the halftone part to the background part in the vertical scanning direction can be prevented without expanding an image output device or an image output section and increasing the cost. As the above lowering of density can be also prevented if screen ruling is increased to enhance the resolution of an output image, the resolution of an output image can be readily enhanced.

This embodiment is not limited to a case adopting an image formation method according to an electrophotographic method and if only density is lowered at the rear end of a halftone part which is in contact with a background part when an output image varies from the halftone part to the background part in the vertical scanning direction, the present invention can be similarly applied to another image formation method such as an ink jet method, a thermal imprint recording method and a silver salt photographic method.

This embodiment is a case in which each function of the correcting/plotting section 790 is realized by software, however, the correcting/plotting section 790 may be also constituted by hardware provided with the similar functions for speed-up.

According to this embodiment, in an image processor for expanding image data based upon PDL or in an image forming apparatus provided with such an image processor as an image processing section, the lowering of density at the rear end of a halftone part which is in contact with a background part when an output image varies from the halftone part to the background part in the vertical scanning direction can be prevented without expanding an image output device or an image output section and increasing the cost. As the above lowering of density can be also prevented if screen ruling is increased to enhance the resolution of an output image, the resolution of an output image can be readily enhanced.

Particularly, according to this embodiment, an advantage that the lowering of the density of a graphic image made by a client device in which the lowering of density is readily caused can be securely prevented is produced.

Also in this embodiment, if only density is lowered at rear end of a halftone part which is in contact with a background part when an output image varies from the halftone part to the background part in the vertical scanning direction in addition to a case adopting an image formation method according to an electrophotographic method, the present invention can be similarly applied to another image formation method such as an ink jet method, a thermal imprint recording method and a silver salt photographic method.

According to this embodiment of the present invention, the lowering of density at the rear end of a halftone part which is in contact with a background part when an output image varies from the halftone part to the background part in the vertical direction can be prevented without expanding an image forming apparatus or an image output device and increasing the cost. As the above lowering of density can be also prevented if screen ruling is increased to enhance the resolution of an output image, the resolution of an output image can be readily enhanced.

Third Embodiment

FIGS. 1 and 2 show a third embodiment of the present invention. As FIGS. 1 and 2 are the same as those in the first embodiment, the description is omitted. A third cause of a void is as follows:

In an electrostatic image transfer method, when an output image is in contact with a low density part such as a color background part and provided with a character/line drawing part (an image consisting of a character or line drawing) of high density, the density of the boundary of the low density part which is in contact with the character/line drawing part is lowered.

Figure 22:
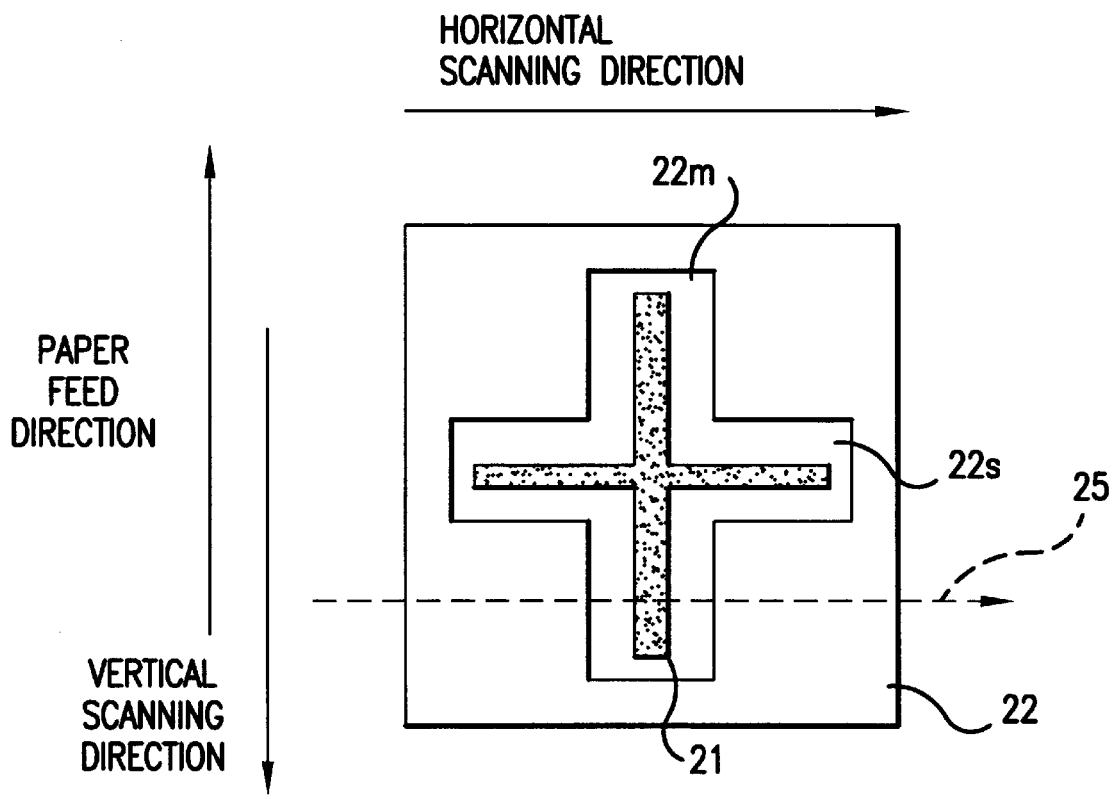
FIG. 22 shows a state in which density is lowered, which is to be solved by a third embodiment according to the present invention.

For example, as shown in FIG. 22, when an output image is provided with a color background part 22 of low density around a character/line drawing part 21 of a black character or black line drawing, the density of the boundary 22m of the color background part 22 which is in contact with the character/line drawing part 21 in the horizontal scanning direction which is a scanning direction by a laser beam on a photoconductive drum and a boundary 22s perpendicular to the above boundary in a paper feed direction or in a vertical scanning direction is lowered. Hereinafter, such lowering of density is called a void around a character.

The void around a character is readily caused in case two or more colors of toner images are multiply transferred to form a color image and particularly, in case the black character/black line drawing part provided with the color background part 22 of low density in the periphery as shown in FIG. 22 is expressed by process black consisting of three colors of yellow, magenta and cyan, a void around a character is remarkably caused.

Figure 23:
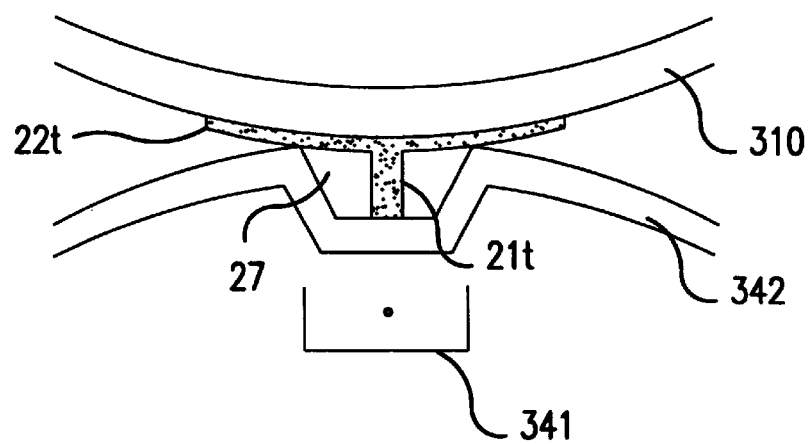
FIG. 23 shows a cause of the lowering of density which is to be solved by the third embodiment according to the present invention.

It is because a void 27 is formed between the photoconductive drum 310 and transfer material 342 such as paper in the periphery of a character/line drawing part toner image 21t by the difference in toner piled height between the character/line drawing part toner image 21t and a color background part toner image 22t as shown in FIG. 23 (FIG. 23 shows a state of transfer in a position of a chain line arrow 25 in FIG. 22), a transfer electric field by a transfer electrifier 341 is lowered and the periphery of the character/line drawing part toner image 21t is not sufficiently transferred on transfer material 342.

In Japanese Published Unexamined Patent Application No. Hei 8-23455, a concept that toner piled height in a character part is lowered and a void around a character is prevented by detecting a character part in a color background and controlling a black quantity coefficient $\alpha$ in generating a black print and removing a background color for the character part, in the concrete, by removing any background color ($\alpha$=1) as to a black character in a color background and by removing a background color by 50% ($\alpha$=0.5) as to a color character in a color background is disclosed. As described above, in a method of increasing ratio in which a background color in a character part is removed to lower toner piled height in a character part and converting a color component constituting the character part to a black signal, the color of the character part is different from a desired color.

Further, if a graphic image made in a host computer of a personal computer and others is printed, there is a problem that the toner images of Y, M and C are replaced with the toner image of K because a background color is removed in an image processor even if the toner output dot area ratio of each color of yellow (Y), magenta (M), cyan (C) and black (K) in a character part in a color background is specified for an application package and an output image which a creator desires cannot be obtained.

To decrease the difference in toner piled height between a character/line drawing part and a color background part, it can be also considered that the weight of toner for developing on a photoconductive drum is decreased. However, there is a problem that the above method causes unevenness in melting toner fixed on paper or deteriorates the reproducibility of a color.

Recently, as a computer printer and a network printer are popularized, an occasion in which a character/graphic image made in a host computer of a personal computer and others is printed tends to be increased. In such a character/graphic image, the lowering of density such as a void around a character is remarkable, compared with the case of a natural image such as a photograph. Therefore, in an image forming apparatus such as a computer printer and a network printer, the lowering of density such as a void around a character is serious, compared with the case of an image forming apparatus such as a copying machine.

For a method of correcting the linear and symmetrical output characteristics of an image output section such as MTF characteristics, a method of correcting input image data by digital filter processing is widely used. However, the lowering of density such as a void around a character based upon the non-linear and asymmetrical output characteristics of an image output section cannot be reduced or prevented by digital filter processing as described above.

In this embodiment, the lowering of density in the boundary of a low density part such as a color background part which is in contact with a character/line drawing part can be prevented without removing a background color in a character/line drawing part which deteriorates color reproducibility and causing a problem of image quality such as unevenness in melting toner and the deterioration of color reproducibility as a case in which the weight of toner for developing on a photoconductive drum is decreased.

Figure 24A:
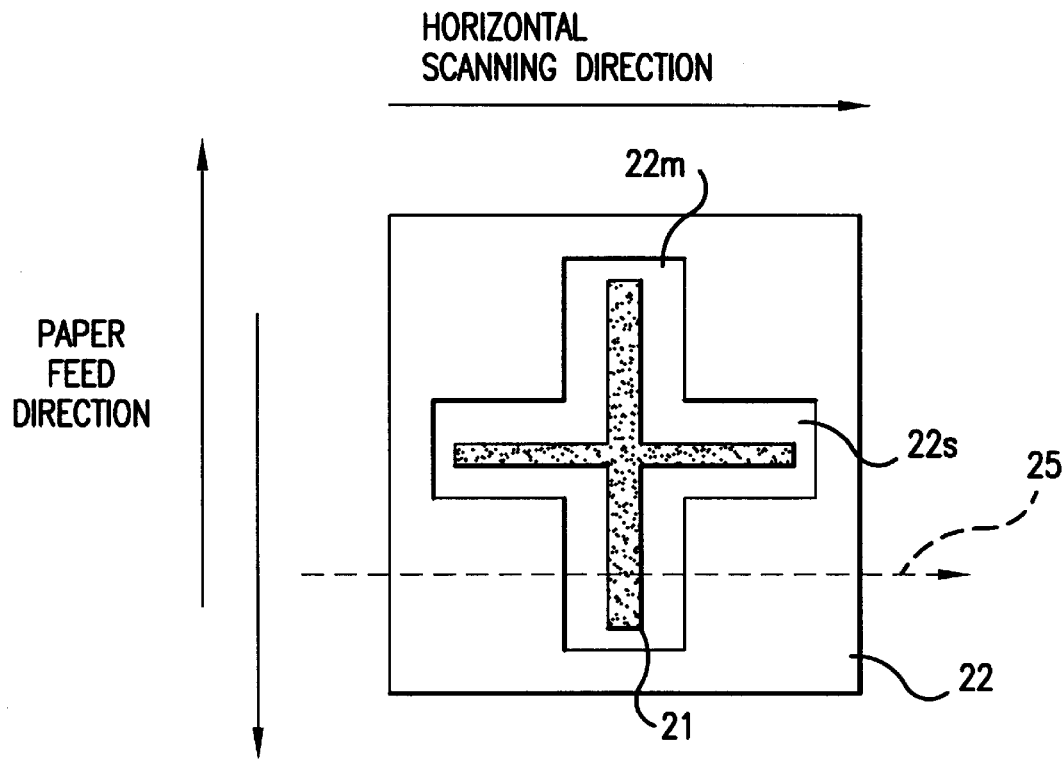
FIG. 24A–B shows a state in which density is lowered, which is to be solved by the present invention and that the lowering of density is prevented by the present invention.

In an image forming apparatus in this embodiment, that is, a copying machine, when a line 1 mm thick the input dot area ratio of yellow, magenta and cyan of which is respectively 100% on a patch the input dot area ratio of magenta and cyan of which is respectively 30% shown in FIG. 24A is output on paper with screen ruling set to 200 lines/inch without correcting a pixel value described later in the data correcting section 250 of the image processing section 200 and the density of the output image in a position of a chain line arrow 25 in FIG. 24A is measured, a void around a character shown by a broken line in FIG. 24B in which the density of the color background part 22 which is the patch part of magenta and cyan is lowered is found.

The result of the measurement of density in the vertical scanning direction is omitted, however, as shown in FIG. 24A, density is also lowered in a boundary 22s in the vertical scanning direction. However, the area of a boundary in which density is lowered and quantity in which density is lowered are larger in a boundary 22m in the horizontal scanning direction than in the boundary 22s in the vertical scanning direction.

Figure 25:
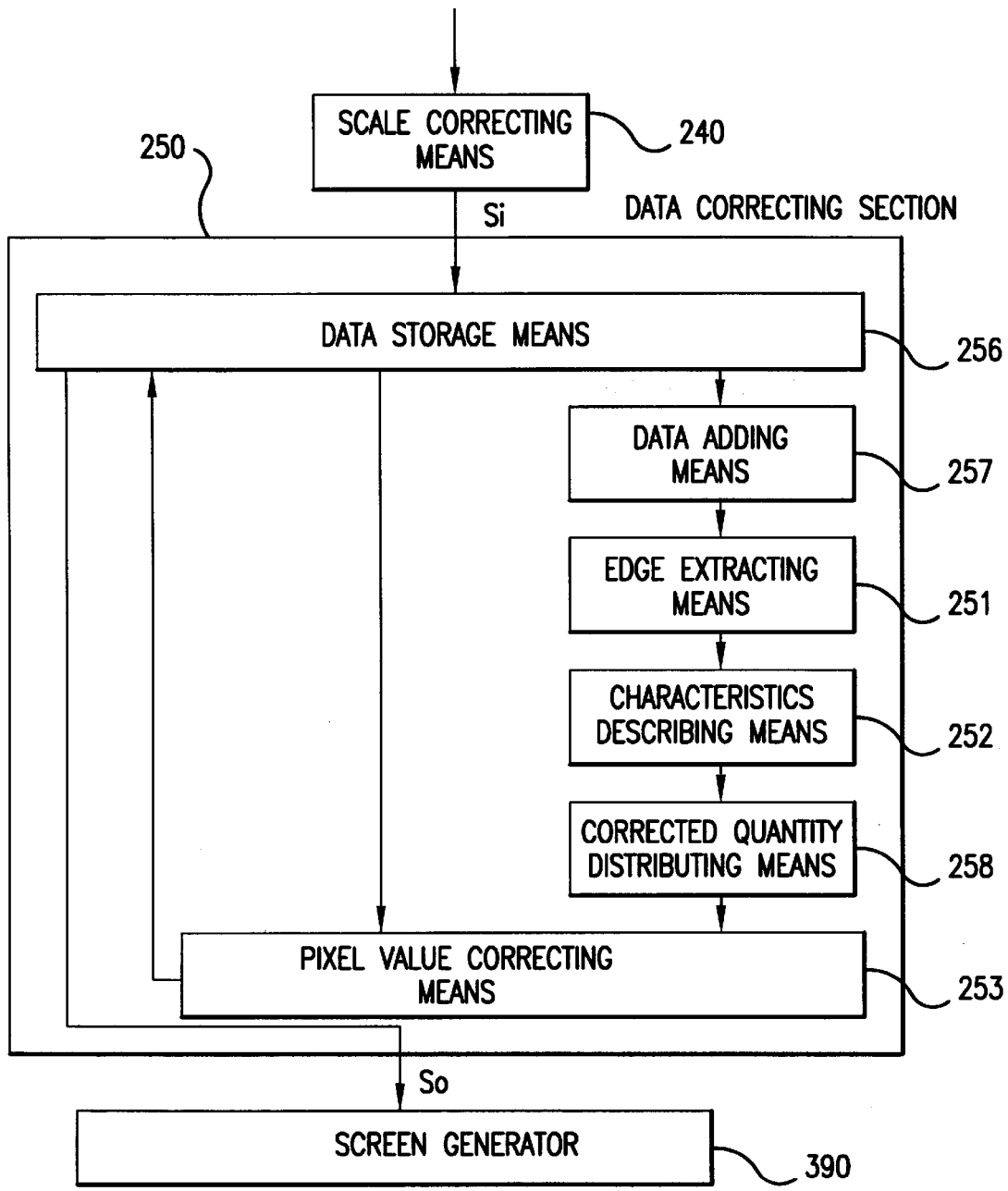
FIG. 25 shows an example of a data correcting section in an image processing section in the third embodiment according to the present invention.

However, in this embodiment, in the data correcting section 250 of the image processing section 200, the pixel value of input image data from scale correcting means 240 is corrected. FIG. 25 shows a concrete example of the data correcting section 250 and the data correcting section 250 is constituted by data storage means 256, data adding means 257, edge extracting means 251, characteristics describing means 252, corrected quantity distributing means 258 and pixel value correcting means 253.

In the data storage means 256, the image data of four colors Y, M, C and K of input image data Si from the scale correcting means 240 is stored for one page, after storage, first one line at a time is read in the horizontal scanning direction (in a beam scanning direction) and transferred to the data adding means 257.

In the data adding means 257, the image data of the four colors Y, M, C and K from the data storage means 256 is added and synthetic image data is obtained.

In the edge extracting means 251, an edge picture element of a color background part which is in contact with a character/line drawing part and an edge picture element of a character/line drawing part which is in contact with a color background part are detected based upon the synthetic image data from the data adding means 257 as described later.

In the characteristics describing means 252, the number of picture elements to be corrected the pixel value of which is to be corrected and a coefficient for determining the pixel value corrected quantity of each picture element to be corrected of a color background part around a character/line drawing part are read based upon the pixel value of the edge picture element detected in the edge extracting means 251 from a look-up table (hereinafter called LUT) as described later and pixel value corrected quantity is read based upon the number of picture elements to be corrected and the coefficient.

In the corrected quantity distributing means 258, pixel value corrected quantity calculated in the characteristics describing means 252 is distributed to each color of Y, M, C and K as described later.

In the pixel value correcting means 253, the pixel value corrected quantity of each color Y, M, C and K obtained from the corrected quantity distributing means 258 is added to the pixel value of the image data of each color Y, M, C and K obtained from the data storage means 256, the image data of each color Y, M, C and K after correction in the horizontal scanning direction is obtained, transferred to the data storage means 256 and stored for one page.

In the data storage means 256, next, the image data of each color Y, M, C and K after correction in the horizontal scanning direction stored for the one page is read one line at a time in the vertical scanning direction and transferred to the data adding means 257. Afterward, in the data adding means 257, the edge extracting means 251, the characteristics describing means 252, the corrected quantity distributing means 258 and the pixel value correcting means 253, the same processing as described above in the vertical scanning direction is executed, the image data of each color Y, M, C and K after correction in the horizontal scanning direction and in the vertical scanning direction is obtained, transferred to the data storage means 256 and stored for one page.

When correction in the horizontal scanning direction and in the vertical scanning direction for one page is finished as described above, the image data of each color Y, M, C and K after correction stored in the data storage means 256 is supplied from the data storage means 256 to a screen generator 390 as output image data So.

In the concrete, the edge extracting means 251 stores the total pixel value of synthetic image data for one line in the horizontal scanning direction or in the vertical scanning direction in memory, judges picture elements the total pixel value of which is larger than a predetermined value Ls and the difference between the above total pixel value and the total pixel value of picture elements before and after the picture elements of which is smaller than a predetermined value Gs to be picture elements in a color background part, counts the number (length) D of picture elements in the color background part, judges estimated picture elements to be edge picture elements of the color background part which is in contact with a character/line drawing part when the difference between the total pixel value of the estimated picture elements and the total pixel value of picture elements immediately after or immediately before the above estimated picture elements is larger than a predetermined value Gs, defines the number D of picture elements in the color background part and defines a picture element immediately after or immediately before the above picture elements as an edge picture element of the character/line drawing part which is in contact with the color background part.

In an image forming apparatus according to an electrophotographic method, generally, a picture element the dot area ratio of which is smaller than 5% is difficult to reproduce in the image output section. Therefore, when the pixel value of a color background part is smaller than 5% in dot area ratio, the lowering of the density of the color background part does not need to be discussed. Therefore, the above predetermined value Ls is set. Therefore, the predetermined value Ls is set to 5% in the scale of a pixel value and in this case, the pixel value of a color background part is 5% or more in a scale. The above predetermined value Gs is set for detecting a character/line drawing part.

The edge extracting means 251 sends the detected position xo of an edge picture element of a color background part and the number D of picture elements in the color background part to the characteristics describing means 252, obtains the difference d in a pixel value between an edge picture element of a character/line drawing part and the edge picture element of the color background part and sends it to the characteristics describing means 252.

Figure 26A:
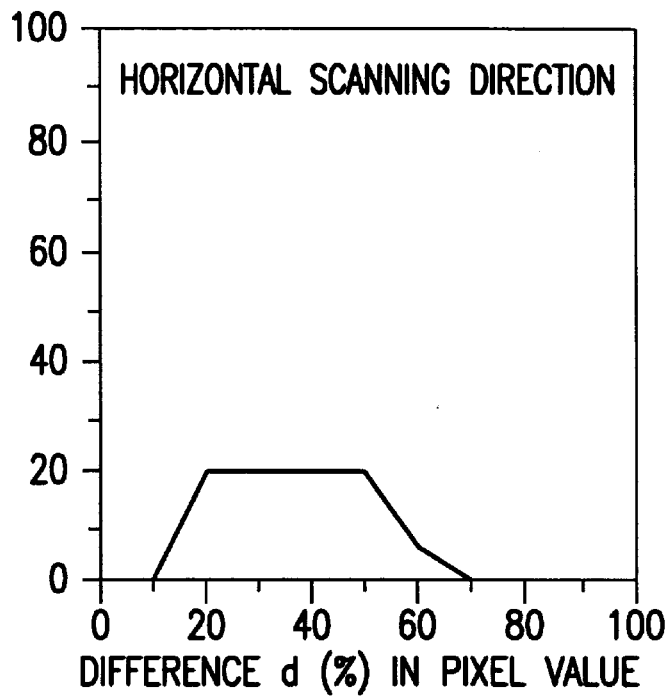
FIG. 26 shows an example of the contents described by characteristics describing section in the data correcting section shown in FIG. 25.
Figure 26B:
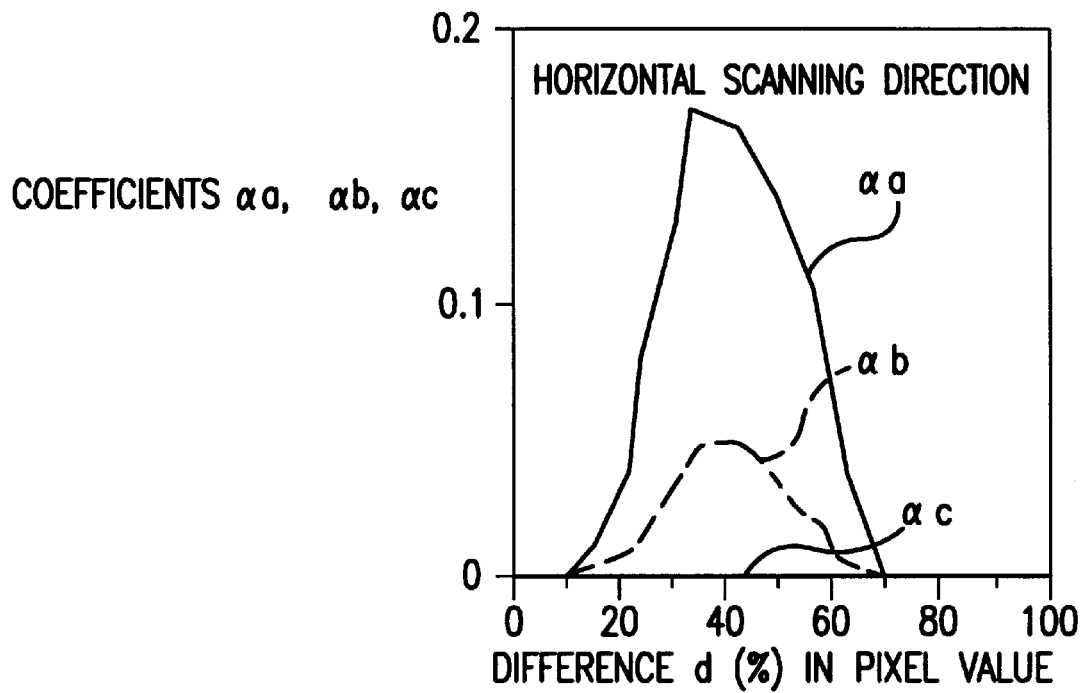

The characteristics describing means 252 is provided with two LUTs for correcting the horizontal scanning direction and two LUTs for correcting the vertical scanning direction, in one of the two LUTs for correcting the horizontal scanning direction, the relationship between the above difference d (dot area ratio) between pixel values and the above number a of picture elements to be corrected is stored beforehand as shown in FIG. 26A and in the other LUT for correcting the horizontal scanning direction, the relationship among the difference d between the pixel values and three coefficients $\alpha a$, $\alpha b$ and $\alpha c$ in this embodiment which are the above coefficient is stored beforehand as shown in FIG. 26B.

Figure 27A:
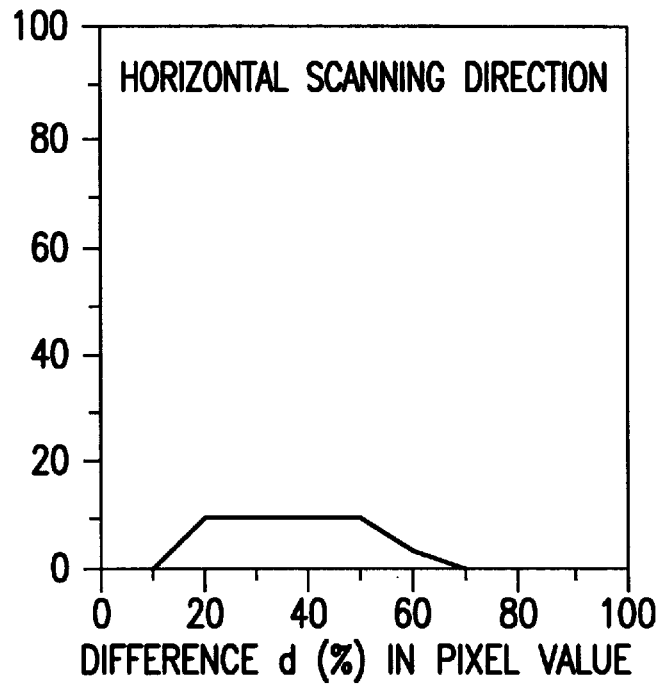
FIG. 27 shows an example of the contents described by the characteristics describing means in the data correcting section shown in FIG. 25.
Figure 27B:
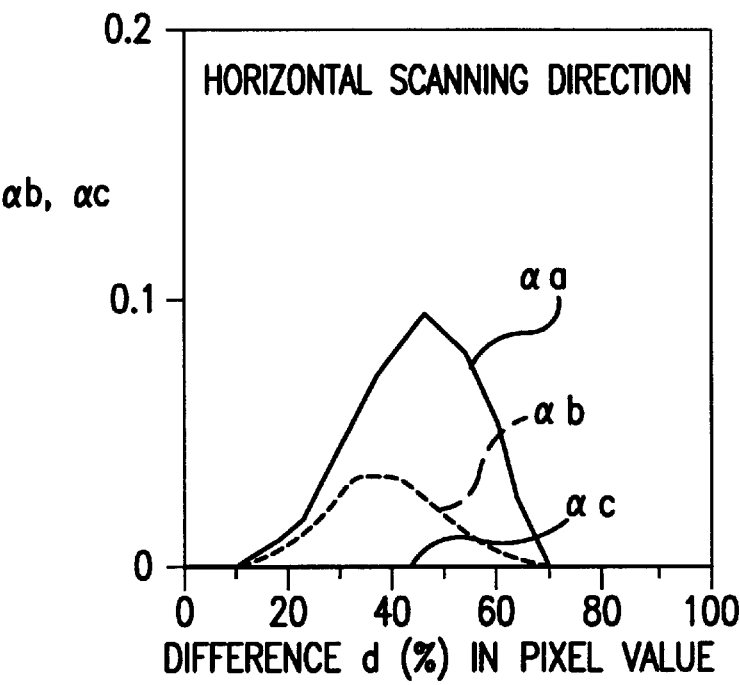

Similarly, in one of the two LUTs for correcting the vertical scanning direction, the relationship between the difference d between the pixel values and the number a of picture elements to be corrected is stored as shown in FIG. 27A and in the other LUT for correcting the vertical scanning direction, the relationship among the difference d between the pixel values and three coefficients $\alpha a$, $\alpha b$ and $\alpha c$ in this embodiment which are the above coefficient is stored as shown in FIG. 27B.

When the horizontal scanning direction is corrected, LUTs shown in FIGS. 26A and B are referred and when the vertical scanning direction is corrected, LUTs shown in FIGS. 27A and B are referred and the number a of picture elements to be corrected and the coefficients αa, αb and αc are respectively read based upon the difference d between the pixel values.

Further, the characteristics describing means 252 compares the number a of picture elements to be corrected and the above number D of picture elements in a color background part respectively read from LUT, corrects the pixel value of the color background part when the number D of picture elements in the color background part is larger than the number a of picture elements to be corrected and calculates the pixel value corrected quantity y of a picture element to be corrected in the range of "xo−a≦x≦xo" based upon the following quadratic polynomial when pixel position in the horizontal scanning direction or in the vertical scanning direction is x, the position of an edge picture element of a color background part is xo, the number of picture elements to be corrected is a and coefficients are αa, αb and αc:

$$y = \alpha a (x-xo+a)^2 + \alpha b (x-xo+a) + \alpha c \qquad (1)$$

Figure 24B:
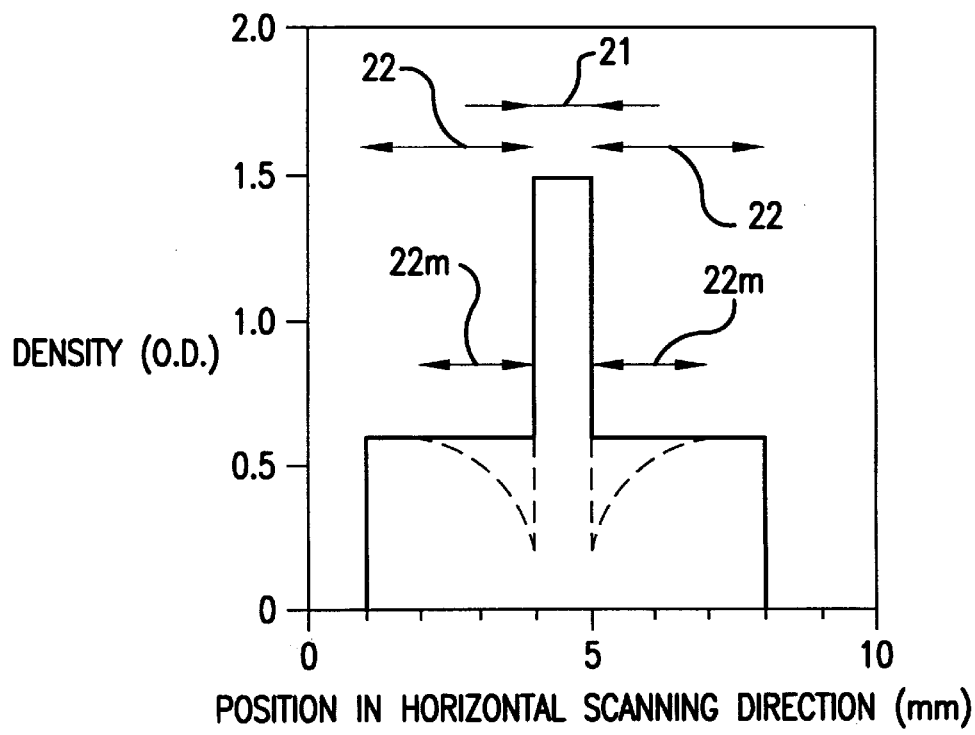

As shown by a broken line in FIG. 24B, the quantity of the lowering of density in the color background part 22 tends to vary nonlinearly in the range in which density is lowered. Pixel value corrected quantity y is calculated based upon the above quadratic polynomial.

Figure 28:
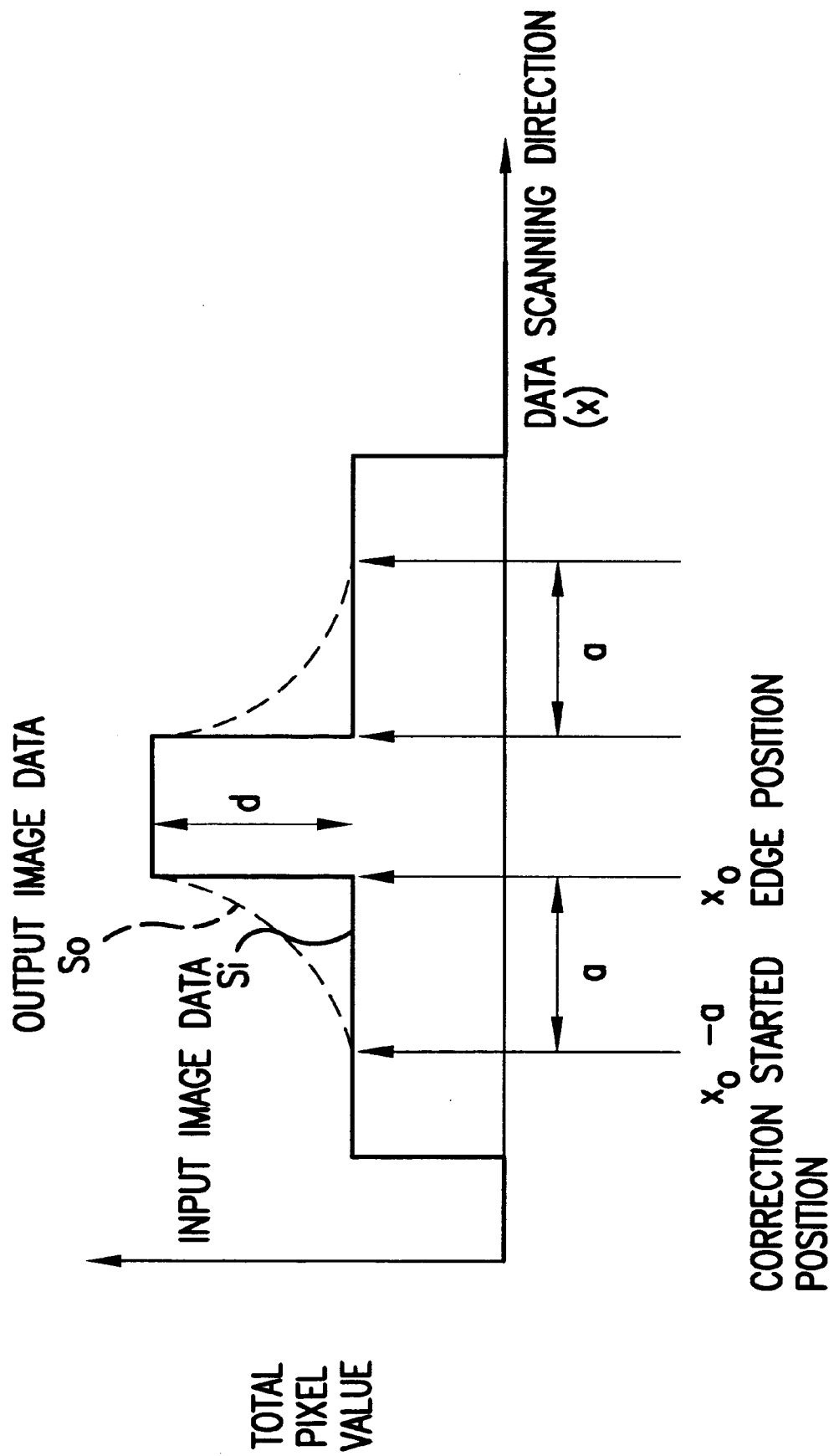
FIG. 28 explains calculating quantity to be corrected by the Characteristics describing means in the data correcting section shown in FIG. 25.

However, the expression (1) is a case in which the pixel value of a color background part when an image varies from the color background part to a character/line drawing part in the horizontal scanning direction or in the vertical scanning direction is corrected, that is, a case in which the detected edge picture element of the color background part is an edge picture element when an image varies from the color background part to the character/line drawing part as shown by the edge position xo in FIG. 28.

In this case, the number a of picture elements to be corrected and the coefficients αa, αb and αc are read based upon the difference d between the pixel values as described above from LUT shown FIG. 26 or 27.

The pixel value corrected quantity of a picture element, "x=xo−a" is zero because first and second terms of the expression (1) are zero and a third term, αc is also zero as shown in FIGS. 26 and 27. The pixel value corrected quantity of a picture element, "x=xo", that is, an edge picture element of a color background part is "$y = \alpha a \times a^2 + \alpha b \times a$".

Conversely, if the pixel value of a color background part when an image varies from a character/line drawing part to the color background part in the horizontal scanning direction or in the vertical scanning direction is corrected, the number a of picture elements to be corrected and the coefficient αa which are produced by inverting the respective signs of the number a of picture elements to be corrected and the coefficient αa respectively read based upon the difference d between the pixel values from LUT shown in FIG. 26 or 27 are used for the number a of picture elements to be corrected and the coefficient αa in the expression (1). That is, the pixel value corrected quantity y of a picture element to be corrected in the range of "xo≦x≦xo+a" is calculated based upon the following expression:

$$y = -\alpha a (x-xo-a)^2 + \alpha b (x-xo-a) + \alpha c \qquad (2)$$

In this case, the pixel value corrected quantity of a picture element, "x=xo", that is, an edge picture element of a color background part is "$y = -\alpha a \times a^2 - \alpha b \times a$" and as '60 a' and 'a' are negative, the above pixel value corrected quantity is positive. The pixel value corrected quantity of a picture element, "x=xo+a" is zero because first and second terms of the expression (2) are zero.

When the number D of picture elements in a color background part is smaller than the number a of picture elements to be corrected, it is considered that the pixel value of a color background part is not corrected and pixel value corrected quantity y is zero.

In the corrected quantity distributing means 258, pixel value corrected quantity y calculated in the characteristics describing means 252 as described above is distributed to four colors of K, Y, M and C. As a result of examination by the inventors it is clarified that transfer failure occurs in a toner image of a color transferred late because of a void around a character.

Figure 29:
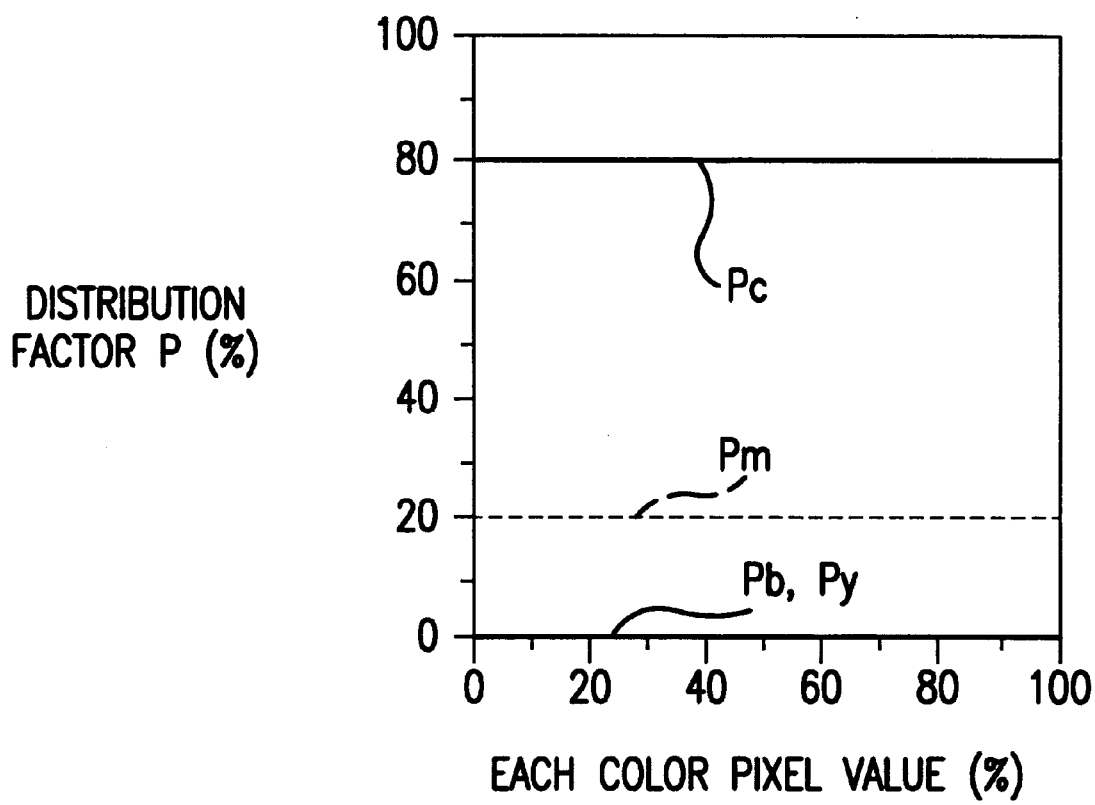
FIG. 29 explains distributing corrected quantity by corrected quantity distributing means in the data correcting section shown in FIG. 25.

The distribution ratio Pb, Py, Pm and Pc to the pixel value (dot area ratio) of the four colors K, Y, M and C is set so that the distribution ratio of a color transferred late is higher, that is, so that Pb<Py<Pm<Pc (however, Pb+Py+Pm+Pc=1) and their distribution ratio is described in LUT beforehand as shown in FIG. 29.

The pixel value corrected quantity yK, yY, yM and yC of the four colors K, Y, M and C is calculated by multiplying the distribution ratio Pb, Py, Pm and Pc read from LUT by pixel value corrected quantity y calculated in the characteristics describing means 252 as shown by the following expressions:

$$yK = y \times Pb \qquad (3)$$

$$yY = y \times Py \qquad (4)$$

$$yM = y \times Pm \qquad (5)$$

$$yC = y \times Pc \qquad (6)$$

However, in this embodiment, as for black which is a first color and yellow which is a second color, the transfer failure of a toner image is not found, Pb=Py=0, that is, yK=yY=0, for magenta which is a third color, Pm is set to 20% and for cyan which is a fourth color, Pc is set to 80%. If the transfer failure of a toner image also occurs in transferring the first and second colors, each distribution ratio is required to be set to a value which is not zero.

The pixel value correcting means 253 obtains the image data of the four colors K, Y, M and C after correction by adding the pixel value corrected quantity yY, yK, yM and yC of the four colors K, Y, M and C obtained from the corrected quantity distribution means 258 as described above to the pixel value of the image data of the four colors K, Y, M and C obtained from the data storage means 256 and transfers the data to the data storage means 256.

As described above, in the boundary of a color background part which is in contact with a character/line drawing part, toner piled height is higher in a picture element nearer to the character/line drawing part, a toner image in the boundary of the color background part which is in contact with the character/line drawing part is securely and sufficiently transferred on paper and density is not lowered in the boundary of the color background part which is in contact with the character/line drawing part by correcting the pixel value of the boundary of the color background part which is in contact with the character/line drawing part so that the pixel value of a picture element nearer to the character/line drawing part is increased.

In an image forming apparatus in this embodiment, that is, a copying machine, the above pixel value is corrected in the data correcting section 250 of the image processing section 200, a line 1 mm thick the input dot area ratio of yellow, magenta and cyan of which is respectively 100% on a patch shown in FIG. 24A the input dot area ratio of magenta and cyan of which is respectively 30% is output on paper with screen ruling set to 200 lines/inch as in a case in which a pixel value is not corrected as described above, and when the density of the output image in a position shown by a chain line arrow 25 in FIG. 24A is measured, density is not lowered at all in the color background part 22 which is equivalent to the patch of magenta and cyan as shown by a full line in FIG. 24B. The input image data in this case is input from an external device via an external device interface 260.

The above embodiment is a case in which pixel value corrected quantity y is calculated based upon the expression (1) or (2) which is a quadratic polynomial in the characteristics describing means 252, however, another function may be also used. However, as a result of examination by the inventors, as in the lowering of density in a color background part, the nonlinearity of response characteristics caused by electrostatic transfer is strong, the above lowering of density cannot be sufficiently prevented by a linear function and as described above, can be sufficiently prevented by using a quadratic polynomial. If the nonlinearity of response characteristics is stronger, a higher-order polynomial is used, however, the quantity of operation and the capacity of LUT are increased. As a result of examination, actually, the lowering of density in a color background part can be sufficiently prevented without using such a higher-order polynomial. Therefore, it is desirable in view of the quantity of operation and the capacity of LUT that a quadratic polynomial shown in the above embodiment is used.

For LUT describing the relationship between the difference d between the pixel values and the number a of picture elements to be corrected and among the coefficients $\alpha a$, $\alpha b$ and $\alpha c$ in the characteristics describing means 252, LUT describing the characteristics of each screen ruling for example may be also provided in addition to LUT for correcting the horizontal scanning direction and LUT for correcting the vertical scanning direction.

A coefficient and others when a functional relation shown in FIGS. 26 and 27 is expressed by an arbitrary function are stored and the number a of picture elements to be corrected and the coefficients pa, pb and pc may be also calculated using a computing element in place of LUT.

If data is corrected in the data correcting section 250, first, operation in relation to the horizontal scanning direction is executed and next, operation in relation to the vertical scanning direction may be also executed reversely to the above case.

The edge extracting means 251 may also use another well-known method such as a method of obtaining the linear differential value of a gradient image by digital filter processing and a method of using pattern matching if only an edge picture element can be detected as described above.

In FIG. 1, an electrophotographic method in which a toner image on the photoconductive drum 310 is directly electrostatically multiply transferred on a paper on the transfer drum 340 is shown, however, as failure also occurs in transferring a toner image in a color background part in a method in which after a toner image on the photoconductive drum 310 is once electrostatically multiply transferred on an intermediate transfer drum, it is transferred on paper from on the intermediate transfer drum collectively, the present invention can be similarly applied to the above method.

Also, in FIG. 1, a single-engine electrophotographic method in which a toner image formed in order on one photoconductive drum 310 is electrostatically multiply transferred on paper on the transfer drum 340 is shown, however, the present invention can be similarly applied to a tandem-engine electrophotographic method in which toner images formed simultaneously on plural photoconductive drums are electrostatically multiply transferred on paper on a transfer belt in order.

According to this embodiment, even if the removal of a background color which deteriorates the reproducibility of a color of a character/line drawing part is not performed, the lowering of density in the boundary of a color background part which is in contact with the character/line drawing part can be prevented. As such lowering of density is not caused even if the weight of toner for developing on the photoconductive drum is increased, no problem of image quality such as unevenness in melting toner and the deterioration of color reproducibility is caused as a case in which the weight of toner for developing on a photoconductive drum is decreased to prevent density from being lowered.

This embodiment is not limited to a case adopting an image formation method according to an electrophotographic method and if only density is lowered in a low density part when an output image is provided with a character/line drawing part of high density which is in contact with the low density part, the present invention can be similarly applied to another image formation method such as an ink jet method, a thermal imprint recording method and a silver salt photographic method.

According to this embodiment of the present invention, even if the removal of a background color which deteriorates the reproducibility of a color of a character/line drawing part is not performed, the lowering of density in the boundary of a low density part such as a color background part which is in contact with the character/line drawing part can be securely prevented. As such lowering of density is not caused even if the weight of toner for developing on the photoconductive drum is increased, no problem of image quality such as unevenness in melting toner and the deterioration of color reproducibility is caused as a case in which the weight of toner for developing on a photoconductive drum is decreased to prevent density from being lowered.

What is claimed is:

1. An image forming apparatus for forming an image on a recording medium, comprising:

image obtaining means for obtaining input image data of each of a plurality of picture elements, the input data including positional information and pixel value information;

edge extracting means for extracting an edge picture element, the pixel value of the input image data of the edge picture element varying from a low density pixel value to a high density pixel value in a vertical scanning direction on said recording medium; and changing means for changing the pixel value of at least one picture element with the low density pixel value of said input image data based upon the positional information and the pixel value information of the extracted edge picture element, a quantity of change of the pixel values having one of a plurality of values.

2. An image forming apparatus according to claim 1, wherein:

said changing means is provided with:
a changed picture element determining section for determining a changed picture element, the pixel value of which is to be changed based upon the positional information which said edge picture element has; and a change quantity determining section for determining the pixel value change quantity of the changed picture element determined by said changed picture element determining section based upon the pixel value information which said edge picture element has.

3. An image forming apparatus according to claim 1, wherein:
said changing means is provided with an information storage section for storing a number of changed picture elements and pixel value change quantities according to the pixel value information which said edge picture element has; and
changed picture elements and the pixel value chance quantity of each changed picture element are determined based upon information stored in the information storage section.

4. An image forming apparatus according to claim 1, wherein:
said low density pixel value exceeds the minimum density value which can be reproduced in said image forming apparatus.

5. An image forming apparatus according to claim 1, wherein:
said low density pixel value is in the range of 5 to 90% in the scale of a pixel value.

6. An image forming apparatus according to claim 1, wherein:
said high density pixel value is in the range of 15 to 100% in the scale of a pixel value.

7. An image forming apparatus according to claim 1, comprising:
a photoconductive drum on which an electrostatic latent image is formed by radiating a beam; and
a rotary developing sleeve-type two-component magnetic brush developing machine holding a developer layer on a surface, wherein:
pixel value change quantity in said changing means is determined based upon a quantity of toner pulled back from said photoconductive drum into said developer layer.

8. An image forming apparatus according to claim 7, wherein:
pixel value change quantity in said changing means is determined based upon the quantity of toner pulled back from said photoconductive drum into said developer layer for every partial developer layer determined by every predetermined turning angle in the rotational direction of said rotary developing sleeve.

9. An image processor for processing image information for forming an image on a page, comprising:
image obtaining means for obtaining input image data of each of a plurality of picture elements, the input data including positional information and pixel value information;
edge extracting means for extracting an edge picture element, the pixel value of the input image data of the edge picture element varying from a low density pixel value to a high density pixel value in a vertical scanning direction on said page; and
changing means for changing the pixel value of at least one picture element with the low density pixel value of said input image data based upon the positional information and the pixel value information of the extracted edge picture element, a quantity of change of the pixel values having one of a plurality of values.

10. An image processor according to claim 9, wherein:
said changing means is provided with:
a changed picture element determining section for determining a changed picture element, the pixel value of which is to be changed based upon the positional information which said edge picture element has; and
a change quantity determining section for determining the pixel value change quantity of the changed picture element determined by said changed picture element determining section based upon the pixel value information which said edge picture element has.

11. An image processor according to claim 9, wherein:
said changing means is provided with an information storage section for storing a number of changed picture elements and pixel value change quantities according to the pixel value information which said edge picture element has; and
changed picture elements and the pixel value change quantity of each changed picture element are determined based upon information stored in the information storage section.

12. An image processor according to claim 9, wherein:
said low density pixel value is in the range of 5 to 90% in the scale of a pixel value.

13. An image processor according to claim 9, wherein:
said high density pixel value is in the range of 15 to 100% in the scale of a pixel value.

14. An image forming apparatus for forming an image on a recording medium, comprising.
image obtaining means for obtaining input image data of each of a plurality of picture elements, the input data including positional information and pixel value information;
edge extracting means for extracting an edge picture element, the pixel value of the input image data of the edge picture element varying between a low density pixel value and a high density pixel value in a horizontal scanning direction on said recording medium; and
changing means for changing the pixel value of at least one picture clement with the low density pixel value of said input image data based upon the positional information and the pixel value information of the extracted edge picture element, a quantity of change of the pixel values having one of a plurality of values.

15. An image processor for processing image information for forming an image on a page, comprising:
image obtaining means for obtaining input image data of each of a plurality of picture elements, the input data including positional information and pixel value information;
edge extracting means for extracting an edge picture element, the pixel value of the input image data of the edge picture element varying from a low density pixel value and a high density pixel value in a horizontal scanning direction on said page; and
changing means for changing the pixel value of at least one picture element with the low density pixel value of said input image data based upon the positional information and the pixel value information of the extracted edge picture element, a quantity of change of the pixel values having one of a plurality of values.

16. An image forming apparatus for forming an image on a recording medium, comprising:

image obtaining means for obtaining input image data of each of a plurality of picture elements, the input data including positional information and pixel value information;

edge extracting means for extracting an edge picture element, the pixel value of the input image data of the edge picture element varying from a halftone pixel value to a background pixel value in a vertical scanning direction on said recording medium; and changing means for changing the pixel value of at least one picture element with the halftone pixel value of said input image data based upon the positional information and the pixel value information of the extracted edge picture element, a quantity of change of the pixel values having one of a plurality of values.

17. An image forming apparatus according to claim 16, wherein:

said changing means is provided with:

a changed picture element determining section for determining a changed picture element, the pixel value of which is to be changed based upon the positional information which said edge picture element has; and a change quantity determining section for determining the pixel value change quantity of the changed picture element determined by said changed picture element determining section based upon the pixel value information which said edge picture element has.

18. An image forming apparatus according to claim 16, wherein:

said changing means is provided with an information storage section for storing a number of changed picture elements and pixel value change quantities according to the pixel value information which said edge picture element has; and changed picture elements and the pixel value change quantity of each changed picture element are determined based upon information stored in the information storage section.

19. An image forming apparatus according to claim 16, wherein:

said halftone pixel value is in the range of 5 to 100% in the scale of a pixel value.

20. An image forming apparatus according to claim 16, wherein:

said background pixel value is the minimum density value which can be reproduced by said image forming apparatus.

21. An image forming apparatus according to claim 16, wherein:

said background pixel value is in the range of 0 to 5% in the scale of a pixel value.

22. An image forming apparatus according to claim 16, wherein:

said image forming apparatus is provided with a rotary developing sleeve-type two-component magnetic brush developing machine holding a developer layer on the surface; and pixel value change quantity in said changing means is determined based upon the partial lowering of toner density from the mean value in the developer layer of said rotary developing sleeve.

23. An image forming apparatus according to claim 22, wherein:

pixel value change quantity in said changing means is determined based upon the lowering of toner density from the mean value every partial developer layer determined every predetermined turning angle in the rotational direction of said rotary developing sleeve.

24. An image processor for processing image information for forming an image on a page, comprising:

image obtaining means for obtaining input image data of each of a plurality of picture elements, the input data including positional information and pixel value information;

edge extracting means for extracting an edge picture element, the pixel value of the input image data of the edge picture element varying from a halftone density pixel value to a background density pixel value in a vertical scanning direction on said page; and changing means for changing the pixel value of at least one picture element with the halftone density pixel value of said input image data based upon the positional information and the pixel value information of the extracted edge picture element.

25. An image processor according to claim 24, wherein:

said changing means is provided with:

a changed picture element determining section for determining a changed picture element, the pixel value of which is to be changed based upon the positional information which said edge picture element has; and a change quantity determining section for determining the pixel value change quantity of the changed picture element determined by said changed picture element determining section based upon the pixel value information which said edge picture element has.

26. An image processor according to claim 24, wherein:

said changing means is provided with an information storage section for storing a number of changed picture elements and pixel value change quantities according to the pixel value information which said edge picture element has; and changed picture elements and the pixel value change quantity of each changed picture element are determined based upon information stored in the information storage section.

27. An image processor according to claim 24, wherein:

said halftone pixel value is in the range of 5 to 100% in the scale of a pixel value.

28. An image processor according to claim 24, wherein:

said background pixel value is in the range of 0 to 5% in the scale of a pixel value.

29. An image forming apparatus for forming an image on a recording medium, comprising:

image obtaining means for obtaining input image data of each of a plurality of picture elements, the input data including positional information and pixel value information;

edge extracting means for extracting an edge picture element, the input image data of the edge picture element being in contact with a low density pixel value part and being in a boundary between said low density pixel value part and a high density pixel value part the pixel value of which varies larger than a predetermined value when a high density pixel value part as an image part consisting of a character or line drawing is included; and changing means for changing the pixel value of said low density pixel value part of said input image data based upon the positional information and the pixel value information of the extracted edge picture element.

30. An image forming apparatus according to claim 29, wherein:

the pixel value of said low density pixel value part is in the range of 5% or more in the scale of a pixel value.

31. An image forming apparatus according to claim 29, wherein:

said image forming apparatus transfers a toner image formed on a photoconductive drum on said recording medium directly or via an intermediate transfer roller; and a pixel value changed quantity of said low density pixel value part is determined based upon the difference in toner piled height between said high density pixel value part and said low density pixel value part on said photoconductive drum.

32. An image processor for processing image information for forming an image on a page, comprising:

image obtaining means for obtaining input image data of each of a plurality of picture elements, the input data including positional information and pixel value information;

edge extracting means for extracting an edge picture element, the input image data of the edge picture element being in contact with a low density pixel value part and being in a boundary between said low density pixel value part and a high density pixel value part the pixel value of which varies larger than a predetermined value when a high density pixel value part as an image part consisting of a character or line drawing is included; and changing means for changing the pixel value of said low density pixel value part of said input image data based upon the positional information and the pixel value information of the extracted edge picture element.

* * * * *